(12) United States Patent
Yamagishi et al.

(10) Patent No.: US 7,136,096 B1
(45) Date of Patent: Nov. 14, 2006

(54) IMAGE PROCESSING METHOD AND APPARATUS, CONTROL METHOD THEREFOR, AND STORAGE MEDIUM

(75) Inventors: Yoichi Yamagishi, Tokyo (JP); Taku Yamagami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/265,070

(22) Filed: Mar. 9, 1999

(30) Foreign Application Priority Data

Mar. 11, 1998 (JP) ................... 10-076447
Jun. 1, 1998 (JP) ................... 10-151669
Jun. 1, 1998 (JP) ................... 10-151670

(51) Int. Cl.
*H04N 5/225* (2006.01)
(52) U.S. Cl. ............... 348/218.1; 348/36; 348/37; 348/38; 348/39
(58) Field of Classification Search ........... 348/36, 348/38, 39, 218.1, 239, 293, 294
See application file for complete search history.

(56) References Cited

U.S. PATENT DOCUMENTS

| | | | |
|---|---|---|---|
| 5,353,077 A | * | 10/1994 | Tanaka et al. ........... 396/436 |
| 5,600,371 A | | 2/1997 | Arai et al. |
| 5,713,053 A | | 1/1998 | Hirai |
| 5,864,360 A | * | 1/1999 | Okauchi et al. .......... 348/47 |
| 6,243,103 B1 | | 6/2001 | Takigushi et al. ........ 345/634 |
| 6,389,179 B1 | | 5/2002 | Katayama et al. |

FOREIGN PATENT DOCUMENTS

| | | | |
|---|---|---|---|
| EP | 0 334 470 | | 9/1989 |
| EP | 0 443 463 A1 | | 8/1991 |
| JP | 01096639 A | * | 4/1989 |
| JP | 09 322 060 | | 12/1997 |
| JP | 10312001 A | * | 11/1998 |

\* cited by examiner

*Primary Examiner*—Vivek Srivastava
*Assistant Examiner*—Yogesh Aggarwal
(74) *Attorney, Agent, or Firm*—Morgan & Finnegan, L.L.P.

(57) ABSTRACT

This invention has as its object to provide a convenient image processing apparatus which does not limit image sensing purposes. To achieve this object, an image processing apparatus has a recording medium for recording and playing back an image sensed by an image sensing unit, and an image display unit for playing back and displaying at least an image sensed before the current image. The image display unit has a display layout mode for displaying the current image sensing signal and at least the image sensed before the current image sensing signal with their partial boundary regions overlapping each other.

22 Claims, 36 Drawing Sheets

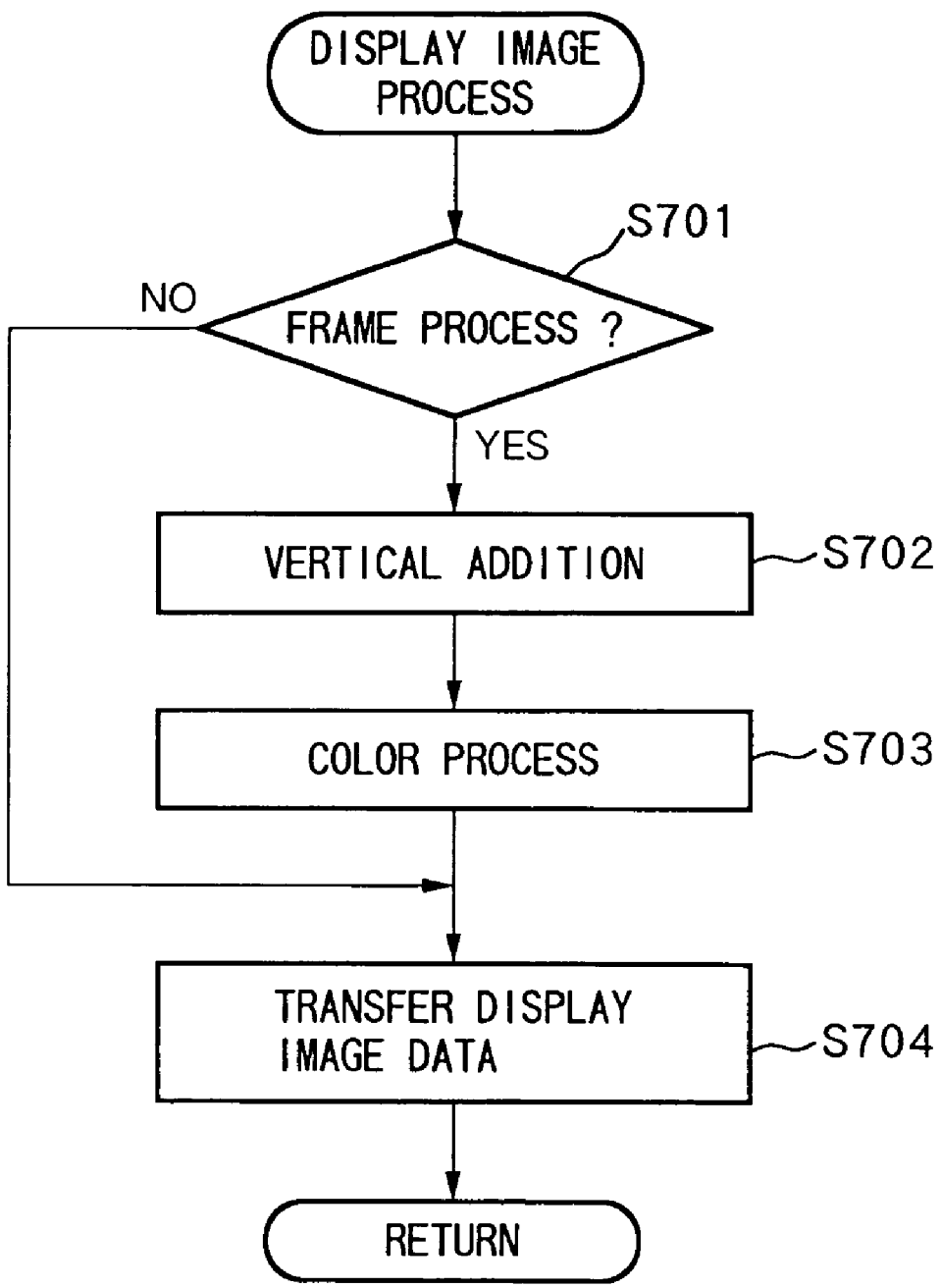

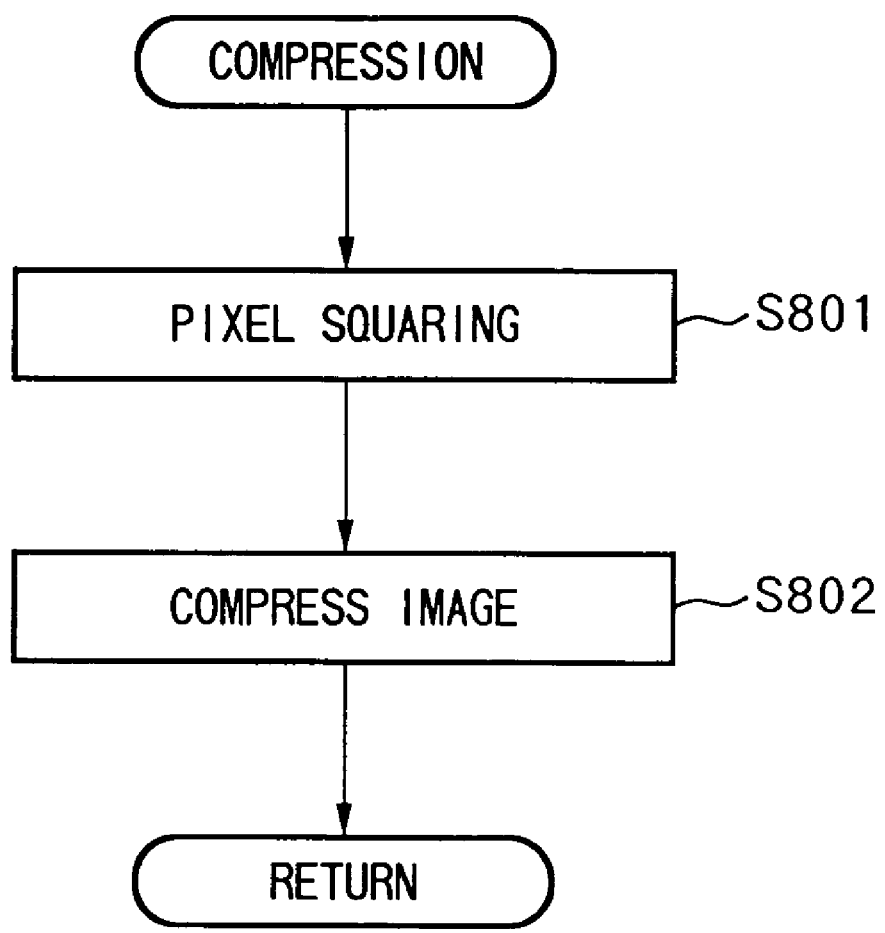

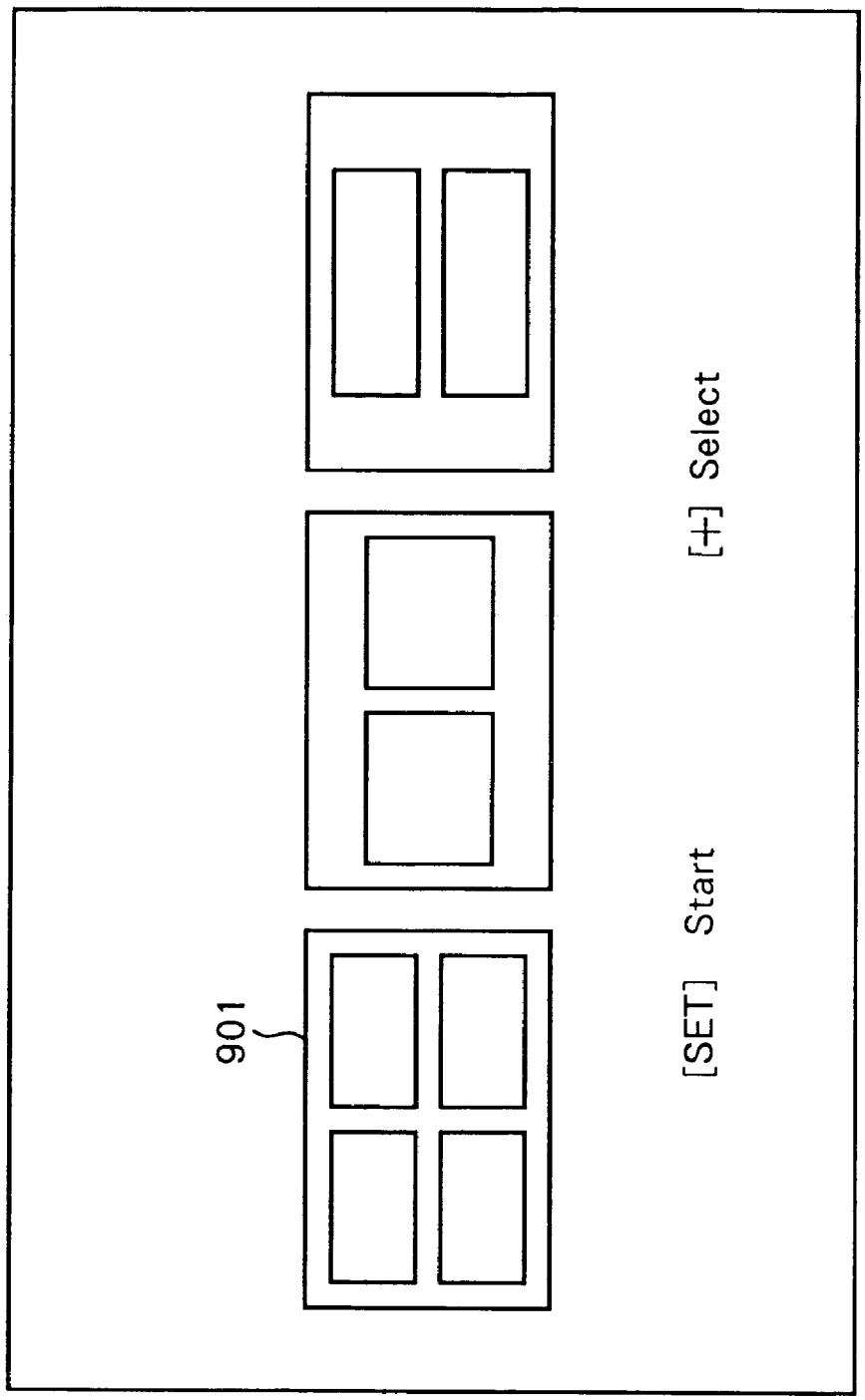

IMAGE PROCESSING METHOD AND APPARATUS, CONTROL METHOD THEREFOR, AND STORAGE MEDIUM

BACKGROUND OF THE INVENTION

The present invention relates to an image processing method and apparatus for sensing, recording, and playing back still and moving images, a control method therefor, and a storage medium which stores a control program for controlling the image processing apparatus.

Conventionally, image processing apparatuses such as electronic cameras and the like, which record/play back still and moving images using memory cards having solid state memory elements as recording media have already been commercially available, and electronic cameras with electronic viewfinders such as color liquid crystal panels and the like have also been commercially available.

These electronic cameras allow the electronic camera user to determine the camera angle by continuously displaying images before sensing, and to confirm the sensed images by playing back and displaying them.

Especially, the function of generating a panoramic image by combining a plurality of sensed images is very convenient and effective for the electronic camera user.

However, in such conventional image processing apparatus such as an electronic camera or the like, since it is hard to sense a panoramic image with a complicated combination of images or to provide a viewfinder display which is convenient upon sensing a panoramic image with a complicated combination of images, its image sensing purpose is limited.

When the user of the image processing apparatus such as an electronic camera or the like has determined the camera angle, since he or she cannot start panoramic image sensing in an arbitrary direction, a convenient image processing apparatus cannot be provided.

Furthermore, since neither viewfinder display nor operation that facilitate re-sensing are available immediately after sensing of a panoramic image, a convenient image processing apparatus cannot be provided.

Electronic cameras having variable focus lenses or zoom lenses that can vary the focal length of a photographing lens are also commercially available. However, in such conventional image processing apparatus such as an electronic camera or the like, the user of the image processing apparatus such as an electronic camera or the like may switch the focal length of a photographing lens or zoom during sensing a panoramic image. In such case, upon generating a panoramic image by combining a plurality of sensed images, extra computations for correcting different focal lengths are needed, resulting in a considerable drop of image quality.

When individual sensed images have considerably different angles due to switching of the focal length of the photographing lens or zooming, the outer shape of a synthesized panoramic image varies in units of sensed images and has staircasing.

Furthermore, when the user notices during panoramic image sensing that the focal length of the photographing lens has been switched to a side which is not suitable for panoramic image sensing, or that the zoom position of the zoom lens is not suitable for panoramic image sensing, he or she may switch the focal length of the photographing lens or zoom even while a plurality of images are being sensed for panoramic image sensing, thus posing the above-mentioned problems.

In an electronic camera that uses exchangeable lenses, it is possible for the electronic camera user to determine the camera angle of a panoramic image and sense in correspondence with the selected lens, and such function is effective for the electronic camera user. However, in such conventional image processing apparatus such as an electronic camera or the like, the user of the image processing apparatus such as an electronic camera or the like may exchange the photographing lens by another lens with a different focal length. In such case, upon generating a panoramic image by combining a plurality of sensed images, extra computations for correcting different focal lengths between the former and latter lenses are needed, resulting in a considerable drop of image quality.

When individual sensed images have considerably different angles due to exchange of the photographing lens by another lens with a different focal length, the outer shape of a synthesized panoramic image varies in units of sensed images and has staircasing.

Not only upon panoramic image sensing but also upon mounting a detached photographing lens again, the previous setup state corresponding to that photographing lens must be re-set, resulting in inconvenience.

SUMMARY OF THE INVENTION

The present invention has been made in consideration of the aforementioned problems of the prior art and has as its object to provide a convenient image processing method and apparatus, which do not limit image sensing purposes.

It is another object of the present invention to provide a storage medium storing a control program that can smoothly control the image processing apparatus of the present invention.

It is still another object of the present invention to provide an image processing apparatus which does not pose any problem in panoramic image sensing even when a lens having a function of changing its focal length is used, its control method, and a storage medium.

It is still another object of the present invention to provide an image processing apparatus which does not pose any problem in panoramic image sensing even when a lens is exchangeable, its control method, and a storage medium.

In order to solve the above-mentioned problems and to achieve the above objects, an image processing method according to the present invention is characterized by the following arrangement according to its first aspect.

That is, there is provided an image processing method for recording a plurality of sensed images on a recording medium, and playing back and displaying the images, comprising: the image sensing step of sensing an image; the recording/playback step of recording and playing back the image sensed in the image sensing step; and the display step of playing back and displaying an image sensed at least before a current image, wherein the display step comprises a plurality of display layout modes for displaying the current image sensing signal, and a signal obtained by playing back the image sensed at least before the current image with partial boundary regions thereof overlapping each other.

An image processing apparatus according to the present invention is characterized by the following arrangement according to its first aspect.

That is, there is provided an image processing apparatus for recording a plurality of sensed images on a recording medium, and playing back and displaying the images, comprising: image sensing means for sensing an image; recording/playback means for recording and playing back the image sensed by the image sensing means; and display means for playing back and displaying an image sensed at least before a current image, wherein the display means comprises a plurality of display layout modes for displaying the current image sensing signal, and a signal obtained by playing back the image sensed at least before the current image with partial boundary regions thereof overlapping each other.

An image processing method according to the present invention is characterized by the following arrangement according to its second aspect.

That is, there is provided an image processing method for recording a plurality of sensed images on a recording medium, and playing back and displaying the images, comprising: the image sensing step of sensing an image; the recording/playback step of recording and playing back the image sensed in the image sensing step; and the display step of playing back and displaying an image sensed at least before a current image, wherein the display step comprises a display layout mode for laying out and displaying the current image sensing signal, and a signal obtained by playing back the image sensed at least before the current image in one direction with partial boundary regions thereof overlapping each other, and a function of reversing the layout direction in the one direction.

An image processing apparatus according to the present invention is characterized by the following arrangement according to its second aspect.

That is, there is provided an image processing apparatus for recording a plurality of sensed images on a recording medium, and playing back and displaying the images, comprising: image sensing means for sensing an image; recording/playback means for recording and playing back the image sensed by the image sensing means; and display means for playing back and displaying an image sensed at least before a current image, wherein the display means comprises a display layout mode for laying out and displaying the current image sensing signal, and a signal obtained by playing back the image sensed at least before the current image in one direction with partial boundary regions thereof overlapping each other, and a function of reversing the layout direction in the one direction.

An image processing method according to the present invention is characterized by the following arrangement according to its third aspect.

That is, there is provided an image processing method for recording a plurality of sensed images on a recording medium, and playing back and displaying the images, comprising: the image sensing step of sensing an image; the recording/playback step of recording and playing back the image sensed in the image sensing step; the display step of playing back and displaying an image sensed at least before a current image; and the switching step of switching a first display layout mode for laying out and displaying the current image sensing signal, and a signal obtained by playing back the image sensed at least before the current image in one direction with partial boundary regions thereof overlapping each other, and a second display layout mode for laying out and displaying the signal obtained by playing back the image sensed at least before the current image, and a signal obtained by playing back an image sensed still before the signal in the one direction with partial boundary regions thereof overlapping each other.

An image processing apparatus according to the present invention is characterized by the following arrangement according to its third aspect.

That is, there is provided an image processing apparatus for recording a plurality of sensed images on a recording medium, and playing back and displaying the images, comprising: image sensing means for sensing an image; recording/playback means for recording and playing back the image sensed by the image sensing means; display means for playing back and displaying an image sensed at least before a current image; and switching means for switching a first display layout mode for laying out and displaying the current image sensing signal, and a signal obtained by playing back the image sensed at least before the current image in one direction with partial boundary regions thereof overlapping each other, and a second display layout mode for laying out and displaying the signal obtained by playing back the image sensed at least before the current image, and a signal obtained by playing back an image sensed still before the signal in the one direction with partial boundary regions thereof overlapping each other.

An image processing method according to the present invention is characterized by the following arrangement according to its fourth aspect.

That is, there is provided an image processing method for recording a plurality of sensed images on a recording medium, and playing back and displaying the images, comprising: the image sensing step of sensing an image; the recording/playback step of recording and playing back the image sensed in the image sensing step; and the display step of playing back and displaying an image sensed at least before a current image, wherein the display step comprises a display layout mode for laying out and displaying the current image sensing signal, and a signal obtained by playing back the image sensed at least before the current image in two directions with partial boundary regions thereof overlapping each other, and includes the selection step of selecting an arbitrary one of display regions laid out in the display layout mode.

An image processing apparatus according to the present invention is characterized by the following arrangement according to its fourth aspect.

That is, there is provided an image processing apparatus for recording a plurality of sensed images on a recording medium, and playing back and displaying the images, comprising: image sensing means for sensing an image; recording/playback means for recording and playing back the image sensed by the image sensing means; and display means for playing back and displaying an image sensed at least before a current image, wherein the display means comprises a display layout mode for laying out and displaying the current image sensing signal, and a signal obtained by playing back the image sensed at least before the current image in two directions with partial boundary regions thereof overlapping each other, and includes selection means for selecting an arbitrary one of display regions laid out in the display layout mode.

A storage medium according to the present invention is characterized by the following arrangement according to its first aspect.

That is, there is provided a storage medium which stores a control program for controlling an image processing apparatus for recording a plurality of sensed images on a recording medium, and playing back and displaying the images, the control program having control modules of the steps of: sensing an image; recording and playing back the sensed image; playing back and displaying an image sensed at least before a current image; and controlling to execute a plurality of display layout modes for displaying the current image sensing signal, and a signal obtained by playing back the image sensed at least before the current image with partial boundary regions thereof overlapping each other.

A storage medium according to the present invention is characterized by the following arrangement according to its second aspect.

That is, there is provided a storage medium which stores a control program for controlling an image processing apparatus for recording a plurality of sensed images on a recording medium, and playing back and displaying the images, the control program having control modules of the steps of: sensing an image; recording and playing back the sensed image; playing back and displaying an image sensed at least before a current image; and controlling to execute a display layout mode for laying out and displaying the current image sensing signal, and a signal obtained by playing back the image sensed at least before the current image in one direction with partial boundary regions thereof overlapping each other, and a function of reversing the layout direction in the one direction.

A storage medium according to the present invention is characterized by the following arrangement according to its third aspect.

That is, there is provided a storage medium which stores a control program for controlling an image processing apparatus for recording a plurality of sensed images on a recording medium, and playing back and displaying the images, the control program having control modules of the steps of: sensing an image; recording and playing back the sensed image; playing back and displaying an image sensed at least before a current image; and controlling to switch a first display layout mode for laying out and displaying the current image sensing signal, and a signal obtained by playing back the image sensed at least before the current image in one direction with partial boundary regions thereof overlapping each other, and a second display layout mode for laying out and displaying the signal obtained by playing back the image sensed at least before the current image, and a signal obtained by playing back an image sensed still before the signal in the one direction with partial boundary regions thereof overlapping each other.

A storage medium according to the present invention is characterized by the following arrangement according to its fourth aspect.

That is, there is provided a storage medium which stores a control program for controlling an image processing apparatus for recording a plurality of sensed images on a recording medium, and playing back and displaying the images, the control program having control modules of the steps of: sensing an image; recording and playing back the sensed image; playing back and displaying an image sensed at least before a current image; and controlling to select an arbitrary one of display regions laid out in a display layout mode for laying out and displaying the current image sensing signal, and a signal obtained by playing back the image sensed at least before the current image in two directions with partial boundary regions thereof overlapping each other.

An image processing apparatus according to the present invention is characterized by the following arrangement according to its fifth aspect.

That is, there is provided an image processing apparatus having a function of storing a plurality of sensed still images and/or moving images in storage means, comprising: image sensing means comprising an image sensing lens which can change a focal length; storage means for storing a plurality of images sensed by the image sensing means in association with each other; focal length change instruction means for outputting an instruction for changing the focal length of the image sensing lens; and control means for controlling to inhibit the focal length of the image sensing lens from changing upon reception of the instruction for changing the focal length of the image sensing lens from the focal length change instruction means after a first one of the plurality of images to be stored in the storage means in association with each other is sensed and stored.

An image processing apparatus according to the present invention is characterized by the following arrangement according to its sixth aspect.

That is, there is provided an image processing apparatus having a function of storing a plurality of sensed still images and/or moving images in storage means, comprising: image sensing means comprising an image sensing lens which can change a focal length; storage means for storing a plurality of images sensed by the image sensing means in association with each other; focal length change instruction means for outputting an instruction for changing the focal length of the image sensing lens; display means for displaying predetermined information on an external unit; and control means for controlling the display means to display alert information upon reception of the instruction for changing the focal length of the image sensing lens from the focal length change instruction means after a first one of the plurality of images to be stored in the storage means in association with each other is sensed and stored.

An image processing apparatus according to the present invention is characterized by the following arrangement according to its seventh aspect.

That is, there is provided an image processing apparatus having a function of storing a plurality of sensed still images and/or moving images in storage means, comprising: image sensing means comprising an image sensing lens which can change a focal length; storage means for storing a plurality of images sensed by the image sensing means in association with each other; focal length change instruction means for outputting an instruction for changing the focal length of the image sensing lens; display means for displaying predetermined information on an external unit; and control means for controlling the display means to display alert information and inhibiting the focal length of the image sensing lens from changing upon reception of the instruction for changing the focal length of the image sensing lens from the focal length change instruction means after a first one of the plurality of images to be stored in the storage means in association with each other is sensed and stored.

An image processing apparatus according to the present invention is characterized by the following arrangement according to its eighth aspect.

That is, there is provided an image processing apparatus having a function of storing a plurality of sensed still images and/or moving images in storage means, comprising: image sensing means comprising an image sensing lens which can change a focal length; storage means for storing a plurality of images sensed by the image sensing means in association with each other; focal length change instruction means for outputting an instruction for changing the focal length of the image sensing lens; and control means for controlling to start image sensing of a plurality of new images to be stored in association with each other upon reception of the instruction for changing the focal length of the image sensing lens from the focal length change instruction means after a first one of the plurality of images to be stored in the storage means in association with each other is sensed and stored.

An image processing apparatus according to the present invention is characterized by the following arrangement according to its ninth aspect.

That is, there is provided an image processing apparatus having a function of storing a plurality of sensed still images and/or moving images in storage means, comprising: image sensing means comprising an image sensing lens which can change a focal length; storage means for storing a plurality of images sensed by the image sensing means in association with each other; focal length change instruction means for outputting an instruction for changing the focal length of the image sensing lens; display means for displaying predetermined information on an external unit; and control means for controlling the display means to display alert information and then starting image sensing of a plurality of new images to be stored in association with each other upon reception of the instruction for changing the focal length of the image sensing lens from the focal length change instruction means after a first one of the plurality of images to be stored in the storage means in association with each other is sensed and stored.

An image processing apparatus according to the present invention is characterized by the following arrangement according to its tenth aspect.

That is, there is provided an image processing apparatus having a function of storing a plurality of sensed still images and/or moving images in storage means, comprising: image sensing means comprising an image sensing lens which can change a focal length; storage means for storing a plurality of images sensed by the image sensing means in association with each other; focal length change instruction means for outputting an instruction for changing the focal length of the image sensing lens; and control means for controlling to set the focal length of the image sensing lens at an initial value before sensing of a first one of the plurality of images to be stored in the storage means in association with each other is started.

A control method for an image processing apparatus according to the present invention is characterized by the following arrangement according to its first aspect.

That is, there is provided a control method for an image processing apparatus which comprises image sensing means comprising an image sensing lens which can change a focal length, storage means for storing a plurality of images sensed by the image sensing means in association with each other, and focal length change instruction means for outputting an instruction for changing the focal length of the image sensing lens, comprising the step of: inhibiting the focal length of the image sensing lens from changing upon reception of the instruction for changing the focal length of the image sensing lens from the focal length change instruction means after a first one of the plurality of images to be stored in the storage means in association with each other is sensed and stored.

A control method for an image processing apparatus according to the present invention is characterized by the following arrangement according to its second aspect.

That is, there is provided a control method for an image processing apparatus which comprises image sensing means comprising an image sensing lens which can change a focal length, storage means for storing a plurality of images sensed by the image sensing means in association with each other, focal length change instruction means for outputting an instruction for changing the focal length of the image sensing lens, and display means for displaying predetermined information on an external unit, comprising the step of: controlling the display means to display alert information upon reception of the instruction for changing the focal length of the image sensing lens from the focal length change instruction means after a first one of the plurality of images to be stored in the storage means in association with each other is sensed and stored.

A control method for an image processing apparatus according to the present invention is characterized by the following arrangement according to its third aspect.

That is, there is provided a control method for an image processing apparatus which comprises image sensing means comprising an image sensing lens which can change a focal length, storage means for storing a plurality of images sensed by the image sensing means in association with each other, focal length change instruction means for outputting an instruction for changing the focal length of the image sensing lens, and display means for displaying predetermined information on an external unit, comprising the step of: controlling the display means to display alert information and inhibiting the focal length of the image sensing lens from changing upon reception of the instruction for changing the focal length of the image sensing lens from the focal length change instruction means after a first one of the plurality of images to be stored in the storage means in association with each other is sensed and stored.

A control method for an image processing apparatus according to the present invention is characterized by the following arrangement according to its fourth aspect.

That is, there is provided a control method for an image processing apparatus which comprises image sensing means comprising an image sensing lens which can change a focal length, storage means for storing a plurality of images sensed by the image sensing means in association with each other, and focal length change instruction means for outputting an instruction for changing the focal length of the image sensing lens, comprising the step of: starting image sensing of a plurality of new images to be stored in association with each other upon reception of the instruction for changing the focal length of the image sensing lens from the focal length change instruction means after a first one of the plurality of images to be stored in the storage means in association with each other is sensed and stored.

A control method for an image processing apparatus according to the present invention is characterized by the following arrangement according to its fifth aspect.

That is, there is provided a control method for an image processing apparatus which comprises image sensing means comprising an image sensing lens which can change a focal length, storage means for storing a plurality of images sensed by the image sensing means in association with each other, focal length change instruction means for outputting an instruction for changing the focal length of the image sensing lens, and display means for displaying predetermined information on an external unit, comprising the step of: controlling the display means to display alert information and then starting image sensing of a plurality of new images to be stored in association with each other upon reception of the instruction for changing the focal length of the image sensing lens from the focal length change instruction means after a first one of the plurality of images to be stored in the storage means in association with each other is sensed and stored.

A control method for an image processing apparatus according to the present invention is characterized by the following arrangement according to its sixth aspect.

That is, there is provided a control method for an image processing apparatus which comprises image sensing means comprising an image sensing lens which can change a focal length, storage means for storing a plurality of images sensed by the image sensing means in association with each other, and focal length change instruction means for outputting an instruction for changing the focal length of the image sensing lens, comprising the step of: setting the focal length of the image sensing lens at an initial value before sensing of a first one of the plurality of images to be stored in the storage means in association with each other is started.

A storage medium according to the present invention is characterized by the following arrangement according to its fifth aspect.

That is, there is provided a storage medium that stores a control program for controlling an image processing apparatus which comprises image sensing means comprising an image sensing lens which can change a focal length, storage means for storing a plurality of images sensed by the image sensing means in association with each other, and focal length change instruction means for outputting an instruction for changing the focal length of the image sensing lens, the control program comprising a code of the step of: inhibiting the focal length of the image sensing lens from changing upon reception of the instruction for changing the focal length of the image sensing lens from the focal length change instruction means after a first one of the plurality of images to be stored in the storage means in association with each other is sensed and stored.

A storage medium according to the present invention is characterized by the following arrangement according to its sixth aspect.

That is, there is provided a storage medium that stores a control program for controlling an image processing apparatus which comprises image sensing means comprising an image sensing lens which can change a focal length, storage means for storing a plurality of images sensed by the image sensing means in association with each other, focal length change instruction means for outputting an instruction for changing the focal length of the image sensing lens, and display means for displaying predetermined information on an external unit, the control program comprising a code of the step of: controlling the display means to display alert information upon reception of the instruction for changing the focal length of the image sensing lens from the focal length change instruction means after a first one of the plurality of images to be stored in the storage means in association with each other is sensed and stored.

A storage medium according to the present invention is characterized by the following arrangement according to its seventh aspect.

That is, there is provided a storage medium that stores a control program for controlling an image processing apparatus which comprises image sensing means comprising an image sensing lens which can change a focal length, storage means for storing a plurality of images sensed by the image sensing means in association with each other, focal length change instruction means for outputting an instruction for changing the focal length of the image sensing lens, and display means for displaying predetermined information on an external unit, the control program comprising a code of the step of: controlling the display means to display alert information and inhibiting the focal length of the image sensing lens from changing upon reception of the instruction for changing the focal length of the image sensing lens from the focal length change instruction means after a first one of the plurality of images to be stored in the storage means in association with each other is sensed and stored.

A storage medium according to the present invention is characterized by the following arrangement according to its eighth aspect.

That is, there is provided a storage medium that stores a control program for controlling an image processing apparatus which comprises image sensing means comprising an image sensing lens which can change a focal length, storage means for storing a plurality of images sensed by the image sensing means in association with each other, and focal length change instruction means for outputting an instruction for changing the focal length of the image sensing lens, the control program comprising a code of the step of: starting image sensing of a plurality of new images to be stored in association with each other upon reception of the instruction for changing the focal length of the image sensing lens from the focal length change instruction means after a first one of the plurality of images to be stored in the storage means in association with each other is sensed and stored.

A storage medium according to the present invention is characterized by the following arrangement according to its ninth aspect.

That is, there is provided a storage medium that stores a control program for controlling an image processing apparatus which comprises image sensing means comprising an image sensing lens which can change a focal length, storage means for storing a plurality of images sensed by the image sensing means in association with each other, focal length change instruction means for outputting an instruction for changing the focal length of the image sensing lens, and display means for displaying predetermined information on an external unit, the control program comprising a code of the step of: controlling the display means to display alert information and then starting image sensing of a plurality of new images to be stored in association with each other upon reception of the instruction for changing the focal length of the image sensing lens from the focal length change instruction means after a first one of the plurality of images to be stored in the storage means in association with each other is sensed and stored.

A storage medium according to the present invention is characterized by the following arrangement according to its tenth aspect.

That is, there is provided a storage medium that stores a control program for controlling an image processing apparatus which comprises image sensing means comprising an image sensing lens which can change a focal length, storage means for storing a plurality of images sensed by the image sensing means in association with each other, and focal length change instruction means for outputting an instruction for changing the focal length of the image sensing lens, the control program comprising a code of the step of: setting the focal length of the image sensing lens at an initial value before sensing of a first one of the plurality of images to be stored in the storage means in association with each other is started.

An image processing apparatus according to the present invention is characterized by the following arrangement according to its eleventh aspect.

That is, there is provided an image processing apparatus having a function of storing a plurality of sensed still images and/or moving images in storage means, comprising: a detachable lens unit; image sensing means for sensing an object image formed by the lens unit; storage means for storing a plurality of images sensed by the image sensing means in association with each other; detection means for detecting attachment/detachment of the lens unit; display means for displaying predetermined information on an external unit; and control means for controlling the display means to display alert information when the detection means detects detachment of the lens unit after a first one of the plurality of images to be stored in the storage means in association with each other is sensed and stored.

An image processing apparatus according to the present invention is characterized by the following arrangement according to its twelfth aspect.

That is, there is provided an image processing apparatus having a function of storing a plurality of sensed still images and/or moving images in storage means, comprising: a detachable lens unit; image sensing means for sensing an object image formed by the lens unit; storage means for storing a plurality of images sensed by the image sensing means in association with each other; detection means for detecting attachment/detachment of the lens unit; and control means for controlling to start sensing of a plurality of new images to be stored in association with each other when the detection means detects detachment of the lens unit after a first one of the plurality of images to be stored in the storage means in association with each other is sensed and stored.

An image processing apparatus according to the present invention is characterized by the following arrangement according to its thirteenth aspect.

That is, there is provided an image processing apparatus having a function of storing a plurality of sensed still images and/or moving images in storage means, comprising: a detachable lens unit; image sensing means for sensing an object image formed by the lens unit; storage means for storing a plurality of images sensed by the image sensing means in association with each other; detection means for detecting attachment/detachment of the lens unit; display means for displaying predetermined information on an external unit; and control means for controlling the display means to display alert information and then starting sensing of a plurality of new images to be stored in association with each other when the detection means detects detachment of the lens unit after a first one of the plurality of images to be stored in the storage means in association with each other is sensed and stored.

An image processing apparatus according to the present invention is characterized by the following arrangement according to its fourteenth aspect.

That is, there is provided an image processing apparatus having a function of storing a plurality of sensed still images and/or moving images in storage means, comprising: a detachable lens unit; image sensing means for sensing an object image formed by the lens unit; storage means for storing a plurality of images sensed by the image sensing means in association with each other; instruction means for instructing attachment/detachment of the lens unit; and control means for controlling to inhibit the lens unit from being detached when the instruction means outputs an instruction for detaching the lens unit after a first one of the plurality of images to be stored in the storage means in association with each other is sensed and stored.

An image processing apparatus according to the present invention is characterized by the following arrangement according to its fifteenth aspect.

That is, there is provided an image processing apparatus having a function of storing a plurality of sensed still images and/or moving images in storage means, comprising: a detachable lens unit; image sensing means for sensing an object image formed by the lens unit; storage means for storing a plurality of images sensed by the image sensing means in association with each other; instruction means for instructing attachment/detachment of the lens unit; display means for displaying predetermined information on an external unit; and control means for controlling the display means to display alert information and inhibiting the lens unit from being detached when the instruction means outputs an instruction for detaching the lens unit after a first one of the plurality of images to be stored in the storage means in association with each other is sensed and stored.

An image processing apparatus according to the present invention is characterized by the following arrangement according to its sixteenth aspect.

That is, there is provided an image processing apparatus having a function of storing a plurality of sensed still images and/or moving images in storage means, comprising: a detachable lens unit; image sensing means for sensing an object image formed by the lens unit; storage means for storing a plurality of images sensed by the image sensing means in association with each other; instruction means for instructing attachment/detachment of the lens unit; and control means for controlling to permit detachment of the lens unit when the instruction means outputs an instruction for detaching the lens unit before a first one of the plurality of images to be stored in the storage means in association with each other is sensed and stored, and for controlling to inhibit the lens unit from being detached when the instruction means outputs an instruction for detaching the lens unit after a first one of the plurality of images to be stored in the storage means in association with each other is sensed and stored.

An image processing apparatus according to the present invention is characterized by the following arrangement according to its seventeenth aspect.

That is, there is provided an image processing apparatus having a function of storing a plurality of sensed still images and/or moving images in storage means, comprising: a detachable lens unit having nonvolatile storage means; image sensing means for sensing an object image formed by the lens unit; storage means for storing a plurality of images sensed by the image sensing means in association with each other; instruction means for instructing attachment/detachment of the lens unit; and control means for controlling to permit detachment of the lens unit after information pertaining to an operation state of the lens unit is stored in the nonvolatile storage means, when the instruction means outputs an instruction for detaching the lens unit, and for reading out information pertaining to a use state of the lens unit stored in the nonvolatile storage means and re-setting an operation state of the image processing apparatus in accordance with the readout information, when the lens unit is attached again.

An image processing apparatus according to the present invention is characterized by the following arrangement according to its eighteenth aspect.

That is, there is provided an image processing apparatus having a function of storing a plurality of sensed still images and/or moving images in storage means, comprising: a detachable lens unit having nonvolatile storage means; image sensing means for sensing an object image formed by the lens unit; storage means for storing a plurality of images sensed by the image sensing means in association with each other; instruction means for instructing attachment/detachment of the lens unit; and control means for controlling to permit detachment of the lens unit after information pertaining to an operation state of the lens unit and user information are stored in the nonvolatile storage means, when the instruction means outputs an instruction for detaching the lens unit, and for reading out information pertaining to a use state of the lens unit and the user information stored in the nonvolatile storage means and re-setting an operation state of the image processing apparatus in accordance with the readout information in unit of users, when the lens unit is attached again.

A control method for an image processing apparatus according to the present invention is characterized by the following arrangement according to its seventh aspect.

That is, there is provided a control method for an image processing apparatus which comprises a detachable lens unit, image sensing means for sensing an object image formed by the lens unit, storage means for storing a plurality of images sensed by the image sensing means in association with each other, detection means for detecting attachment/detachment of the lens unit, and display means for displaying predetermined information on an external unit, comprising the step of: controlling the display means to display alert information when the detection means detects detachment of the lens unit after a first one of the plurality of images to be stored in the storage means in association with each other is sensed and stored.

A control method for an image processing apparatus according to the present invention is characterized by the following arrangement according to its eighth aspect.

That is, there is provided a control method for an image processing apparatus which comprises a detachable lens unit, image sensing means for sensing an object image formed by the lens unit, storage means for storing a plurality of images sensed by the image sensing means in association with each other, and detection means for detecting attachment/detachment of the lens unit, comprising the step of: starting sensing of a plurality of new images to be stored in association with each other when the detection means detects detachment of the lens unit after a first one of the plurality of images to be stored in the storage means in association with each other is sensed and stored.

A control method for an image processing apparatus according to the present invention is characterized by the following arrangement according to its ninth aspect.

That is, there is provided a control method for an image processing apparatus which comprises a detachable lens unit, image sensing means for sensing an object image formed by the lens unit, storage means for storing a plurality of images sensed by the image sensing means in association with each other, detection means for detecting attachment/detachment of the lens unit, and display means for displaying predetermined information on an external unit, comprising the step of: controlling the display means to display alert information and then starting sensing of a plurality of new images to be stored in association with each other when the detection means detects detachment of the lens unit after a first one of the plurality of images to be stored in the storage means in association with each other is sensed and stored.

A control method for an image processing apparatus according to the present invention is characterized by the following arrangement according to its tenth aspect.

That is, there is provided a control method for an image processing apparatus which comprises a detachable lens unit, image sensing means for sensing an object image formed by the lens unit, storage means for storing a plurality of images sensed by the image sensing means in association with each other, and instruction means for instructing attachment/detachment of the lens unit, comprising the step of: inhibiting the lens unit from being detached when the instruction means outputs an instruction for detaching the lens unit after a first one of the plurality of images to be stored in the storage means in association with each other is sensed and stored.

A control method for an image processing apparatus according to the present invention is characterized by the following arrangement according to its eleventh aspect.

That is, there is provided a control method for an image processing apparatus which comprises a detachable lens unit, image sensing means for sensing an object image formed by the lens unit, storage means for storing a plurality of images sensed by the image sensing means in association with each other, instruction means for instructing attachment/detachment of the lens unit, and display means for displaying predetermined information on an external unit, comprising the step of: controlling the display means to display alert information and inhibiting the lens unit from being detached when the instruction means outputs an instruction for detaching the lens unit after a first one of the plurality of images to be stored in the storage means in association with each other is sensed and stored.

A control method for an image processing apparatus according to the present invention is characterized by the following arrangement according to its twelfth aspect.

That is, there is provided a control method for an image processing apparatus which comprises a detachable lens unit, image sensing means for sensing an object image formed by the lens unit, storage means for storing a plurality of images sensed by the image sensing means in association with each other, and instruction means for instructing attachment/detachment of the lens unit, comprising the step of: permitting detachment of the lens unit when the instruction means outputs an instruction for detaching the lens unit before a first one of the plurality of images to be stored in the storage means in association with each other is sensed and stored, and inhibiting the lens unit from being detached when the instruction means outputs an instruction for detaching the lens unit after a first one of the plurality of images to be stored in the storage means in association with each other is sensed and stored.

A control method for an image processing apparatus according to the present invention is characterized by the following arrangement according to its thirteenth aspect.

That is, there is provided a control method for an image processing apparatus which comprises a detachable lens unit having nonvolatile storage means, image sensing means for sensing an object image formed by the lens unit, storage means for storing a plurality of images sensed by the image sensing means in association with each other, and instruction means for instructing attachment/detachment of the lens unit, comprising the step of: permitting detachment of the lens unit after information pertaining to an operation state of the lens unit is stored in the nonvolatile storage means, when the instruction means outputs an instruction for detaching the lens unit, and reading out information pertaining to a use state of the lens unit stored in the nonvolatile storage means and re-setting an operation state of the image processing apparatus in accordance with the readout information, when the lens unit is attached again.

A control method for an image processing apparatus according to the present invention is characterized by the following arrangement according to its fourteenth aspect.

That is, there is provided a control method for an image processing apparatus which comprises a detachable lens unit having nonvolatile storage means, image sensing means for sensing an object image formed by the lens unit, storage means for storing a plurality of images sensed by the image sensing means in association with each other, and instruction means for instructing attachment/detachment of the lens unit, comprising the step of: permitting detachment of the lens unit after information pertaining to an operation state of the lens unit and user information are stored in the nonvolatile storage means, when the instruction means outputs an instruction for detaching the lens unit, and reading out information pertaining to a use state of the lens unit and the user information stored in the nonvolatile storage means and re-setting an operation state of the image processing apparatus in accordance with the readout information in unit of users, when the lens unit is attached again.

A storage medium according to the present invention is characterized by the following arrangement according to its eleventh aspect.

That is, there is provided a storage medium that stores a control program for controlling an image processing apparatus which comprises a detachable lens unit, image sensing means for sensing an object image formed by the lens unit, storage means for storing a plurality of images sensed by the image sensing means in association with each other, detection means for detecting attachment/detachment of the lens unit, and display means for displaying predetermined information on an external unit, the control program comprising a code of the step of: controlling the display means to display alert information when the detection means detects detachment of the lens unit after a first one of the plurality of images to be stored in the storage means in association with each other is sensed and stored.

A storage medium according to the present invention is characterized by the following arrangement according to its twelfth aspect.

That is, there is provided a storage medium that stores a control program for controlling an image processing apparatus which comprises a detachable lens unit, image sensing means for sensing an object image formed by the lens unit, storage means for storing a plurality of images sensed by the image sensing means in association with each other, and detection means for detecting attachment/detachment of the lens unit, the control program comprising a code of the step of: starting sensing of a plurality of new images to be stored in association with each other when the detection means detects detachment of the lens unit after a first one of the plurality of images to be stored in the storage means in association with each other is sensed and stored.

A storage medium according to the present invention is characterized by the following arrangement according to its thirteenth aspect.

That is, there is provided a storage medium that stores a control program for controlling an image processing apparatus which comprises a detachable lens unit, image sensing means for sensing an object image formed by the lens unit, storage means for storing a plurality of images sensed by the image sensing means in association with each other, detection means for detecting attachment/detachment of the lens unit, and display means for displaying predetermined information on an external unit, the control program comprising a code of the step of: controlling the display means to display alert information and then starting sensing of a plurality of new images to be stored in association with each other when the detection means detects detachment of the lens unit after a first one of the plurality of images to be stored in the storage means in association with each other is sensed and stored.

A storage medium according to the present invention is characterized by the following arrangement according to its fourteenth aspect.

That is, there is provided a storage medium that stores a control program for controlling an image processing apparatus which comprises a detachable lens unit, image sensing means for sensing an object image formed by the lens unit, storage means for storing a plurality of images sensed by the image sensing means in association with each other, and instruction means for instructing attachment/detachment of the lens unit, the control program comprising a code of the step of: inhibiting the lens unit from being detached when the instruction means outputs an instruction for detaching the lens unit after a first one of the plurality of images to be stored in the storage means in association with each other is sensed and stored.

A storage medium according to the present invention is characterized by the following arrangement according to its fifteenth aspect.

That is, there is provided a storage medium that stores a control program for controlling an image processing apparatus which comprises a detachable lens unit, image sensing means for sensing an object image formed by the lens unit, storage means for storing a plurality of images sensed by the image sensing means in association with each other, instruction means for instructing attachment/detachment of the lens unit, and display means for displaying predetermined information on an external unit, the control program comprising a code of the step of: controlling the display means to display alert information and inhibiting the lens unit from being detached when the instruction means outputs an instruction for detaching the lens unit after a first one of the plurality of images to be stored in the storage means in association with each other is sensed and stored.

A storage medium according to the present invention is characterized by the following arrangement according to its sixteenth aspect.

That is, there is provided a storage medium that stores a control program for controlling an image processing apparatus which comprises a detachable lens unit, image sensing means for sensing an object image formed by the lens unit, storage means for storing a plurality of images sensed by the image sensing means in association with each other, and instruction means for instructing attachment/detachment of the lens unit, the control program comprising a code of the step of: permitting detachment of the lens unit when the instruction means outputs an instruction for detaching the lens unit before a first one of the plurality of images to be stored in the storage means in association with each other is sensed and stored, and inhibiting the lens unit from being detached when the instruction means outputs an instruction for detaching the lens unit after a first one of the plurality of images to be stored in the storage means in association with each other is sensed and stored.

A storage medium according to the present invention is characterized by the following arrangement according to its seventeenth aspect.

That is, there is provided a storage medium that stores a control program for controlling an image processing apparatus which comprises a detachable lens unit having nonvolatile storage means, image sensing means for sensing an object image formed by the lens unit, storage means for storing a plurality of images sensed by the image sensing means in association with each other, and instruction means for instructing attachment/detachment of the lens unit, the control program comprising a code of the step of: permitting detachment of the lens unit after information pertaining to an operation state of the lens unit is stored in the nonvolatile storage means, when the instruction means outputs an instruction for detaching the lens unit, and reading out information pertaining to a use state of the lens unit stored in the nonvolatile storage means and re-setting an operation state of the image processing apparatus in accordance with the readout information, when the lens unit is attached again.

A storage medium according to the present invention is characterized by the following arrangement according to its eighteenth aspect.

That is, there is provided a storage medium that stores a control program for controlling an image processing apparatus which comprises a detachable lens unit having nonvolatile storage means, image sensing means for sensing an object image formed by the lens unit, storage means for storing a plurality of images sensed by the image sensing means in association with each other, and instruction means for instructing attachment/detachment of the lens unit, the control program comprising a code of the step of: permitting detachment of the lens unit after information pertaining to an operation state of the lens unit and user information are stored in the nonvolatile storage means, when the instruction means outputs an instruction for detaching the lens unit, and reading out information pertaining to a use state of the lens unit and the user information stored in the nonvolatile storage means and re-setting an operation state of the image processing apparatus in accordance with the readout information in unit of users, when the lens unit is attached again.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7 is a flow chart of a display image process routine of the image processing apparatus;

FIG. 8 is a flow chart of a compression process routine of the image processing apparatus;

FIG. 9 is an explanatory view of a panoramic image sensing mode setup window of the image processing apparatus;

DETAILED DESCRIPTION OF THE PREFERRED EMBODIMENTS

The preferred embodiments of the present invention will be described in detail hereinafter with reference to the accompanying drawings.

First Embodiment

Figure 1:
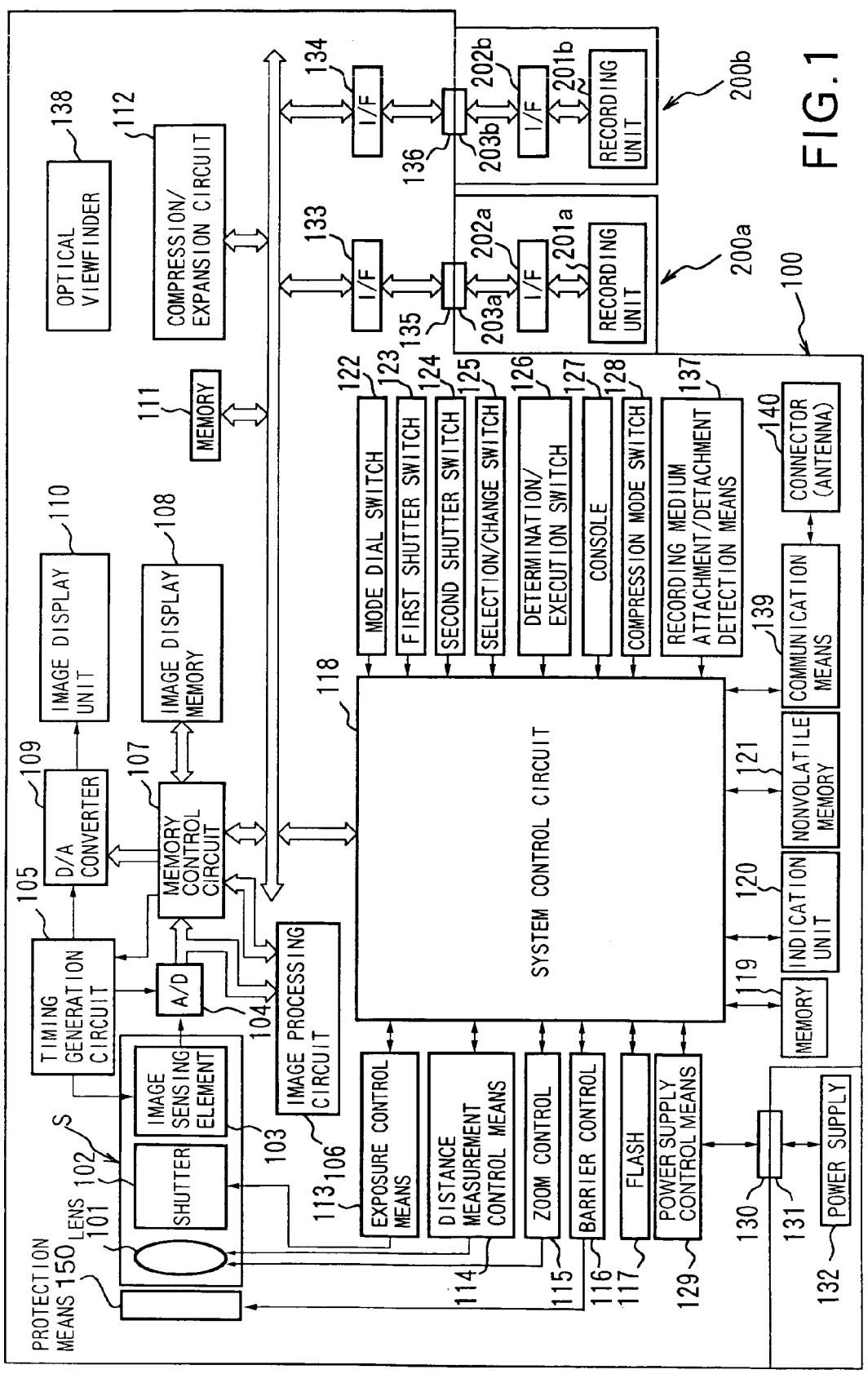
FIG. 1 is a block diagram showing the arrangement of an image processing apparatus according to the first embodiment of the present invention.

FIG. 1 is a block diagram showing the arrangement of an image processing apparatus according to the first embodiment. Referring to FIG. 1, reference numeral 100 denotes an image processing apparatus; and 101, a photographing lens used for sensing an object image. Reference numeral 102 denotes a shutter with a stop function. Reference numeral 103 denotes an image sensing element for converting an optical image into an electrical signal. Reference numeral 104 denotes an A/D converter for converting an analog signal output from the image sensing element 103 into a digital signal. Reference numeral 105 denotes a timing generation circuit for supplying clock signals and control signals to the image sensing element 103, the A/D converter 104, and a D/A converter 109 (to be described later). The timing generation circuit 105 is controlled by a memory control circuit 107 and system control circuit 118 (to be described later).

Reference numeral 106 denotes an image processing circuit which performs predetermined pixel interpolation and color conversion for data supplied from the A/D converter 104 or the memory control circuit 107 (to be described later). The image processing circuit 106 makes a predetermined computation using sensed image data to execute a TTL (Through The Lens) AF (auto focus) process, AE (auto exposure) process, and EF (flash pre-emission) process in which the system control circuit 118 controls an exposure control means 113 and distance measurement control means 114 (to be described later) on the basis of the obtained computation result. Furthermore, the image processing circuit 106 makes a predetermined computation using sensed image data, and executes a TTL AWB (auto white balance) process on the basis of the obtained computation result.

Reference numeral 107 denotes the memory control circuit, which controls the A/D converter 104, the timing generation circuit 105, the image processing circuit 106, an image display unit 110 (to be described later), the D/A converter 109 (to be described later), a memory 111 (to be described later), and a compression/expansion circuit 32 (to be described later). Data output from the A/D converter 104 is written in an image display memory 108 or memory 111 (to be described later) via the image processing circuit 106 and memory control circuit 107 or directly via the memory control circuit 107.

Reference numeral 108 denotes the image display memory. Reference numeral 109 denotes the D/A converter for converting a digital signal into an analog signal. Reference numeral 110 denotes the image display unit comprising a TFT-LCD (thin film transistor liquid crystal display) or the like. Display image data written in the image display memory 108 is displayed by the image display unit 110 via the D/A converter 109. When sensed image data are displayed at image sensing timings using the image display unit 110, an electronic viewfinder function can be implemented. The image display unit 110 can arbitrarily turn on/off its display in response to an instruction from the system control circuit 118 (to be described later). When the display is turned off, consumption power of the image processing apparatus 100 can be greatly reduced.

Reference numeral 111 denotes the memory for storing a still image and moving image. The memory 111 has a storage capacity large enough to store a predetermined number of still images or a moving image for a predetermined period of time. With this arrangement, even in a continuous or panoramic image sensing mode for continuously sensing a plurality of still images, many images can be written in the memory 111 at high speed. Also, the memory 111 can be used as a work area of the system control circuit 118 (to be described later).

Reference numeral 112 denotes the compression/expansion circuit for compressing/expanding image data by adaptive discrete cosine transformation (ADCT) or the like. The compression/expansion circuit 112 reads an image stored in the memory 111, compresses or expands it, and writes the processed data in the memory 111. Reference numeral 113 denotes the exposure control means for controlling the shutter 102. The exposure control means 113 also has a flash light control function in cooperation with an electronic flash 117 (to be described later). Reference numeral 114 denotes the distance measurement control means for controlling focusing of the photographing lens 101. Reference numeral 115 denotes a zoom control means for controlling zooming. Reference numeral 116 denotes a barrier control means for controlling operation of a protection means (to be described later) serving as a barrier. Reference numeral 117 denotes the electronic flash which has a function of projecting AF auxiliary light and the flash light control function.

The exposure control means 113 and distance measurement control means 114 are controlled using TTL, and the system control circuit 118 controls the exposure control means 113 and distance measurement control means 114 on the basis of the computation result of the image processing circuit 106 using sensed image data.

Reference numeral 118 denotes the system control circuit for controlling the overall image processing apparatus 100. Reference numeral 119 denotes a memory for storing constants, variables, programs, and the like for operations of the system control circuit 118. Reference numeral 120 denotes an indication unit which includes a liquid crystal display device, loudspeaker, and the like for indicating operation states, messages, and the like using characters, images, voices, and the like in accordance with execution of a program by the system control circuit 118. The indication unit 120 is placed at one or a plurality of easy-to-see positions around the console of the image processing apparatus 100, and is comprised of a combination of an LCD (liquid crystal display device), LEDs (light-emitting diodes), tone generation element, and the like. Some functions of the indication unit 120 are placed within an optical viewfinder 138.

Of the indication contents of the indication unit 120, those indicated on an LCD or the like include, e.g., a single shot/continuous shot indication, self-timer indication, compression ratio indication, recording pixel count indication, recording image count indication, remaining photographable image count indication, shutter speed indication, aperture value indication, exposure correction indication, flash indication, red-eye suppression indication, macro-image sensing indication, buzzer setting indication, timepiece battery remaining capacity indication, error indication, information indication using numerals having a plurality of digits, attached/detached state indication of recording media 200a and 200b, communication I/F operation indication, date/time indication, indication that indicates a connection state with an external computer, and the like.

Of the indication contents of the indication unit 120, those indicated within the optical viewfinder 138 include, e.g., an in-focus indication, image sensing ready indication, camera shake alert indication, flash charging indication, flash charging completion indication, shutter speed indication, aperture value indication, exposure correction indication, recording medium write access indication, and the like.

Furthermore, of the indication contents of the indication unit 120, those indicated by LEDs or the like include, e.g., in-focus indication, image sensing ready indication, camera shake alert indication, flash charging indication, flash charging completion indication, recording medium write access indication, macro-image sensing setting notification indication, secondary battery charged state indication, and the like.

Of the indication contents of the indication unit 120, those to be indicated by lamps include, e.g., a self-timer notification lamp, and the like. The self-timer notification lamp may be commonly used as that for emitting AF auxiliary light.

Reference numeral 121 denotes a rewritable nonvolatile memory, which uses, e.g., an EEPROM (electrically erasable and programmable read only memory).

Reference numerals 122, 123, 124, 125, 126, 127, and 128 denote operation means for inputting various operation instructions of the system control circuit 118. These operation means are constructed by one or a plurality of combinations of a switch, a dial, a touch panel, a pointer using line of sight detection, a voice recognition device, and the like.

Examples of these operation means 122 to 128 will be explained below.

Reference numeral 122 denotes a mode dial switch, which can select various function mode positions such as power OFF, automatic image sensing mode, image sensing mode, panoramic image sensing mode, playback mode, multi-frame playback/erase mode, PC (personal computer connection mode, and the like.

Reference numeral 123 denotes a first shutter switch, which is turned at the half stroke position of a shutter button (not shown), and instructs start of an AF (auto focus) process, AE (auto exposure) process, AWB (auto white balance) process, EF (flash pre-emission) process, and the like.

Reference numeral 124 denotes a second shutter switch, which is turned on upon completion of operation of the shutter button (not shown), and instructs start of a series of processes including an exposure process for writing a signal read out from the image sensing element 103 as image data in the memory 111 via the A/D converter 104 and memory control circuit 107, a development process using computation results in the image processing circuit 106 and memory control circuit 107, and a recording process for reading out image data from the memory 111, compressing the readout data by the compression/expansion circuit 112, and writing the compressed image data in the recording medium 200a or 200b.

Reference numeral 125 denotes selection/change switch that can select and change various functions upon executing image sensing and playback in, e.g., the panoramic mode.

Reference numeral 126 denotes a determination/execution switch which can determine and execute various functions upon executing image sensing and playback in, e.g., the panoramic mode.

Reference numeral 127 denotes a console including various buttons, touch panel, and the like, which include a menu button, set button, macro button, multi-frame playback new page button, flash setting button, single shot/continuous shot/self-timer switch button, menu movement+(plus) button, menu movement−(minus) button, playback image movement+(plus) button, playback image movement−(minus) button, sensed image quality selection button, exposure correction button, date/time setting button, image display ON/OFF button for turning on/off the image display unit 110, quick review ON/OFF setting button for setting a quick review function of automatically playing back sensed image data on the image display unit 110 immediately after image sensing, and the like.

Reference numeral 128 denotes a compression mode switch which is used for selecting the compression ratio of JPEG compression or selecting a CCDRAW mode for directly recording a signal output from the image sensing element 103 and converted into a digital signal on the recording medium 200a or 200b (to be described later.

The JPEG compression mode includes, e.g., a normal mode and fine mode. In the JPEG compression mode, image data, which is read out from the image sensing element 103 and is written in the memory 111 via the A/D converter 104, image processing circuit 106, and memory control circuit 107, is read out, and is compressed at the selected compression ratio by the compression/expansion circuit 112. After that, the compressed image data is recorded on the recording medium 200a or 200b.

In the CCDRAW mode, image data, which is directly read out in units of lines in correspondence with the pixel formats of color filters of the image sensing element 103, and is written in the memory 111 via the A/D converter 104 and memory control circuit 107, is read out, and is recorded on the recording medium 200a or 200b.

Reference numeral 129 denotes a power supply control means, which is comprised of a battery detection circuit, a DC—DC converter, a switch circuit for switching a block to be energized, and the like. The power supply control means 129 detects the presence/absence, type, and remaining battery amount of a battery attached, controls the DC—DC converter on the basis of such detection results and an instruction from the system control circuit 118, and supplies a required voltage to the respective units including the recording media 200a and 200b for a required period of time.

Reference numerals 130 and 131 denote connectors for connecting the power supply means 129 and a power supply 132 (to be described below). Reference numeral 132 denotes the power supply, which includes a primary battery such as an alkali battery, lithium battery, or the like, a secondary battery such as an NiCd battery, NiMH battery, Li Battery, or the like, an AC adapter, and the like. Reference numerals 133 and 134 denote interfaces (I/Fs) with recording media 200a and 200b (to be described later); and 135 and 136, connectors for connecting the interfaces (I/Fs) with the recording media 200a and 200b (to be described later).

Reference numeral 137 denotes a recording medium attachment/detachment detection means for detecting whether or not the recording medium 200a or 200b (to be described later) is attached to the connector 135 or 136. The recording medium attachment/detachment detection means 137 can also detect whether or not one of devices other than the recording medium 200a or 2001b (to be described later) such as various communication cards, and the like (to be described later) is attached. Note that this embodiment has two sets of interfaces and connectors that receive the recording media 200a and 200b. Of course, the number of sets of interfaces and connectors that receive the recording media is not particularly limited.

Also, combinations of interfaces and connectors of different standards may be used. As the interface and connector, those complying with the standards of a PCMCIA card, CF (compact flash) card, and the like may be used.

Furthermore, when the interfaces 133 and 134, and connectors 135 and 136 use those complying with the standards of a PCMCIA card, CF (compact flash) card, and the like, various communication cards such as a LAN card, modem card, USB card, IEEE1394 card, P1284 card, SCSI card, PHS, and the like are connected thereto, image data and associated management information can be transferred between the image processing apparatus 100 and an external computer or its peripheral devices such as a printer and the like.

Reference numeral 150 denotes the protection means serving as a barrier which covers an image sensing unit S including the photographing lens 101 of the image processing apparatus 100 to protect it from contamination and damages. Reference numeral 138 denotes the optical viewfinder, which allows image sensing using the optical viewfinder alone without using the electronic viewfinder function implemented by the image display unit 110. In the optical viewfinder 138, some functions of the indication unit 120, e.g., an in-focus indication, camera shake alert indication, flash charging indication, shutter speed indication, aperture value indication, exposure correction indication, and the like are placed.

Reference numeral 139 denotes a communication means having various communication functions such as RS232C, USB, IEEE1394, P1284, SCSI, modem, LAN, radio communication, and the like. Reference numeral 140 denotes a connector or antenna, which serves as a connector when the image processing apparatus 100 is connected to another device using the communication means 139, or serves as an antenna in case of radio communications.

Reference numerals 200a and 200b denote the recording media such as a memory card, hard disk, or the like. The recording media 200a and 200b respectively comprise recording units 201a and 201b each comprised of a semiconductor memory, magnetic disk, or the like, interfaces (I/Fs) 202a and 202b with the image processing apparatus 100, and connectors 203a and 203b for connecting the image processing apparatus 100.

The operation of the image processing apparatus 100 according to this embodiment with the aforementioned arrangement will be explained below using FIGS. 2 to 8.

Figure 2:
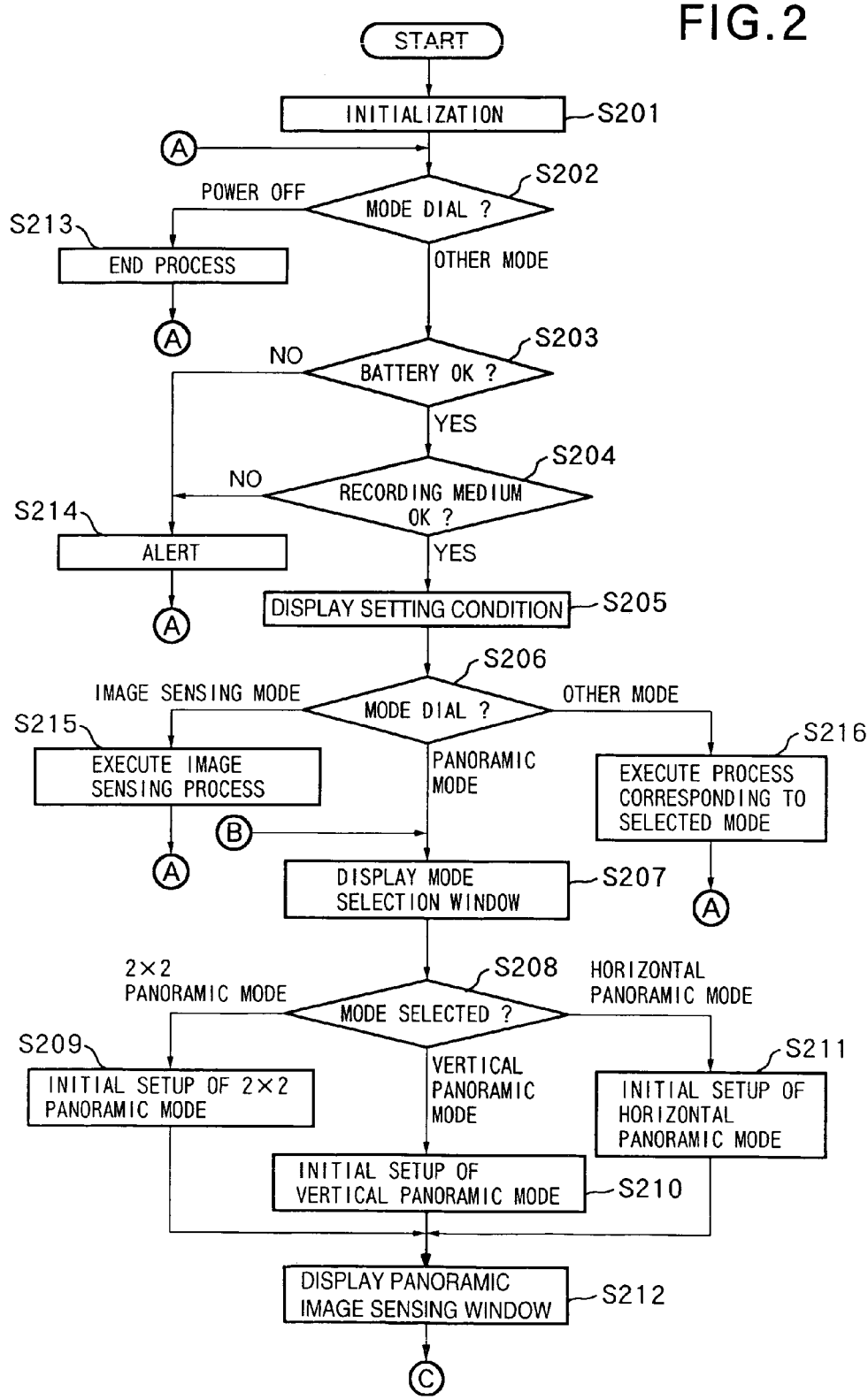
FIG. 2 is a flow chart of a main routine of the image processing apparatus according to the first embodiment.
Figure 3:
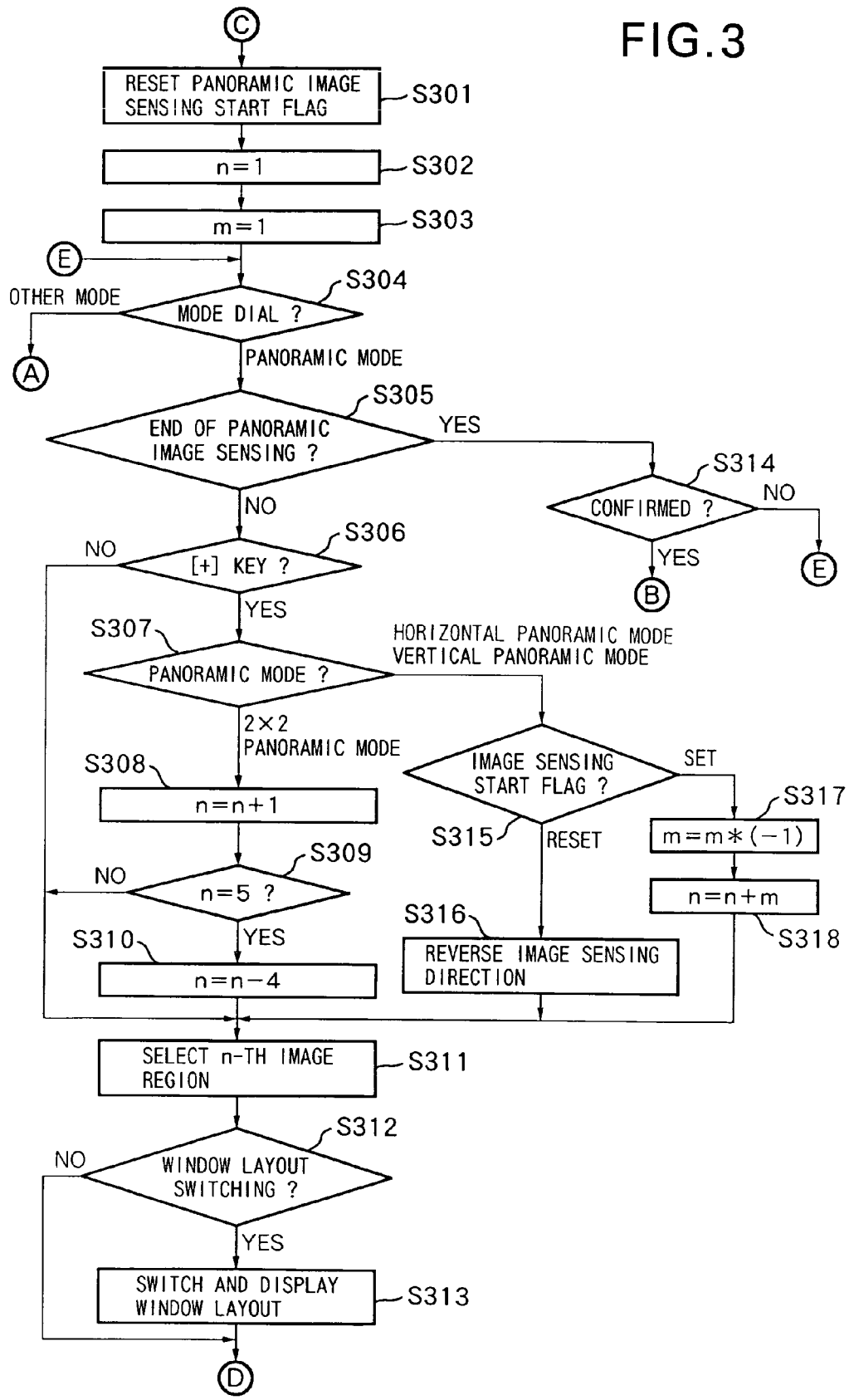
FIG. 3 is a flow chart of the main routine of the image processing apparatus according to the first embodiment.
Figure 4:
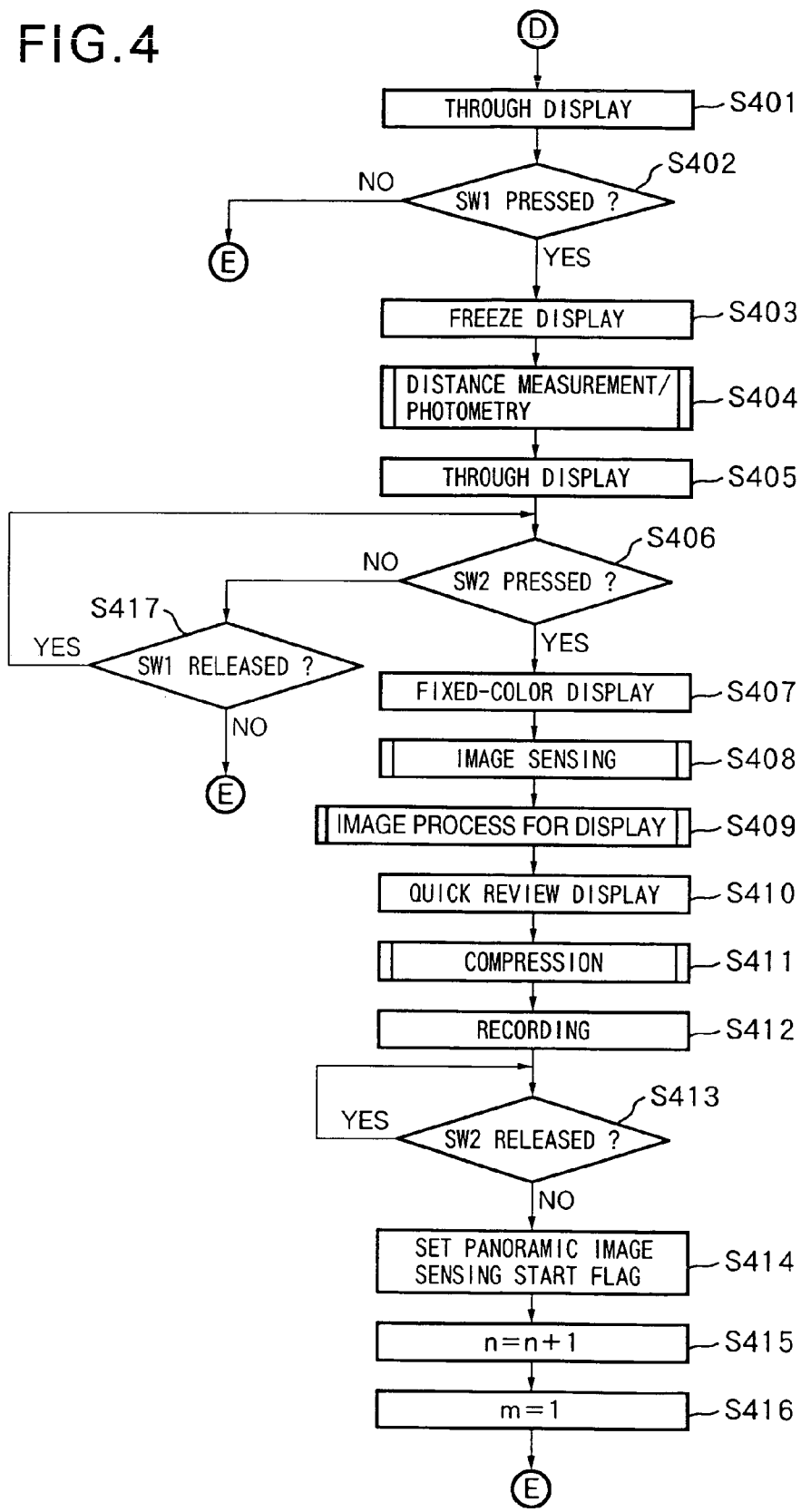
FIG. 4 is a flow chart of the main routine of the image processing apparatus according to the first embodiment.

FIGS. 2 to 4 are flow charts showing the main routine of the image processing apparatus 100 according to this embodiment.

The operation will be explained first using FIGS. 2 to 4.

Upon power ON after battery exchange or the like, the system control circuit 118 initializes flags, control variables, and the like and also initializes (initially sets up) the respective units of the image processing apparatus 100 in step S201 in FIG. 2. In step S202, the system control circuit 118 checks the setting position of the mode dial switch 122. If the mode dial switch 122 is set at a power OFF position, the system control circuit 118 executes a predetermined process in step S213. More specifically, the system control circuit 118 changes the indications of the respective indication units to an end state, protects the image sensing unit S by closing the barrier of the protection means 150, records required parameters and setting values including flags, control variables, and the like, and the setting mode in the nonvolatile memory 121, cuts off unnecessary power supply to the respective units of the image processing apparatus 100 including the image display unit 110 by the power supply control means 129, and so forth. After that, the flow returns to step S202.

If it is determined in step S202 that the mode dial switch 122 is set at any of other mode positions, the system control circuit 118 checks using the power supply control means 129 in step S203 if the remaining capacity and operation state of the power supply 132 comprising batteries and the like pose any problem in the operation of the image processing apparatus 100. If any problem is found, a predetermined alert indication is made by means of an image or voice using the indication unit 120 in step S214, and the flow then returns to step S202.

If no problem is found in step S203, the system control circuit 118 checks in step S204 if the operation state of the recording medium 200a or 200b poses any problem in the operation of the image processing apparatus 100, in particular, recording/playback of image data to/from the recording medium 200a or 200b. If any problem is found, a predetermined alert indication is made by means of an image or voice using the indication unit 120 in step S214, and the flow then returns to step S202.

If no problem is found in step S204, various setting states of the image display apparatus 100 are indicated by means of an image or voice using the indication unit 120 in step S205. When the image display of the image display unit 110 is ON, various setting states of the image display apparatus 100 are indicated by means of an image or voice also using the image display unit 110.

The setting position of the mode dial switch 122 is then checked in step S206. If the mode dial switch 122 is set at an image sensing mode position, a predetermined image sensing process is executed in step S215, and the flow then returns to step S202. If the mode dial switch 122 is set at any of other mode positions, the system control circuit 118 executes a process corresponding to the selected (set) mode in step S216, and the flow returns to step S202. Furthermore, if the mode dial switch 122 is set at a panoramic mode position, the system control circuit 118 displays a panoramic mode selection window on the image display unit 110 in step S207.

The user of the image processing apparatus 100 can select an arbitrary one of a plurality of panoramic image sensing modes by observing the panoramic mode selection window displayed on the image display unit 110.

The panoramic image sensing modes include a 2×2 panoramic mode, horizontal panoramic mode, vertical panoramic mode, and the like. In these modes, by combining a plurality of sensed images, a panoramic image, which is extended two-dimensionally, horizontally, or vertically, can be obtained.

A series of sensed images are appended with information indicating their positional relationship, and can be combined to generate a signal panoramic image by the image processing apparatus 100 itself or after they are transferred to, e.g., a computer or the like.

FIG. 9 shows an example of the panoramic mode selection window. Referring to FIG. 9, reference numeral 901 denotes an icon for selecting the 2×2 panoramic mode used for sensing a two-dimensional panoramic image; 902, an icon for selecting the horizontal panoramic mode used for sensing a horizontal panoramic image; and 903, an icon for selecting a vertical panoramic mode used for sensing a vertical panoramic image.

The user of the image processing apparatus 100 can select a desired panoramic mode by the selection/change switch 125 (e.g., [+] key), and can determine that panoramic mode by the determination/execution switch 126 (e.g., [SET] key).

Referring back to FIG. 2, upon completion of the process in step S207, the type of panoramic mode selected by the selection/change switch 125 and determination/execution switch 126 is checked in step S208. If the 2×2 panoramic mode is selected, the system control circuit 118 initially sets up the 2×2 panoramic mode in step S209; if the vertical panoramic mode is selected, the system control circuit 118 initially sets up the vertical panoramic mode in step S210; or if the horizontal panoramic mode is selected, the system control circuit 118 initially sets up the horizontal panoramic mode in step S211. More specifically, the system control circuit 118 sets initial values and memory areas of flags, parameters, and variables, reads out a display window serving as a user interface, and so forth in correspondence with the selected panoramic mode. After that, the system control circuit 118 displays a panoramic image sensing window corresponding to the selected mode on the image display unit 110 in step S212, and then enters the process shown in FIG. 3.

Figure 10A:
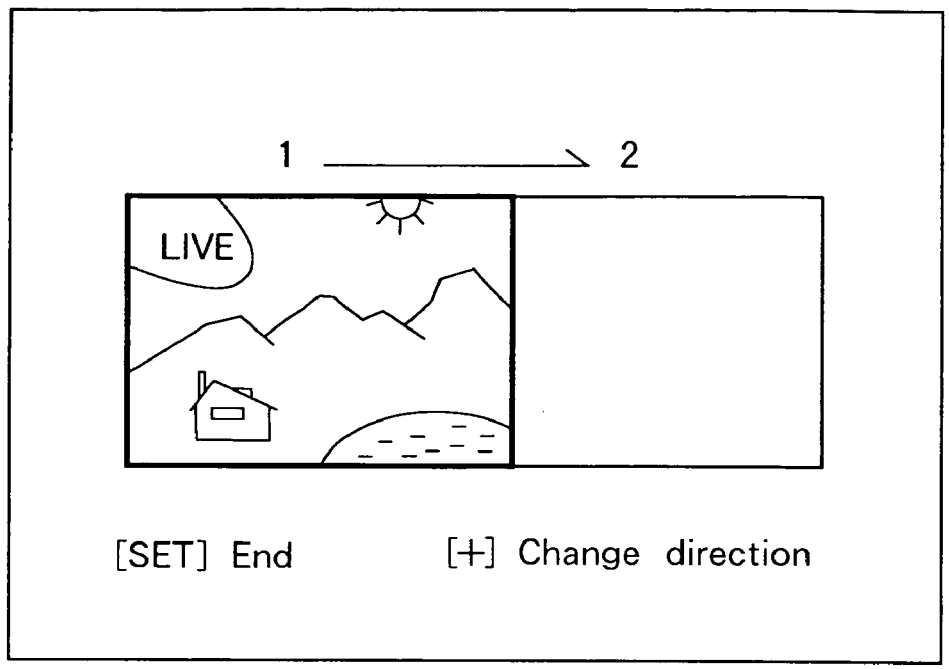
FIGS. 10A and 10B are explanatory views of an initial horizontal panoramic mode window of the image processing apparatus.
Figure 10B:
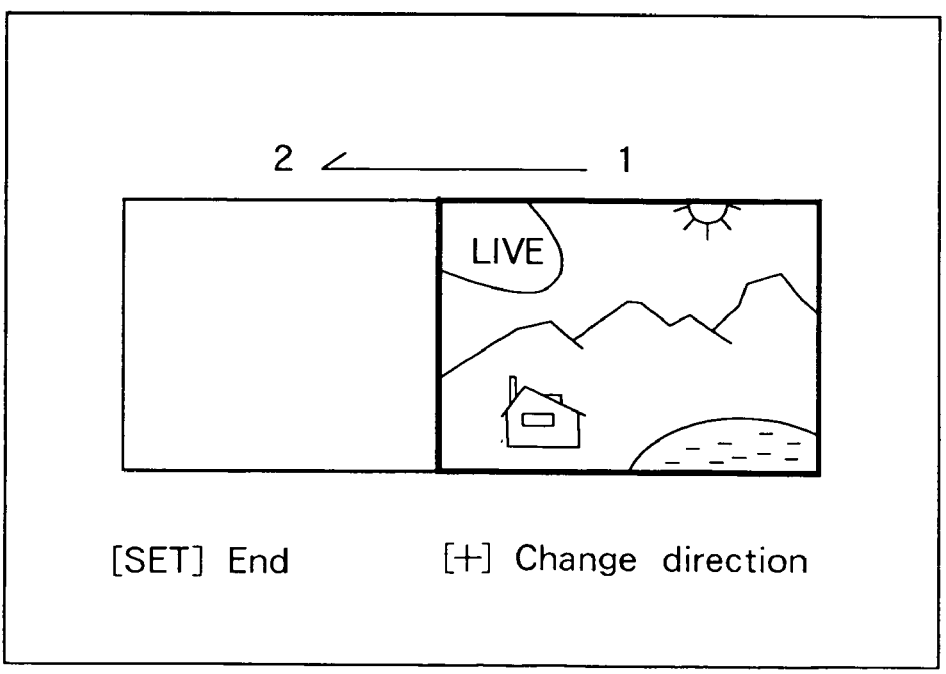
Figure 11A:
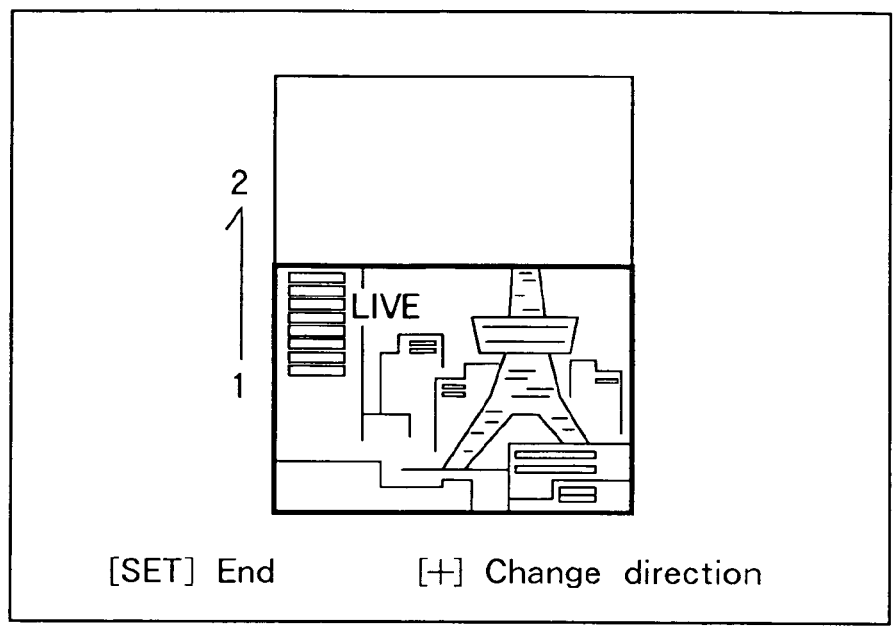
FIGS. 11A and 11B are explanatory views of an initial vertical panoramic mode window of the image processing apparatus.
Figure 11B:
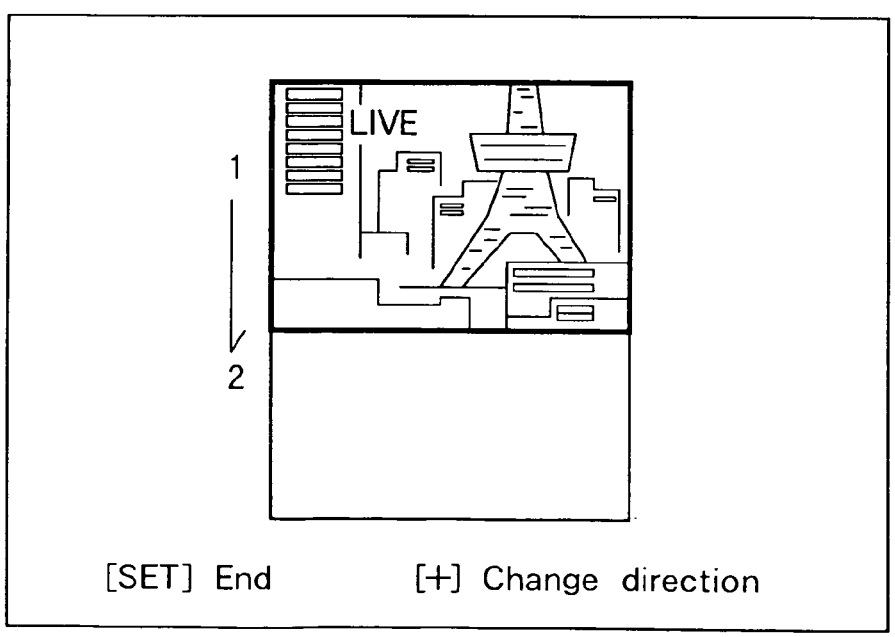
Figure 12A:
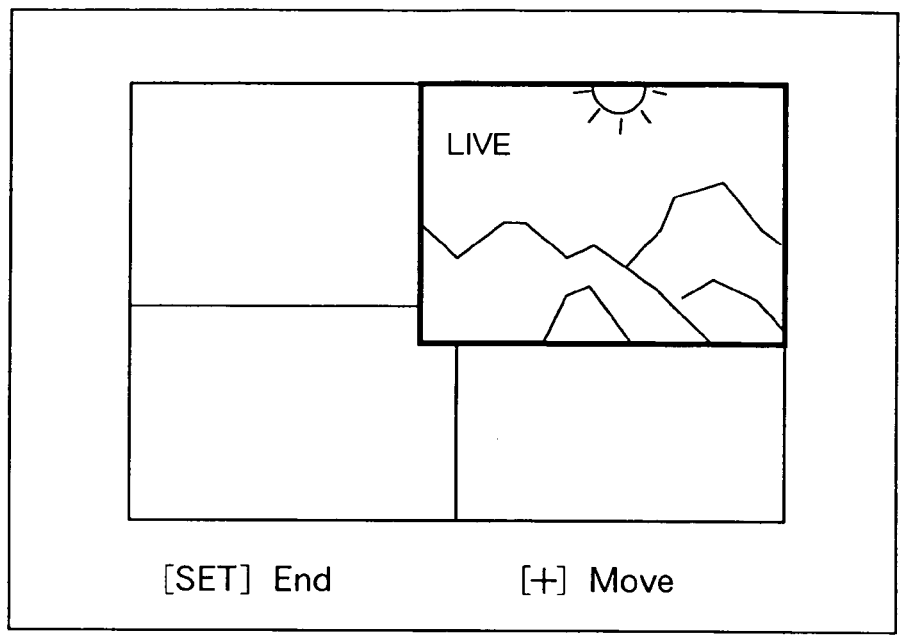
FIGS. 12A and 12B are explanatory views of a 2×2 panoramic mode image sensing window of the image processing apparatus.
Figure 12B:
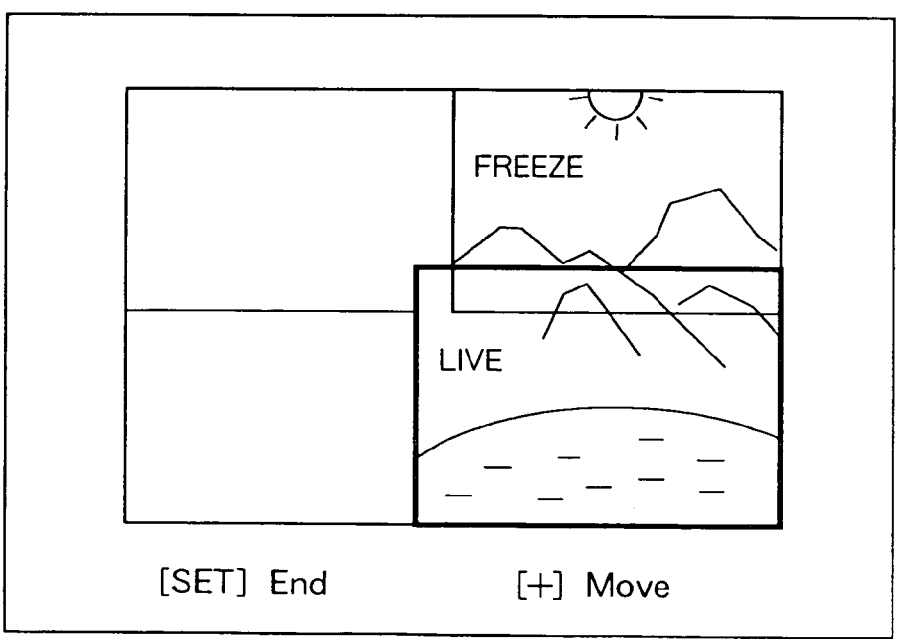

FIGS. 10A and 10B show examples of the horizontal panoramic mode image sensing window, FIGS. 11A and 11B show examples of the vertical panoramic mode image sensing window, and FIGS. 12A and 12B show examples of the 2×2 panoramic mode image sensing window.

FIG. 10A shows an image sensing window that creates a panoramic window by continuously repeating image sensing to the right, and FIG. 10B shows an image sensing window that creates a panoramic window by continuously repeating image sensing to the left.

Referring to FIGS. 10A and 10B, a through image from the electronic viewfinder is displayed on region "1" to sense the first image of a series of panoramic images. Before completion of image sensing of the first image, rightward image sensing (FIG. 10A) or leftward image sensing (FIG. 10B) can be desirably selected using the selection/change switch 125 (e.g., [+] key). The image sensing direction is determined by sensing the first image by pressing the shutter button in desired one of the display window states shown in FIGS. 10A and 10B.

Note that the user can end image sensing in the horizontal panoramic mode by pressing the determination/execution switch 126 (e.g., [SET] key).

FIG. 11A shows an image sensing window that creates a panoramic window by continuously repeating image sensing upward, and FIG. 11B shows an image sensing window that creates a panoramic window by continuously repeating image sensing downward.

Referring to FIGS. 11A and 11B, a through image from the electronic viewfinder is displayed on region "1" to sense the first image of a series of panoramic images. Before completion of image sensing of the first image, upward image sensing (FIG. 11A) or downward image sensing (FIG. 11B) can be desirably selected using the selection/change switch 125 (e.g., [+] key). The image sensing direction is determined by sensing the first image by pressing the shutter button in desired one of the display window states shown in FIGS. 11A and 11B.

Note that the user can end image sensing in the vertical panoramic mode by pressing the determination/execution switch 126 (e.g., [SET] key).

FIG. 12A shows an image sensing window for the first image upon creating a 2×2 panoramic window by two-dimensionally repeating image sensing of a total of four images in the vertical and horizontal directions, and FIG. 12B shows an image sensing window for the second image.

Referring to FIGS. 12A and 12B, a through image from the electronic viewfinder is displayed on, e.g., an upper right region to sense the first one of panoramic images.

Upon completion of image sensing of the first image, the playback image of the sensed image is displayed on, e.g., the upper right region, and a through image from the electronic viewfinder is displayed on, e.g., the lower right region to sense the second image. The image sensing region of the electronic viewfinder is switched in turn to the next region after each image sensing. However, image sensing may be started from an arbitrary region, or may be redone by returning to the already sensed region. For this purpose, the image sensing region can be desirably shifted using the selection/change switch 125 (e.g., [+] switch). The image sensing region to be re-sensed is determined and image sensing is executed by pressing the shutter button in a display window state that selects a desired region. Note that the user can end image sensing in the 2×2 panoramic mode by pressing the determination/execution switch 126 (e.g., [SET] key).

Referring to FIG. 3, the system control circuit 118 initializes flags and variables set in its internal memory or the memory 119 in step S301. For example, the system control circuit 118 resets a panoramic image sensing start flag, sets a variable n and initializes it to n=1 in step S302, and sets a variable m and initializes it to m=1 in step S303.

Note that the panoramic image sensing start flag is reset to indicate that no panoramic image sensing processes have been done. Also, the variable n indicates the position of the current image sensing region in image sensing of each panoramic mode. The variable m is used for returning the image sensing region to the immediately preceding region or canceling such return, upon executing image sensing again in the horizontal and vertical panoramic modes. An example of the method of using these flag and variables will be explained later.

In step S304, the setting position of the mode dial switch 122 is checked. If the mode dial switch 122 is set at any of mode positions other than the panoramic mode, the system control circuit 118 ends image sensing in the panoramic mode, and the flow returns to step S202 in FIG. 2. In this manner, the user of the image processing apparatus 100 can end the panoramic mode anytime he or she wants, and can select another mode.

If the mode dial switch 122 is set at the panoramic mode position, it is checked in step S305 if end of the panoramic mode is selected. If end of the panoramic mode is selected by pressing the determination/execution switch 126 (e.g., [SET] key) while the mode dial switch 122 is kept set at the panoramic mode position, i.e., the display window keeps displaying the corresponding panoramic image sensing window, a panoramic mode end confirmation message is displayed, and it is checked in step S314 if confirmation of the end is selected. If confirmation of end is selected, the flow returns to step S207 in FIG. 2; otherwise, the flow returns to step S304.

If it is determined in step S305 that end of the panoramic mode is not selected, it is checked in step S306 if the selection/change switch 125 (e.g., [+] key) has been pressed while the image display unit 110 keeps displaying the panoramic image sensing window. If the selection/change switch 125 (e.g., [+] key) has been pressed, the system control circuit 118 discriminates the contents of the panoramic mode in step S307.

If the contents of the panoramic mode indicate the 2×2 panoramic mode, the system control circuit 118 sets the variable n to be n=n+1 in step S308, and checks in step S309 if n=5. If n=5, the system control circuit 118 sets n=n−4 in step S310 to select the first image sensing region. After that, the flow advances to step S311.

More specifically, every time the selection/change switch 125 (e.g., [+] key) is pressed, the image sensing region of interest shifts to one of the four image sensing regions in the 2×2 panoramic mode. For example, the image sensing region of interest shifts in the order of the upper right region, lower right region, lower left region, upper left region, upper right region, lower right region, . . . .

On the other hand, if it is determined in step S306 that the selection/change switch 125 (e.g., [+] key) is not pressed, the control skips steps S307 to S310, and advances to step S311.

On the other hand, if it is determined in step S307 that the contents of the panoramic mode indicate the horizontal or vertical panoramic mode, the status of the image sensing start flag is checked in step S315. If the image sensing start flag is reset, i.e., no images have been sensed in a series of panoramic image sensing processes, the system control circuit 118 reverses the image sensing direction of the selected panoramic mode in step S316, and the flow then advances to step S311.

If it is determined in step S315 that the image sensing start flag is reset, i.e., the first image has already been sensed in a series of panoramic image sensing processes, the system control circuit 118 computes $m=m\times(-1)$, the sign of which changes like $-1, +1, -1, +1, \ldots$ in every computation in step S317, and also computes $n=n+m$ for the variable n, which changes like $n=n-1, n=n+1, n=n-1, n=n+1, \ldots$ in every computation in step S318. After that, the flow advances to step S311.

If $n \neq 5$ in step S309, the control skips step S310 and advances to step S311.

With this control, movement to the already sensed region (which is limited to the lastly sensed one) or cancel that movement can be repetitively selected to sense an image again.

After panoramic image sensing of the n-th image region, the user presses the selection/change switch 125 (e.g., [+] key) to confirm if quick review images of the (n−1)-th and n-th image regions smoothly join at their boundary regions. Then, the user temporarily releases (cancels) the selection/change switch 125 (e.g., [+] key) to display a through image on the n-th image region, and presses the selection/change switch 125 (e.g., [+] key) once again to display the original quick review image on the n-th image region and a through image on the (n+1)-th image region, thus executing the next panoramic image sensing.

After panoramic image sensing of the n-th image region, upon pressing the selection/change switch 125 (e.g., [+] key) to confirm if quick review images of the (n−1)-th and n-th image regions smoothly join at their boundary regions, if the user determines that image sensing must be redone, he or she temporarily releases the selection/change switch 125 (e.g., [+] key) to display a through image on the n-th image region, and presses the shutter switch 123 in that window state to replace the image with the newly sensed image. Then, the user can execute the next panoramic image sensing.

The system control circuit 118 selects the n-th image region in step S311, and checks in step S312 if the window layout must be changed (switched) in correspondence with the selected image region. If the window layout must be changed (switched) in correspondence with the selected image region, the system control circuit 118 switches and displays a new window layout in step S313, and then enters the process shown in FIG. 4.

On the other hand, if the window layout need not be changed (switched) in correspondence with the selected image region, the control skips step S313 and enters the process shown in FIG. 4. With this control, a window corresponding to the reversed image sensing direction, a window corresponding to the changed image sensing region, a window that has updated characters and images for comments, or the like can be displayed as needed.

Upon sensing the second and subsequent images, the image sensing regions that display already sensed images are set in a quick review display state, and the image sensing region selected for the next image sensing is set in a through display state, thus displaying a playback image of the already sensed image and the next image to be sensed to partially overlap each other. In this manner, the user of the image processing apparatus 100 can easily determine the next image sensing angle.

Referring to FIG. 4, the system control circuit 118 sets a through display state that displays sensed image data in turn in step S401.

In through display, data, which have been written in the image display memory 108 via the image sensing element 103, A/D converter 104, image processing circuit 106, and memory control circuit 107, are displayed on the aforementioned image sensing region of the image display unit via the memory control circuit 107 and D/A converter 109, thereby implementing an electronic viewfinder function.

The system control circuit 108 checks in step S402 if the first shutter switch 123 has been pressed. If the first shutter switch 123 has not been pressed, the flow returns to step S304 in FIG. 3. On the other hand, if the first shutter switch 123 has been pressed, the system control circuit 118 sets the display state of the image display unit 110 in a freeze display state in step S403.

In freeze display, image data on the image display memory 108 is inhibited from being rewritten via the image sensing element 103, A/D converter 104, image processing circuit 106, and memory control circuit 107, and the latest written image data is displayed on the above-mentioned image display region of the image display unit 110 via the memory control circuit 107 and D/A converter 109, thus displaying a frozen image on the electronic viewfinder.

In step S404, the system control circuit 118 executes distance measurement to adjust the focus of the photographing lens 101 on the object, and executes photometry to determine the aperture value and shutter speed. In photometry, the ON/OFF state of the electronic flash 117 is set if necessary. The distance measurement/photometry process in step S404 will be explained later with reference to FIG. 5.

Upon completion of the distance measurement/photometry process in step S404, the system control circuit 118 sets the display state of the image display unit 110 in a through display state in step S405. Note that this through display state is the same operation state as that in step S401.

The system control circuit 118 checks in step S406 if the second shutter switch 124 has been pressed. If the second shutter switch 124 has not been pressed, the control circuit 118 checks in step S417 if the first shutter switch 123 is canceled. If the first shutter switch 123 is canceled, the flow returns to step S406; otherwise, the flow returns to step S304 in FIG. 3.

If it is determined in step S406 that the second shutter switch 124 has been pressed, the system control circuit 118 sets the display state of the image display unit 110 in a fixed-color display state in step S407. In fixed-color display, in place of sensed image data, which has been written in the image display memory 108 via the image sensing element 103, A/D converter 104, image processing circuit 106, and memory control circuit 107, substitute fixed-color image data is displayed on the image display unit 110 via the memory control circuit 107 and D/A converter 109, thus displaying a fixed-color image on the electronic viewfinder.

In step S408, the system control circuit 118 executes an image sensing process including an exposure process for writing sensed image data in the memory 111 via the image sensing element 103, A/D converter 104, image processing circuit 106, and memory control circuit 107 or directly from the A/D converter 104 via the memory control circuit 107, and a process for executing various processes by reading out image data written in the memory 111 using the memory control circuit 107 and image processing circuit 106 if required. The image sensing process will be described in detail later with reference to FIG. 6.

In step S409, the system control circuit 118 executes a display image process for reading out image data written in the memory 111 by the image sensing process in step S408, and transferring the readout data to the image display memory 108 via the memory control circuit 107. The display image process will be explained in detail later with reference to FIG. 7.

In step S410, the system control circuit 118 sets the display state of the image display unit 110 in a quick review display state. In quick review display, image data, which has been transferred to the image display memory 108 by the display image process in step S409, is displayed on the above-mentioned image sensing region of the image display unit 110 via the memory control circuit 107 and D/A converter 109, thus implementing an electronic viewfinder function that automatically plays back the sensed image.

In step S411, the system control circuit 118 executes a compression process in which various image processes are done using the memory control circuit 107 and image processing circuit 106 if required by reading out sensed image data written in the memory 111, or an image is compressed in correspondence with the selected mode using the compression/expansion circuit 112. The compression process will be explained in detail later with reference to FIG. 8.

In step S412, the system control circuit 118 executes a recording process for writing image data in the recording medium 200a or 200b such as a memory card, compact flash card, or the like via the interface 133 or 134 and the connector 135 or 136.

When the image display unit 110 is ON, a message such as "BUSY" or the like that indicates that a write is in progress is displayed on the image display unit 110 during a write of image data on the recording medium 200a or 200b. Furthermore, the indication unit 120 makes a recording medium write access indication by flickering an LED or the like in combination with the above message.

The system control circuit 118 continues quick review display on the image display unit 110 until the second shutter switch 124 is canceled. With this display, the user can carefully check the sensed image while pressing the second shutter switch 124.

The system control circuit 118 checks in step S413 if the second shutter switch 124 is canceled, until it is actually canceled. If the second shutter switch 124 is canceled, the system control circuit 118 sets the panoramic image sensing start flag in step S414 to indicate that the first image in a series of panoramic image sensing processes has already been sensed. In this manner, as has been described in step S315 in FIG. 3, the image sensing direction can be inhibited from being reversed after the first image is sensed in the horizontal or vertical panoramic mode.

The system control circuit 118 sets the variable n to be n=n+1 to select the next image sensing region in step S415, and resets the variable m to m=1 in step S416. Then, the flow returns to step S304 in FIG. 3 to repeat a series of panoramic image sensing processes.

In this fashion, after the control returns to step S304 in FIG. 3 upon canceling (releasing) the second shutter switch 124, the next image sensing region is selected in step S311. In step S313, the image sensing regions which include the previous image sensing region and display the sensed images are set in a quick review display state and the next image sensing region is set in a through display state, so as to display the sensed images and an image to be sensed to overlap each other, thus allowing the user to easily sense panoramic images.

Figure 14A:
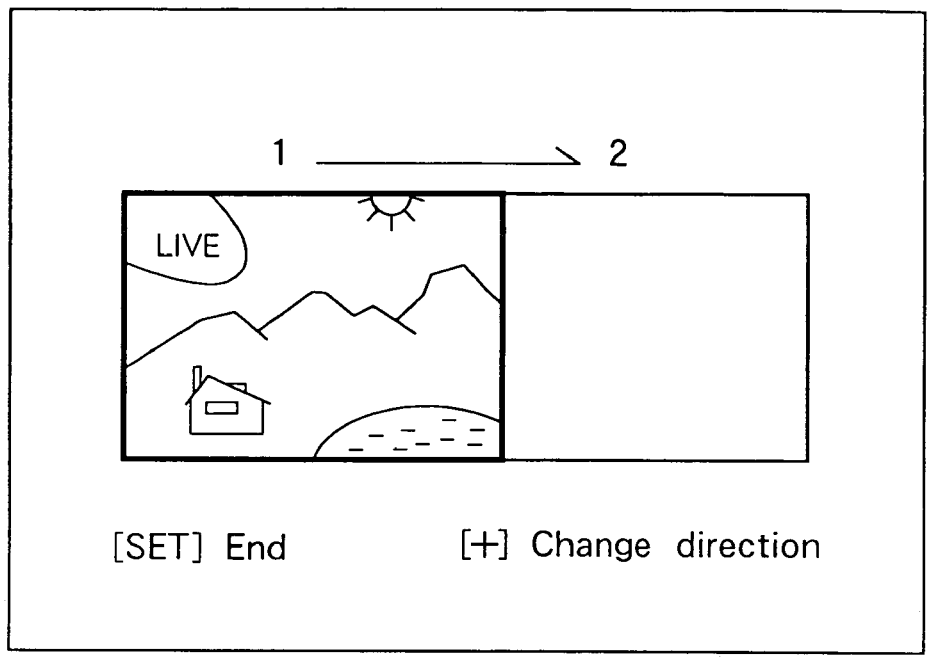
FIGS. 14A and 14B are explanatory views of a horizontal panoramic mode image sensing window of the image processing apparatus.
Figure 14B:
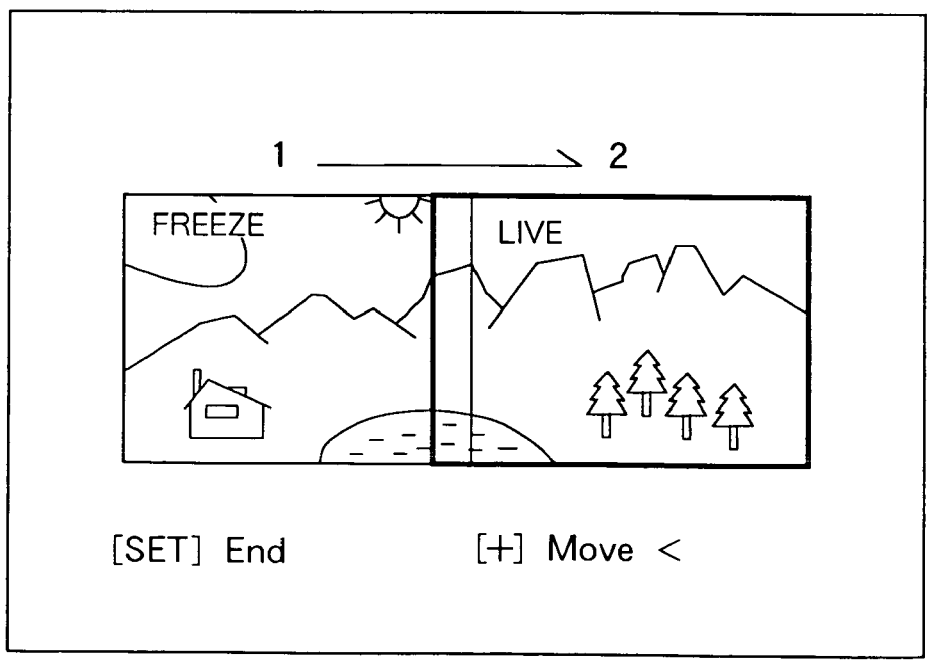

FIGS. 14A and 14B show examples of the image sensing window before and after completion of sensing of the n-th image in the horizontal panoramic mode. FIG. 14A shows the image sensing window before sensing the first image, and FIG. 14B shows the image sensing window upon canceling the second shutter switch 124 after the first image is sensed. Although not shown, before the second shutter switch 124 is canceled after the first image sensing, the first image sensing region in FIG. 14A on the image sensing window is set in a quick review display state.

Figure 15A:
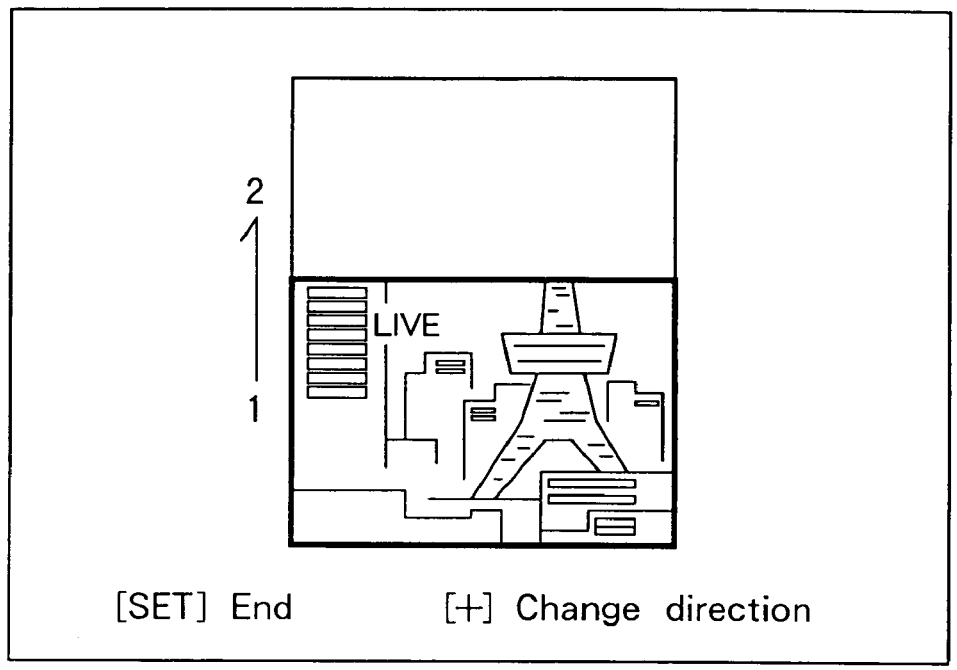
FIGS. 15A and 15B are explanatory views of a vertical panoramic mode image sensing window of the image processing apparatus.
Figure 15B:
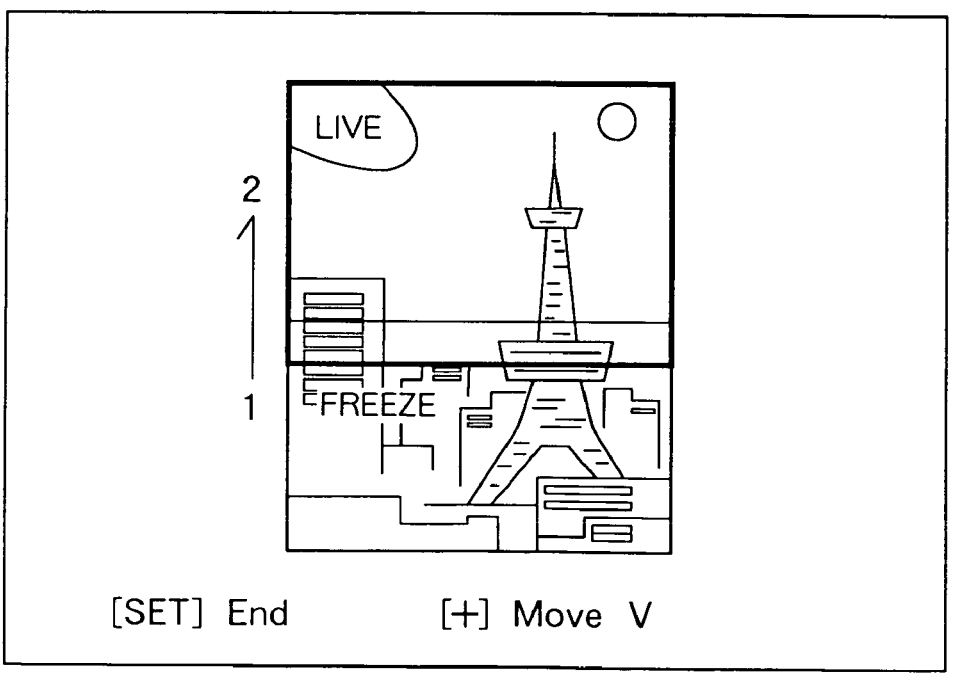

FIGS. 15A and 15B show examples of the image sensing window before and after completion of sensing of the n-th image in the vertical panoramic mode. FIG. 15A shows the image sensing window before sensing the first image, and FIG. 15B shows the image sensing window upon canceling the second shutter switch 124 after the first image is sensed. Although not shown, before the second shutter 124 is canceled after the first image sensing, the first image sensing region in FIG. 15A on the image sensing window is set in a quick review display state.

Furthermore, FIGS. 12A to 13B show examples of the image sensing window before and after completion of sensing of the n-th image.

FIG. 12A shows the image sensing window before the first image is sensed. FIG. 12B shows the image sensing window upon canceling the second shutter switch 124 after the first image is sensed, i.e., before the second image is sensed.

Although not shown, before the second shutter switch 124 is canceled after the first image sensing, the first image sensing region in FIG. 12A on the image sensing window is set in a quick review display state.

Figure 13A:
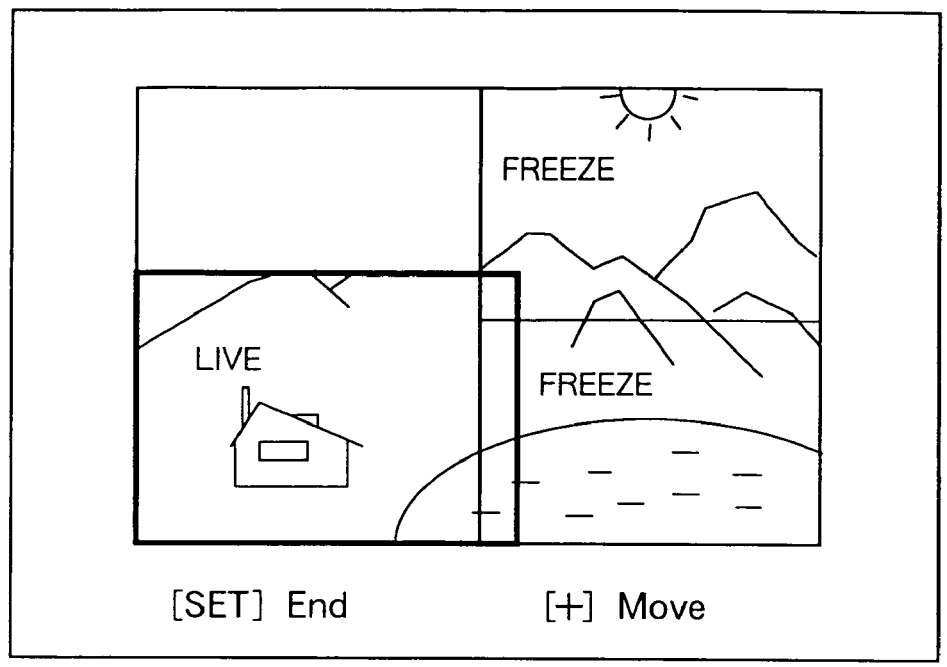
FIGS. 13A and 13B are explanatory views of a 2×2 panoramic mode image sensing window of the image processing apparatus.
Figure 13B:
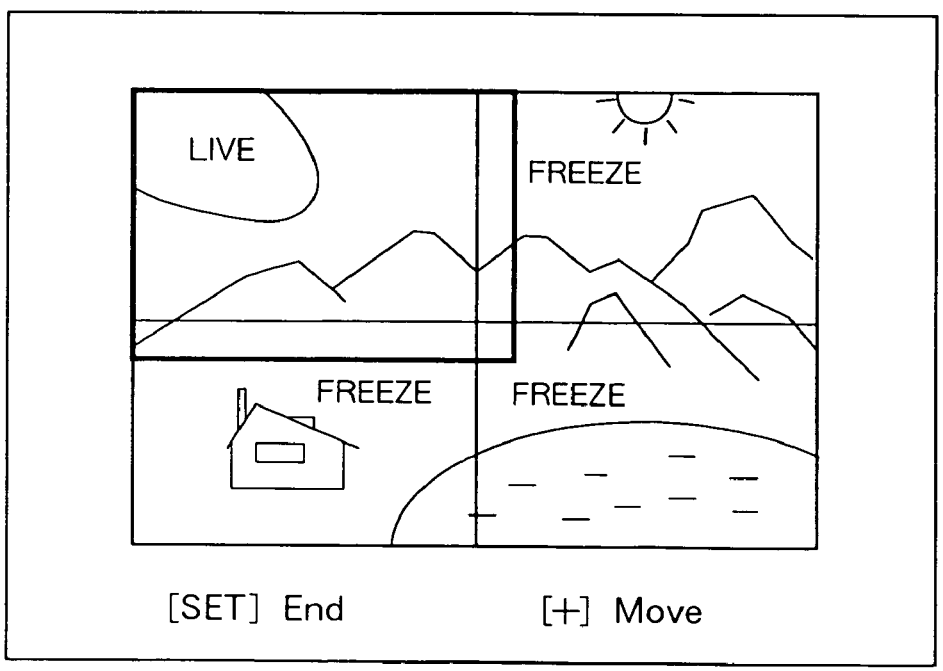

FIG. 13A shows the image sensing window upon canceling the second shutter switch 124 after the second image is sensed, i.e., before the third image is sensed, and FIG. 13B shows the image sensing window upon canceling the second shutter switch 124 after the third image is sensed, i.e., before the fourth image is sensed.

Although not shown, before the second shutter switch 124 is canceled after the n-th image sensing, the n-th image sensing region in FIGS. 12A to 13B on the image sensing window is set in a quick review display state. When the second shutter switch 124 is canceled, a through display of the (n+1)-th image sensing region as the next region is added.

Figure 5:
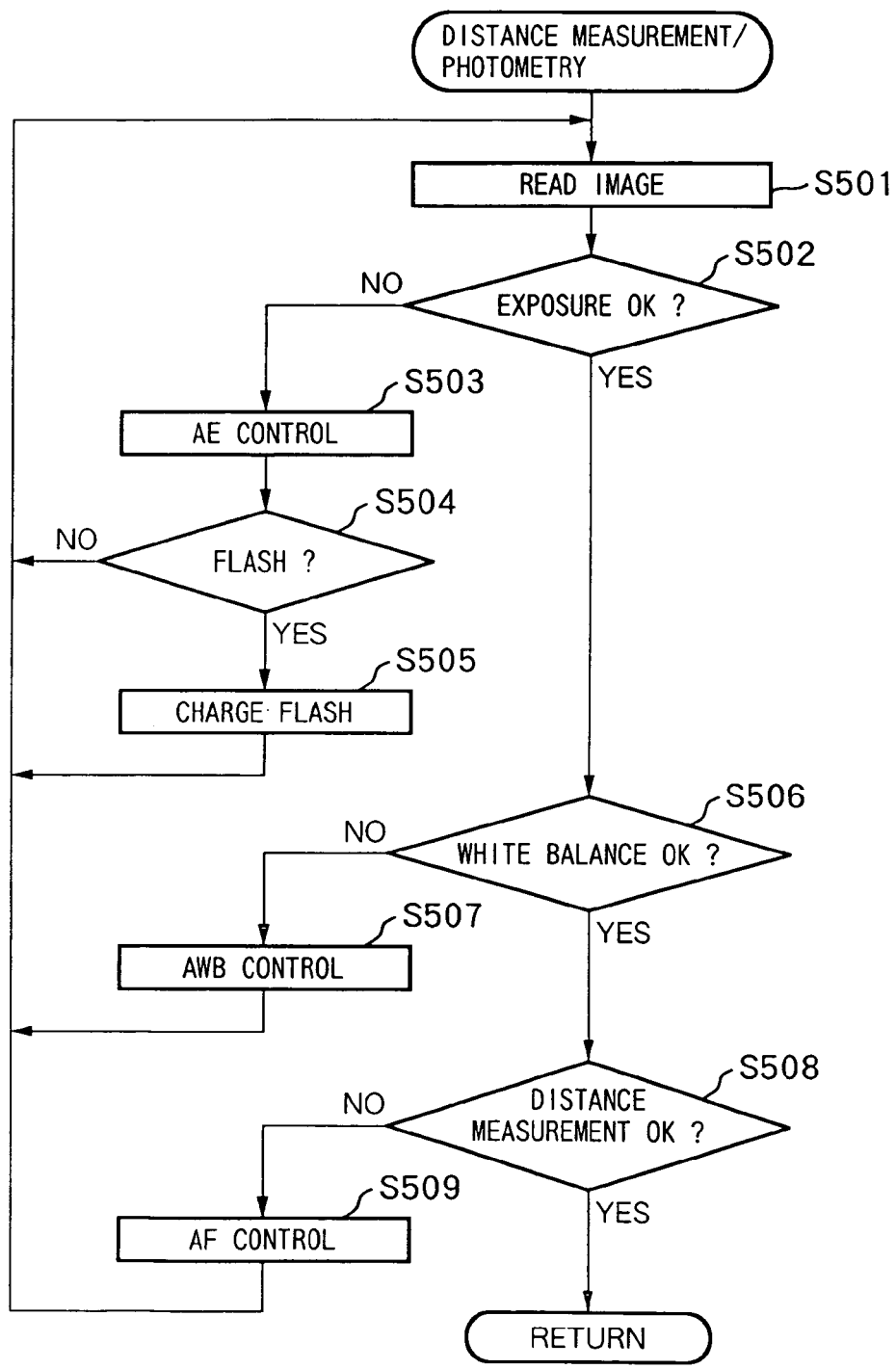
FIG. 5 is a flow chart of a distance measurement/photometry process routine of the image processing apparatus.

FIG. 5 is a flow chart showing the flow of the operation of the distance measurement/photometry process in step S404 shown in FIG. 4 in detail.

The system control circuit 118 reads out a charge signal from the image sensing element 103, and the image processing circuit 106 sequentially reads sensed image data via the A/D converter 104 in step S501. Using the read image data, the image processing circuit 106 makes predetermined computations used in the TTL (Through The Lens) AE (auto exposure) process, EF (flash pre-emission) process, and AF (auto focus) process.

Note that the respective processes extract specific portions at required positions from all pixels, and use them in computations. In this manner, in the TTL AE, EF, and AF processes, optimal computations can be made in units of different modes, i.e., a center-weighted mode, average mode, evaluation mode, and the like.

The system control circuit 118 checks using the computation results of the image processing circuit 106 in step S502 if the exposure value (AE) is appropriate (OK). If AE is inappropriate, the system control circuit 118 executes AE control in step S503. The system control circuit 118 checks using measurement data obtained by the AE control in step S504 if flash emission is required. If flash emission is not required, the flow returns to step S501; otherwise, the system control circuit 118 sets a flash flag to charge the electronic flash 117 in step S505. Then, the flow returns to step S501.

On the other hand, if it is determined in step S502 that AE is appropriate, the system control circuit 118 stores measurement data and/or setting parameters in its internal memory or the memory 119. The system control circuit 118 checks using the computation results of the image processing circuit 106 and measurement data obtained by the AE control in step S506 if the white balance (AWB) is appropriate (OK). If the white balance is inappropriate, the system control circuit 118 executes AWB by adjusting the color processing parameters using the image processing circuit 106 in step S507, and the flow then returns to step S501.

On the other hand, if it is determined in step S506 that the white balance is appropriate, the system control circuit 118 stores measurement data and/or setting parameters in its internal memory or the memory 119. The system control circuit 118 checks using measurement data obtained by the AE control and AWB control in step S508 if a distance measurement result indicates in-focus. If the distance measurement result does not indicate in-focus, the system control circuit 118 executes AF control in step S509, and the flow returns to step S501. On the other hand, if it is determined in step S508 that the distance measurement result indicates in-focus, the system control circuit 118 stores measurement data and/or setting parameters in its internal memory or the memory 119, thus ending this processing operation (the processing operation in step S404 in FIG. 4).

Figure 6:
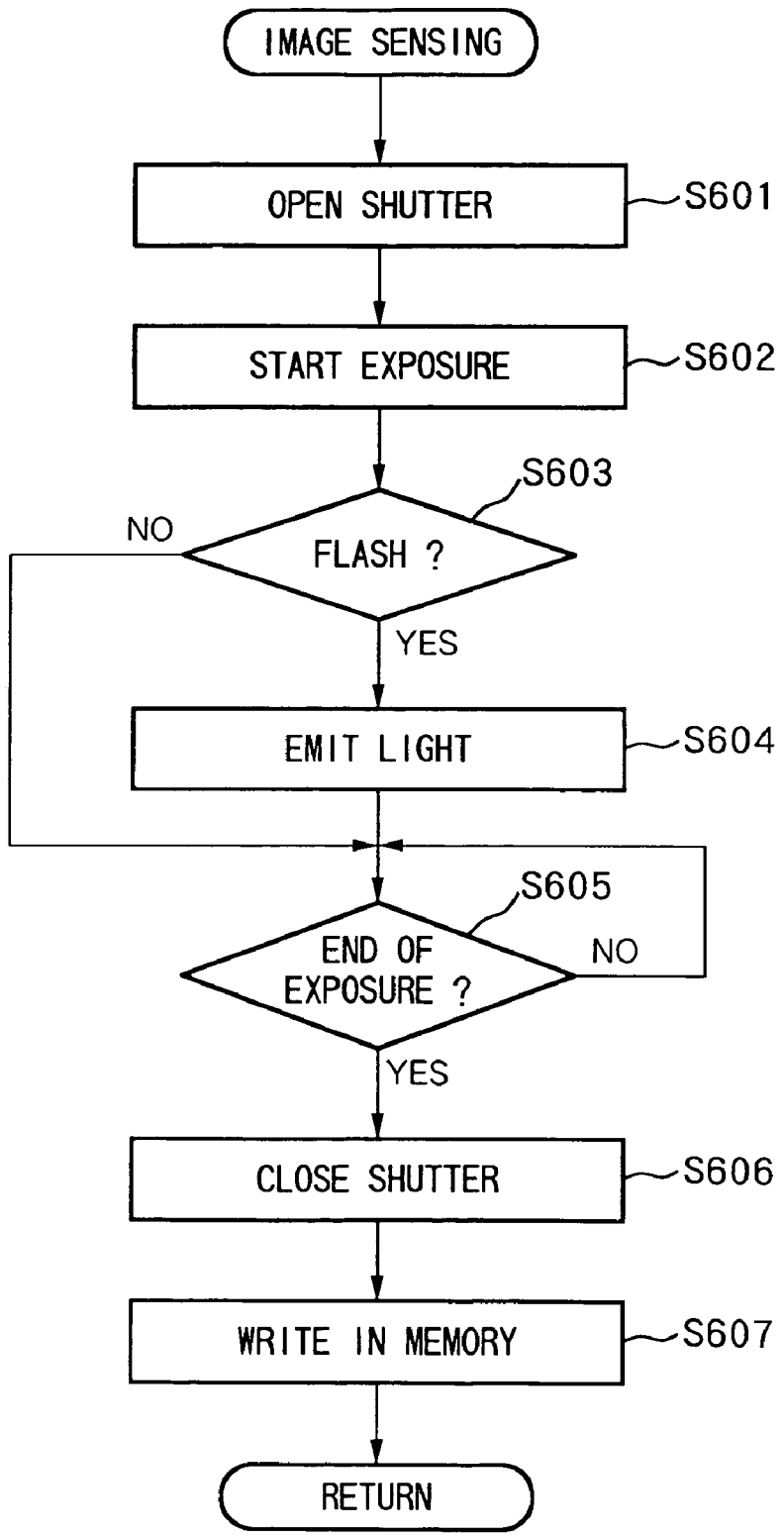
FIG. 6 is a flow chart of an image sensing process routine of the image processing apparatus.

FIG. 6 is a flow chart showing the flow of the image sensing process in step S408 in FIG. 4 in detail.

The system control circuit 118 opens the shutter 102 having the stop function using the exposure control means 113 in accordance with photometry data stored in its internal memory or the memory 119 in step S601, and starts exposure of the image sensing element 103 in step S602. The system control circuit 118 checks based on the flash flag in step S603 if the electronic flash 117 is required. If the electronic flash 117 is required, the system control circuit 118 controls the electronic flash 117 to emit light in step S604, and the flow advances to step S605. If it is determined in step S603 that the electronic flash 117 is not required, the control skips step S604 and advances to step S605.

The system control circuit 118 checks in step S605 if exposure of the image sensing element 103 is complete in accordance with the photometry data, until it is actually complete. Upon completion of exposure of the image sensing element 103, the system control circuit 118 closes the shutter 102 in step S606, and reads a charge signal from the image sensing element 103 and writes sensed image data in the memory 111 via the A/D converter 104, image processing circuit 106, and memory control circuit 107 or directly from the A/1) converter 104 via the memory control circuit 107 in step S607. Upon completion of a series of processes, this processing operation (the processing operation in step S408 in FIG. 4) ends.

FIG. 7 is a flow chart showing the flow of the display image process in step S409 shown in FIG. 4 in detail.

The system control circuit 118 checks in step S701 if a frame process is required in correspondence with the selected image sensing mode. If a frame process is required, the system control circuit 118 reads out image data written in the memory 111 and executes vertical addition using the memory control circuit 107 and also the image processing circuit 106 if necessary in step S702. Likewise, the system control circuit 118 executes a color process in step S703. After that, the system control circuit 118 writes the processed image data in the memory 111, and the flow advances to step S704.

On the other hand, if it is determined in step 701 that the frame process is not required, the control skips steps S702 and S703, and advances to step S704.

In step S704, the system control circuit 118 reads out image data from the memory 111, and transfers display image data to the image display memory 108 via the memory control circuit 107.

Upon completion of a series of processes, this processing operation (the processing operation in step S409 in FIG. 4) ends.

FIG. 8 is a flow chart showing the flow of the compression process in step S411 in FIG. 4 in detail.

In step S801, the system control circuit 118 executes a pixel squaring process for reading out sensed image data written in the memory 111, and converting the vertical-to-horizontal pixel ratio of the image sensing element 103 to 1:1 by interpolation using the memory control circuit 107 and also the image processing circuit 106 if necessary. The system control circuit 118 then writes the processed image data in the memory 111. In step S802, the system control circuit 118 reads out image data written in the memory 111 and executes image compression corresponding to the selected mode using the compression/expansion circuit 112, then ending this processing operation (the processing operation in step S411 in FIG. 4).

Note that the number of types of selectable panoramic modes on the panoramic mode selection window is 3, i.e., the 2×2 panoramic mode, horizontal panoramic mode, and vertical panoramic mode in this embodiment. However, the present invention is not limited to these specific modes, and one or a plurality of types of an arbitrary number of different panoramic modes may be selectable.

Also, the display of the panoramic mode selection window shown in FIG. 9 is not limited to the one exemplified in this embodiment. Alternatively, a display with an arbitrary layout or scheme using an image or voice may be made.

On the 2×2 panoramic mode image sensing window, a total of four images are two-dimensionally laid out in a 2×2 matrix. However, the present invention is not limited to such matrix. For example, an arbitrary number of images such as a total of nine images, a total of 16 images, and the like may be laid out in a two-dimensional or three-dimensional matrix.

In the above embodiment, on the horizontal and vertical panoramic mode image sensing windows, two images are continuously displayed. However, the present invention is not limited to such specific display, and an arbitrary number of images (e.g., three images, four images, and the like) may be one-dimensionally displayed.

The displays of the panoramic mode image sensing windows shown in FIGS. 10A to 15B are not limited to these examples, and displays with arbitrary layouts and schemes using images, voices, characters, symbols, and the like may be made.

In the above-mentioned embodiment, in the horizontal and vertical panoramic modes, the image sensing direction is inhibited from being reversed after the first image is sensed. However, the present invention is not limited to this, and the image sensing direction may be reversed as needed. Also, the image sensing direction may be changed in one of arbitrary directions including the right and left directions, up and down directions, or oblique directions. In the present invention, when a large number of image display regions can be simultaneously displayed by increasing the display area of the image display unit 110, the image sensing direction can be changed in one of arbitrary directions including the right and left directions, up and down directions, or oblique directions.

In the above embodiment, image sensing can be redone for only the immediately preceding sensed image in the horizontal and vertical panoramic modes. However, the present invention is not limited to this. For example, image sensing may be redone for an image sensed an arbitrary number of images before.

In the above embodiment, the next image display region for displaying an image to be sensed is set in the through display state, and that for displaying the already sensed image is set in the quick review display state, to display the playback image of the already sensed image and the next image to be sensed so that their boundary regions partially overlap each other. However, the present invention is not limited to such specific scheme. For example, the images may be displayed without making their boundary regions overlap each other.

In the explanatory views of the panoramic modes in FIGS. 10A to 15B, for example, comment words "LIVE" and "FREEZE" are added within the image display regions. However, the actual image display unit 110 may or may not display these comment words.

Note that the recording media 200a and 200b are not limited to memory cards such as PCMCIA cards, compact flash cards, or the like, hard disks, and the like, but may use micro DATs (digital audio tapes), magnetooptical disks, optical disks such as CD-Rs, CD-WRs, or the like, phase change optical disks such as DVDs, and the like.

Also, the recording media 200a and 200b may use hybrid media that integrate memory cards, hard disks, and the like. Furthermore, such hybrid media may include detachable media.

In the description of the embodiment, the recording media 200a and 200b are independent from the image processing apparatus 100 and are arbitrarily connectable. One or both the recording media 200a and 200b may be permanently connected to the image processing apparatus 100.

An arbitrary number (one or a plurality) of image recording media 200a or 200b may be connectable to the image processing apparatus 100.

In the above description, the recording media 200a and 200b are attached to the image processing apparatus. However, one or a combination of a plurality of recording media may be used.

As described in detail above, according to the image processing method and apparatus of the first embodiment, the image sensing purposes are not limited, which is very convenient.

Also, according to the storage medium of the first embodiment, the aforementioned image processing apparatus of the first embodiment can be smoothly controlled.

Second Embodiment

Figure 16:
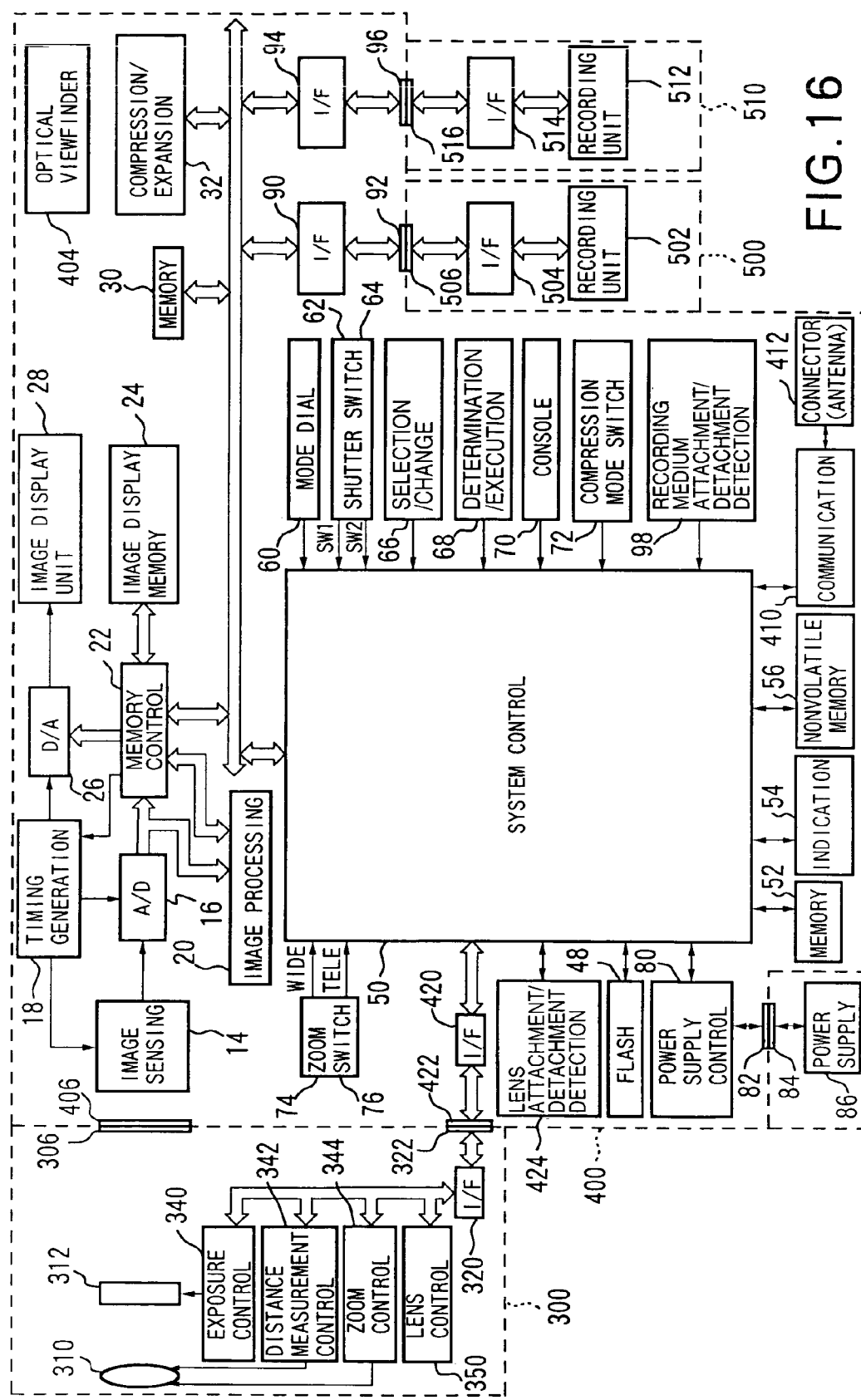
FIG. 16 is a block diagram showing the arrangement of an image processing apparatus according to the second embodiment of the present invention.
Figure 17:
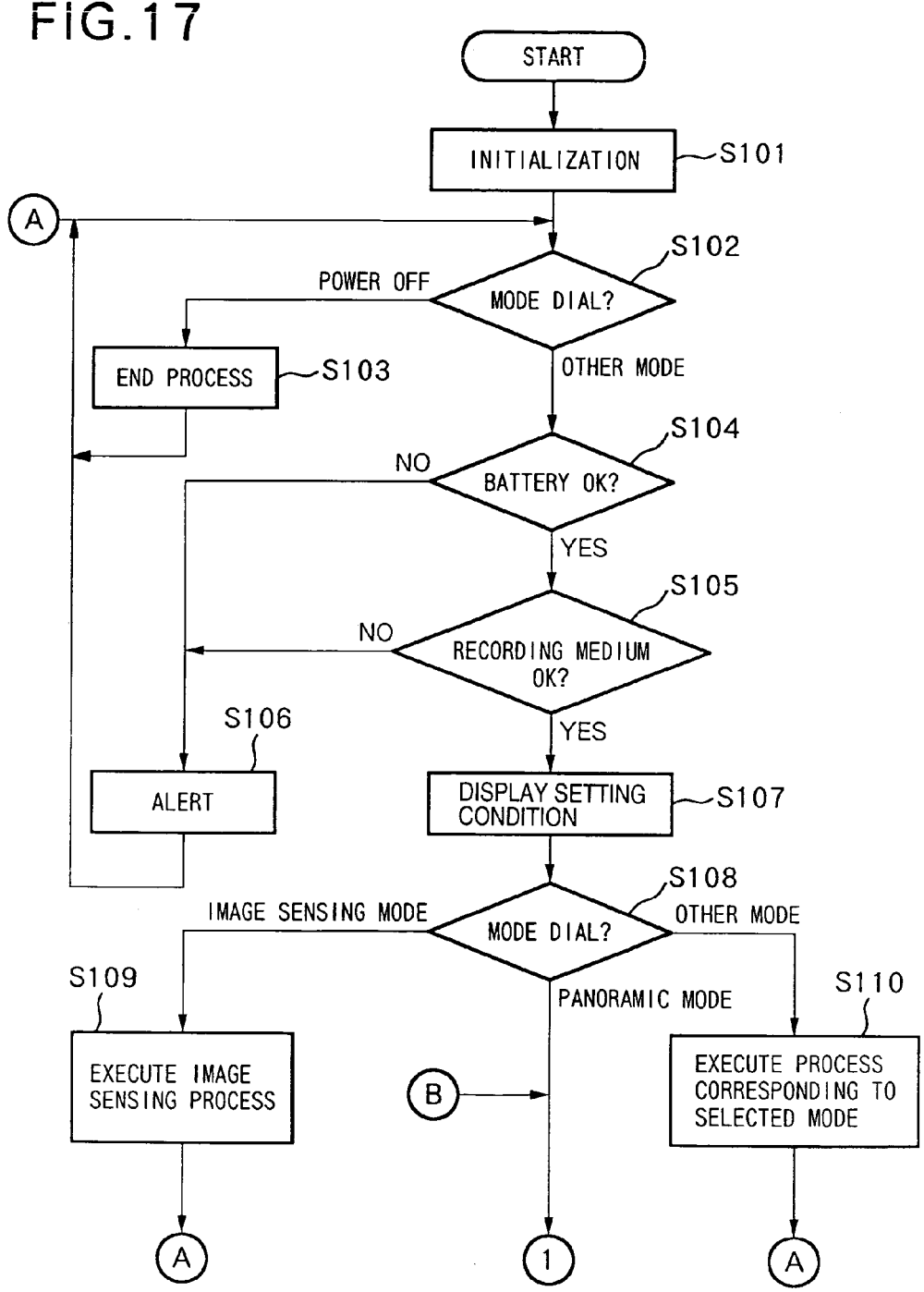
FIG. 17 is a flow chart of a main routine showing the operation of the image processing apparatus according to the second embodiment.
Figure 18:
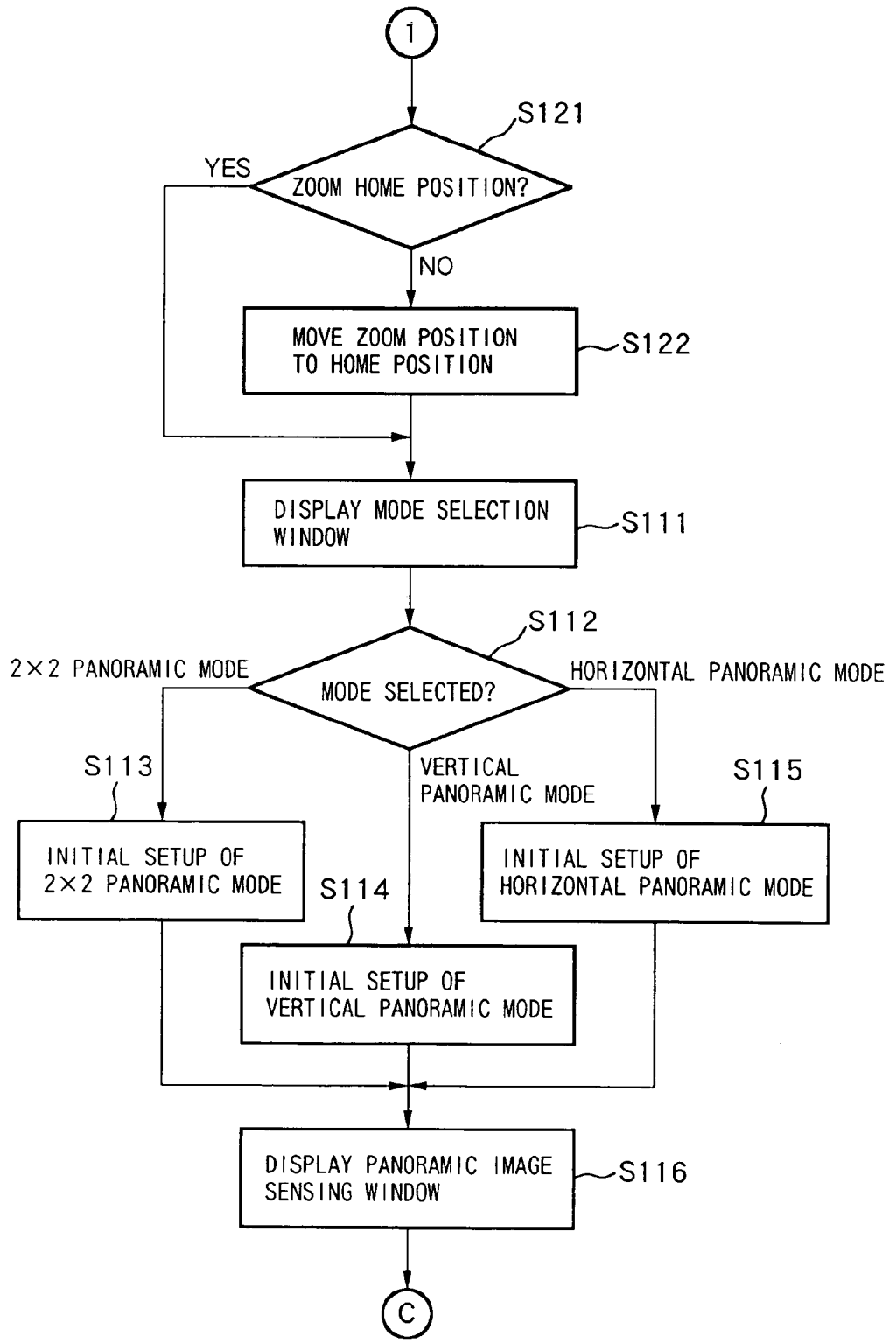
FIG. 18 is a flow chart of the main routine showing the operation of the image processing apparatus according to the second embodiment.
Figure 19:
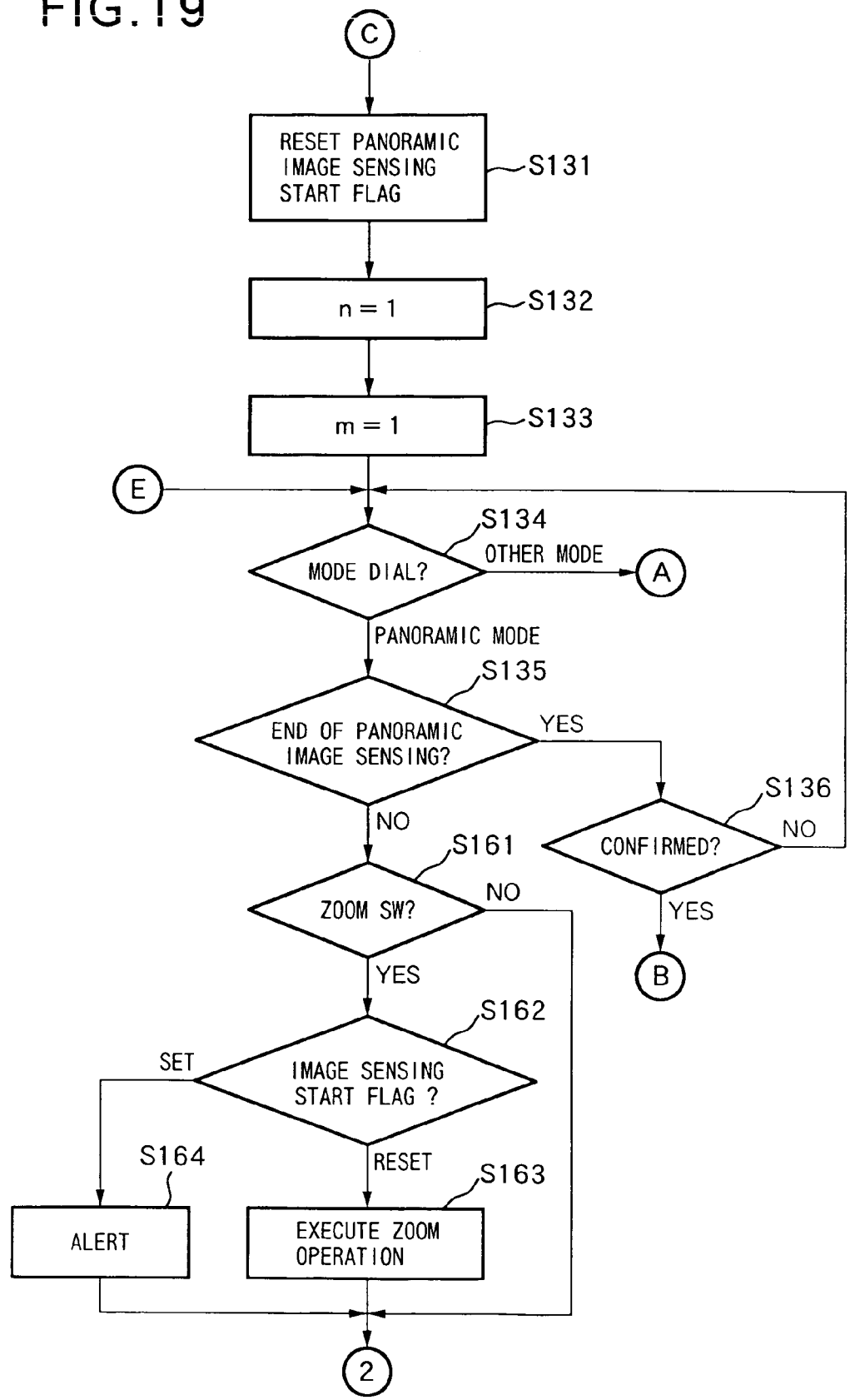
FIG. 19 is a flow chart of the main routine showing the operation of the image processing apparatus according to the second embodiment.
Figure 20:
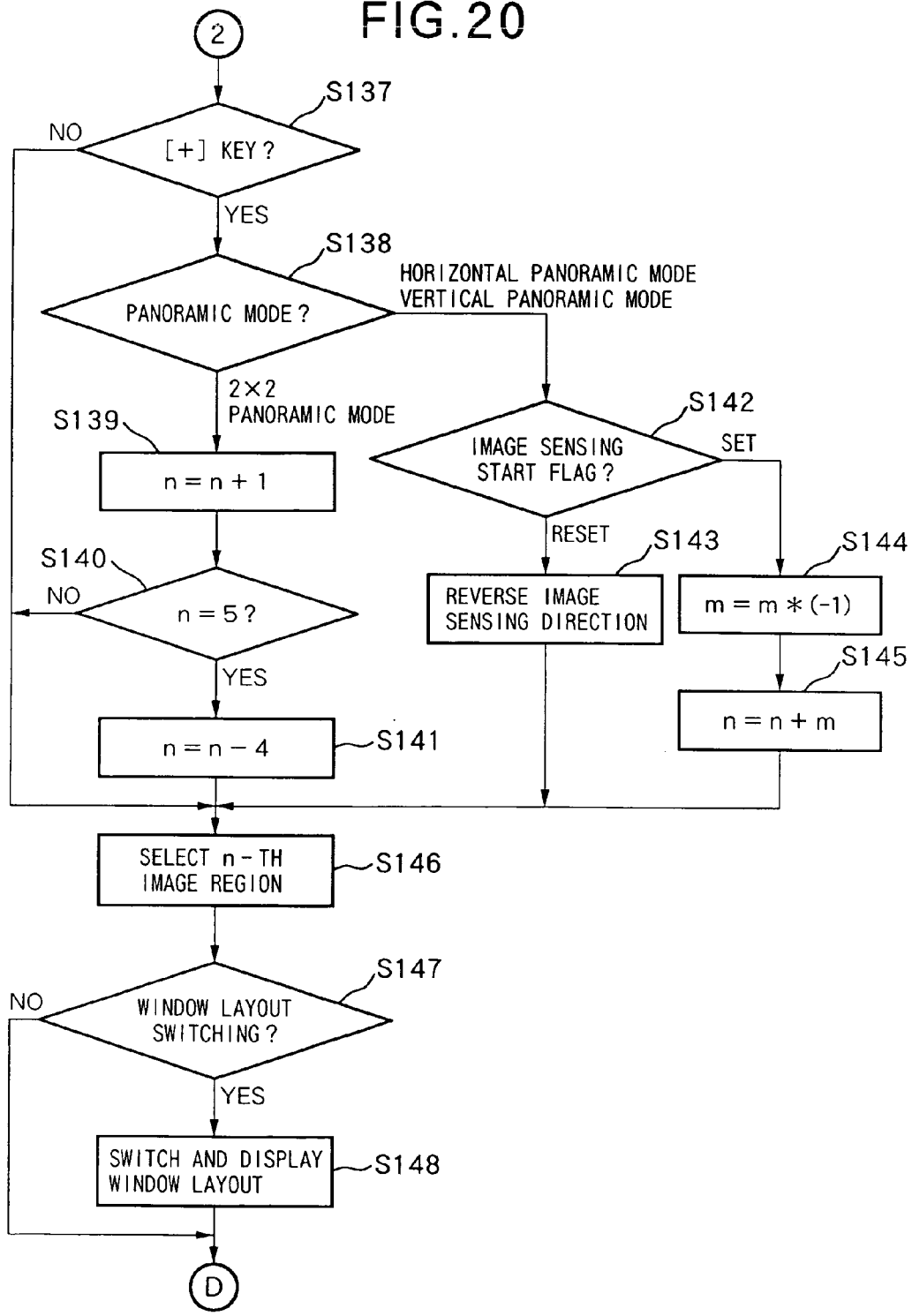
FIG. 20 is a flow chart of the main routine showing the operation of the image processing apparatus according to the second embodiment.

FIG. 16 shows the arrangement of an image processing apparatus according to the second embodiment of the present invention.

Referring to FIG. 16, reference numeral 400 denotes an image processing apparatus.

Reference numeral 14 denotes an image sensing element for converting an optical image into an electrical signal; and 16, an A/D converter for converting an analog signal output from the image sensing element 14 into a digital signal.

Reference numeral 18 denotes a timing generation circuit for supplying clock signals and control signals to the image sensing element 14, the A/D converter 16, and a D/A converter 26. The timing generation circuit 18 is controlled by a memory control circuit 22 and system control circuit 50.

Reference numeral 20 denotes an image processing circuit which performs predetermined pixel interpolation and color conversion for data supplied from the A/D converter 16 or the memory control circuit 22.

The image processing circuit 20 makes a predetermined computation using sensed image data to execute a TTL (Through The Lens) AF (auto focus) process, AE (auto exposure) process, and EF (flash pre-emission) process in which the system control circuit 50 controls an exposure control means 340 and distance measurement control means 342 on the basis of the obtained computation result.

Furthermore, the image processing circuit 20 makes a predetermined computation using sensed image data, and executes a TTL AWB (auto white balance) process on the basis of the obtained computation result.

Reference numeral 22 denotes the memory control circuit, which controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or memory 30 via the image processing circuit 20 and memory control circuit 22 or directly via the memory control circuit 22.

Reference numeral 24 denotes the image display memory; 26, the D/A converter; and 28, an image display unit comprising a TFT LCD or the like. Display image data written in the image display memory 24 is displayed by the image display unit 28 via the D/A converter 26.

When sensed image data are displayed at image sensing timings using the image display unit 28, an electronic viewfinder function can be implemented.

The image display unit 28 can arbitrarily turn on/off its display in response to an instruction from the system control circuit 50. When the display is turned off, consumption power of the image processing apparatus 400 can be greatly reduced.

Reference numeral 30 denotes the memory for storing a still image and moving image. The memory 30 has a storage capacity large enough to store a predetermined number of still images or a moving image for a predetermined period of time. With this arrangement, even in a continuous or panoramic image sensing mode for continuously sensing a plurality of still images, many images can be written in the memory 30 at high speed. Also, the memory 30 can be used as a work area of the system control circuit 50.

Reference numeral 32 denotes the compression/expansion circuit for compressing/expanding image data by adaptive discrete cosine transformation (ADCT) or the like. The compression/expansion circuit 32 reads an image stored in the memory 30, compresses or expands it, and writes the processed data in the memory 30.

Reference numeral 48 denotes an electronic flash which has a function of projecting AF auxiliary light and the flash light control function.

The exposure control means 340 and distance measurement control means 342 are controlled using TTL, and the system control circuit 50 controls the exposure control means 340 and distance measurement control means 342 on the basis of the computation result of the image processing circuit 20 using sensed image data.

Reference numeral 50 denotes the system control circuit for controlling the overall image processing apparatus 400; and 52, a memory for storing constants, variables, programs, and the like for operations of the system control circuit 50.

Reference numeral 54 denotes an indication unit which includes a liquid crystal display device, loudspeaker, and the like, and indicates operation states, messages, and the like using characters, images, voices, and the like in accordance with execution of a program by the system control circuit 50. The indication unit 54 is placed at one or a plurality of easy-to-see positions around the console of the image processing apparatus 400, and is comprised of a combination of an LCD, LEDs, tone generation element, and the like.

Some functions of the indication unit 54 are placed within an optical viewfinder 404.

Of the indication contents of the indication unit 54, those indicated on an LCD or the like include, e.g., a single shot/continuous shot indication, self-timer indication, compression ratio indication, recording pixel count indication, recording image count indication, remaining photographable image count indication, shutter speed indication, aperture value indication, exposure correction indication, flash indication, red-eye suppression indication, macro-image sensing indication, buzzer setting indication, timepiece battery remaining capacity indication, error indication, information indication using a plurality of digits of numerals, attached/detached state indication of recording media 500 and 510, attached/detached state indication of a lens unit 300, communication I/F operation indication, date/time indication, indication that indicates a connection state with an external computer, and the like.

Of the indication contents of the indication unit 54, those indicated within the optical viewfinder 404 include, e.g., an in-focus indication, image sensing ready indication, camera shake alert indication, flash charging indication, flash charging completion indication, shutter speed indication, aperture value indication, exposure correction indication, recording medium write access indication, and the like.

Furthermore, of the indication contents of the indication unit 54, those indicated by LEDs or the like include, e.g., in-focus indication, image sensing ready indication, camera shake alert indication, flash charging indication, flash charging completion indication, recording medium write access indication, macro-image sensing setting notification indication, secondary battery charged state indication, and the like.

Of the indication contents of the indication unit 54, those to be indicated by lamps include, e.g., a self-timer notification lamp, and the like. The self-timer notification lamp may be commonly used as that for emitting AF auxiliary light.

Reference numeral 56 denotes an electrically erasable/recordable nonvolatile memory, which uses, e.g., an EEPROM.

Reference numerals 60, 62, 64, 66, 68, 70, 72, 74, and 76 denote operation means for inputting various operation instructions of the system control circuit 50. These operation means are constructed by one or a plurality of combinations of a switch, a dial, a touch panel, a pointer using line of sight detection, a voice recognition device, and the like.

These operation means will be explained in detail below.

Reference numeral 60 denotes a mode dial switch, which can switch various function modes such as power OFF, an automatic image sensing mode, image sensing mode, panoramic image sensing mode, playback mode, multi-frame playback/erase mode, PC connection mode, and the like.

Reference numeral 62 denotes a shutter switch SW1, which is turned on in the middle of operation of a shutter button (not shown), and instructs start of an AF (auto focus) process, AE (auto exposure) process, AWB (auto white balance) process, EF (flash pre-emission) process, and the like.

Reference numeral 64 denotes a shutter switch SW2, which is turned on upon completion of operation of the shutter button (not shown), and instructs start of a series of processes including an exposure process for writing a signal read out from the image sensing element 14 as image data in the memory 30 via the A/D converter 16 and memory control circuit 22, a development process using computation results in the image processing circuit 20 and memory control circuit 22, and a recording process for reading out image data from the memory 30, compressing the readout data by the compression/expansion circuit 32, and writing the compressed image data in the recording medium 500 or 510.

Reference numeral 66 denotes a selection/change switch which can select and change various functions upon executing image sensing and playback in a panoramic mode or the like.

Reference numeral 68 denotes a determination/execution switch which can determine and execute various functions upon executing image sensing and playback in a panoramic mode or the like.

Reference numeral 70 denotes a console including various buttons, touch panel, and the like, which include a menu button, set button, macro button, multi-frame playback new page button, flash setting button, single shot/continuous shot/self-tinier switch button, menu movement+(plus) button, menu movement−(minus) button, playback image movement+(plus) button, playback image movement−(minus) button, sensed image quality selection button, exposure correction button, date/time setting button, image display ON/OFF button for turning on/off the image display unit 28, quick review ON/OFF button for setting a quick review function of automatically playing back sensed image data on the image display unit 28 immediately after image sensing, and the like.

Reference numeral 72 denotes a compression mode switch, which is used for selecting a compression ratio of JPEG compression or selecting a CCDRAW mode for directly recording a signal output from the image sensing element and converted into a digital signal on a recording medium.

The JPEG compression mode includes, e.g., a normal mode and fine mode.

In the JPEG compression mode, image data, which is read out from the image sensing element 14 and is written in the memory 30 via the A/D converter 16, image processing circuit 20, and memory control circuit 22, is read out, and is compressed at the selected compression ratio by the compression/expansion circuit 32. After that, the compressed image data is recorded on the recording medium 500 or 510.

In the CCDRAW mode, image data, which is directly read out in units of lines in correspondence with the pixel formats of color filters of the image sensing element 14, and is written in the memory 30 via the A/D converter 16 and memory control circuit 22, is read out, and is recorded on the recording medium 500 or 510.

Reference numerals 74 and 76 denote zoom switches which zoom a photographing lens 310 via a zoom control means 344 of the lens unit 300. Note that the switch 74 is a zoom switch WIDE used for zooming the lens in the wide-angle direction, and the switch 76 is a zoom switch TELE used for zooming the lens in the telephoto direction. The switches 74 and 76 may be integrated.

Reference numeral 80 denotes a power supply control means, which is comprised of a battery detection circuit, a DC—DC converter, a switch circuit for switching a block to be energized, and the like. The power supply control means 80 detects the presence/absence, type, and remaining battery amount of a battery attached, controls the DC—DC converter on the basis of such detection results and an instruction from the system control circuit 50, and supplies a required voltage to the respective units including the recording medium for a required period of time.

Reference numerals 82 and 84 denote connectors; and 86, a power supply means including a primary battery such as an alkali battery, lithium battery, or the like, a secondary battery such as an NiCd battery, NiMH battery, Li Battery, or the like, an AC adapter, and the like.

Reference numerals 90 and 94 denote interfaces with recording media such as a memory card, hard disk, and the like; 92 and 96, connectors for connecting the recording media such as a memory card, hard disk, and the like; and 98, a recording medium attachment/detachment detection means for detecting whether or not the recording medium 500 or 510 is attached to the connector 92 and/or the connector 96.

Note that this embodiment has two sets of interfaces and connectors that receive the recording media. Of course, the number of sets of interfaces and connectors that receive the recording media is not particularly limited. Also, combinations of interfaces and connectors of different standards may be used.

As the interface and connector, those complying with the standards of a PCMCIA card, CF (compact flash) card, and the like may be used.

Furthermore, when the interfaces 90 and 94, and connectors 92 and 96 use those complying with the standards of a PCMCIA card, CF (compact flash) card, and the like, various communication cards such as a LAN card, modem card, USB card, IEEE1394 card, P1284 card, SCSI card, PHS, and the like are connected thereto, image data and associated management information can be transferred between the image processing apparatus 400 and an external computer or its peripheral devices such as a printer and the like.

Reference numeral 404 denotes the optical viewfinder, which allows image sensing using the optical viewfinder alone without using the electronic viewfinder function implemented by the image display unit 28. In the optical viewfinder 404, some functions of the indication unit 54, e.g., an in-focus indication, camera shake alert indication, flash charging indication, shutter speed indication, aperture value indication, exposure correction indication, and the like are placed.

Reference numeral 410 denotes a communication means having various communication functions such as RS232C, USB, IEEE1394, P1284, SCSI, modem, LAN, radio communication, and the like.

Reference numeral 412 denotes a connector or antenna (in case of a radio communication), which connects the image processing apparatus 400 to another device using the communication means 410.

Reference numeral 420 denotes an interface for connecting the image processing apparatus 400 to the lens unit 300 in a lens mount 406; 422, a connector for electrically connecting the image processing apparatus 400 to the lens unit 300; and 424, a lens attachment/detachment detection means for detecting whether or not the lens unit 300 is attached to the lens mount 406 and/or the connector 422.

The connector 422 transfers control signals, status signals, data signals, and the like between the image processing apparatus 400 and lens unit 300, and also has a function of supplying currents of various voltages. Also, the connector 422 may have an arrangement that realizes optical communications, voice communications, or the like in place of electrical communications.

Reference numeral 500 denotes the recording medium such as a memory card, hard disk, or the like. The recording medium 500 comprises a recording unit 502 comprised of a semiconductor memory, magnetic disk, or the like, an interface 504 with the image processing apparatus 400, and a connector 506 for connecting the image processing apparatus 400.

Reference numeral 510 denotes the recording medium such as a memory card, hard disk, or the like. The recording medium 510 comprises a recording unit 512 comprised of a semiconductor memory, magnetic disk, or the like, an interface 514 with the image processing apparatus 400, and a connector 516 for connecting the image processing apparatus 400.

Reference numeral 300 denotes the exchangeable lens type lens unit.

Reference numeral 306 denotes a lens mount for mechanically coupling the lens unit 300 to the image processing apparatus 400. The lens mount 306 includes various functions of electrically connecting the lens unit 300 to the image processing apparatus 400.

Reference numeral 310 denotes the photographing lens; and 312, a shutter with a stop function.

Reference numeral 320 denotes an interface for connecting the lens unit 300 to the image processing apparatus 400 in the lens mount 306; and 322, a connector for electrically connecting the lens unit 300 to the image processing apparatus 400.

The connector 322 transfers control signals, status signals, data signals, and the like between the image processing apparatus 400 and lens unit 300, and also has a function of supplying currents of various voltages. Also, the connector 322 may have an arrangement that realizes optical communications, voice communications, or the like in place of electrical communications.

Reference numeral 340 denotes the exposure control means for controlling the shutter 312 with the stop function. The exposure control means 340 also has a flash light control function in cooperation with an electronic flash 48.

Reference numeral 342 denotes the distance measurement control means for controlling focusing of the photographing lens 310; and 344, the zoom control means for controlling zooming of the photographing lens 310.

Reference numeral 350 denotes a lens system control circuit for controlling the overall lens unit 300. The lens system control circuit 350 has a function of a memory for storing constants, variables, programs, and the like for operations, and a function of a nonvolatile memory for holding identification information such as a number unique to the lens unit 300, management information, function information such as a full-open aperture value, minimum aperture value, focal length, and the like, the current and previous setting values, and the like.

The operation of the second embodiment will be explained below with reference to FIGS. 17, 18, 19, 20, and 21, and FIGS. 5, 6, 7, and 8 common to the first embodiment.

FIGS. 17, 18, 19, 20, and 21 are flow charts showing the main routine of the image processing apparatus 400 of this embodiment.

The operation of the image processing apparatus 400 will be described with the aid of FIGS. 17, 18, 19, 20, and 21.

Upon power ON after battery exchange or the like, the system control circuit 50 initializes flags, control variables, and the like, and initializes the respective units of the image processing apparatus 400 (step S101).

The system control circuit 50 checks the setting position of the mode dial 60. If the mode dial 60 is set at a power OFF position (step S102), the system control circuit 50 executes a predetermined end process (step S103). More specifically, the system control circuit 50 changes the indications of the respective indication units to an end state, protects an image sensing unit by closing a barrier if the lens unit 300 comprises the barrier or the like serving as a protection means, records required parameters and setting values including flags, control variables, and the like, and the setting mode in the nonvolatile memory 56, cuts off unnecessary power supply to the respective units of the image processing apparatus 400 including the image display unit 28 by the power supply control means 80, and so forth. After that, the flow returns to step S102.

If the mode dial 60 is set at any of other mode positions (step S102), the system control circuit 50 checks using the power supply control means 80 if the remaining capacity and operation state of the power supply means 86 comprising batteries and the like pose any problem in the operation of the image processing apparatus 400 (step S104). If any problem is found, a predetermined alert indication is made by means of an image or voice using the indication unit 54 (step S106), and the flow then returns to step S102.

When the image display of the image display unit 28 is ON, a predetermined alert display is made by means of an image or voice also using the image display unit 28.

If no problem is found in the power supply means 86 (step S104), the system control circuit 50 checks if the operation state of the recording medium 500 or 510 poses any problem in the operation of the image processing apparatus 400, in particular, recording/playback of image data to/from the recording medium (step S105). If any problem is found, a predetermined alert indication is made by means of an image or voice using the indication unit 54 (step S106), and the flow then returns to step S102.

When the image display of the image display unit 28 is ON, a predetermined alert display is made by means of an image or voice also using the image display unit 28.

If no problem is found in the operation state of the recording medium 500 or 510 (step S105), various setting states of the image display apparatus 400 are indicated by means of an image or voice using the indication unit 54 (step S107). When the image display of the image display unit 28 is ON, various setting states of the image display apparatus 400 are indicated by means of an image or voice also using the image display unit 28.

On the other hand, if the mode dial 60 is set at an image sensing mode position (step S108), a predetermined image sensing process is executed (step S109). Upon completion of the process, the flow returns to step S102.

If the mode dial 60 is set at any of other mode positions (step S108), the system control circuit 50 executes a process corresponding to the selected mode (step S110). Upon completion of the process, the flow returns to step S102.

If the mode dial 60 is set at a panoramic mode position (step S108), the system control circuit 50 checks if the zoom position of the photographing lens 310 is a predetermined home position (step S121). If the photographing lens is not located at the home position, the system control circuit 50 moves the zoom position to the home position (step S122).

Also, when the photographing lens 310 uses a selectable lens that can select one of a plurality of different focal lengths, the system control circuit 50 checks if that selectable lens of the photographing lens 310 is located on the predetermined home position side (step S121). If the selectable lens is not located on the home position side, the system control circuit 50 moves the selectable lens to the home position side (step S122).

As an example of the home position, in case of a zoom lens, the WIDE end as a focal length position on the wide-angle side suitable for panoramic image sensing can be used.

In case of a focal length selectable lens, a lens with a focal length on the WIDE side as that on the wide-angle end suitable for panoramic image sensing may be selected.

The present invention is not limited to such specific example, and any focal length may be set at a home position as long as it is suitable for panoramic image sensing.

The system control circuit 50 displays a panoramic mode selection window on the image display unit (step S111).

The user of the image processing apparatus 400 can select an arbitrary one of a plurality of panoramic image sensing modes by observing the panoramic mode selection window displayed on the image display unit 28.

The panoramic image sensing modes include a 2×2 panoramic mode, horizontal panoramic mode, vertical panoramic mode, and the like. In these modes, by combining a plurality of sensed images, a panoramic image, which is extended two-dimensionally, horizontally, or vertically, can be obtained.

A series of sensed images are appended with information indicating their positional relationship, and can be combined to generate a signal panoramic image by the image processing apparatus 400 itself or after they are transferred to, e.g., a computer or the like.

Note that an example of the panoramic mode selection window is the same as that shown in FIG. 9 that has already been explained in the first embodiment.

Referring to FIG. 9, the left icon is used for selecting the 2×2 panoramic mode for sensing a two-dimensional panoramic image, the central icon is used for selecting the horizontal panoramic mode for sensing a horizontal panoramic image, and the right icon is used for selecting a vertical panoramic mode for sensing a vertical panoramic image.

The user of the image processing apparatus 400 can select a desired panoramic mode by the selection/change switch 66

(e.g., [+] key), and can determine that panoramic mode by the determination/execution switch 68 (e.g., [SET] key).

When the panoramic mode is selected using the selection/change switch 66 and determination/execution switch 68, the system control circuit 50 sets initial values and memory areas of flags, parameters, and variables, reads out a display window serving as a user interface, and so forth in a 2×2 panoramic mode initial setup process (step S113), a vertical panoramic mode initial setup process (step S114), or a horizontal panoramic mode initial setup process (step S115) in correspondence with the selected panoramic mode (step S112), and displays a panoramic image sensing window corresponding to the selected mode on the image display unit 28 (step S116). The flow then advances to step S131.

Note that FIGS. 10A and 10B show examples of the horizontal panoramic mode image sensing window, FIGS. 11A and 11B show examples of the vertical panoramic mode image sensing window, and FIGS. 12A and 12B show examples of the 2×2 panoramic mode image sensing window, as in the description of the first embodiment.

FIG. 10A shows an image sensing window that creates a panoramic window by continuously repeating image sensing to the right, and FIG. 10B shows an image sensing window that creates a panoramic window by continuously repeating image sensing to the left.

Referring to FIGS. 10A and 10B, a through image from the electronic viewfinder is displayed on region "1" to sense the first image of a series of panoramic images. Before completion of image sensing of the first image, rightward image sensing (FIG. 10A) or leftward image sensing (FIG. 10B) can be desirably selected using the selection/change switch 66 (e.g., [+] key).

The image sensing direction is determined by sensing the first image by pressing the shutter button in desired one of the display window states shown in FIGS. 10A and 10B.

Note that the user can end image sensing in the horizontal panoramic mode by pressing the determination/execution switch 68 (e.g., [SET] key).

FIG. 11A shows an image sensing window that creates a panoramic window by continuously repeating image sensing upward, and FIG. 11B shows an image sensing window that creates a panoramic window by continuously repeating image sensing downward.

Referring to FIGS. 11A and 11B, a through image from the electronic viewfinder is displayed on region "1" to sense the first image of a series of panoramic images. Before completion of image sensing of the first image, upward image sensing (FIG. 11A) or downward image sensing (FIG. 11B) can be desirably selected using the selection/change switch 66 (e.g., [+] key).

The image sensing direction is determined by sensing the first image by pressing the shutter button in desired one of the display window states shown in FIGS. 11A and 11B.

Note that the user can end image sensing in the vertical panoramic mode by pressing the determination/execution switch 68 (e.g., [SET] key).

FIG. 12A shows an image sensing window for the first image upon creating a 2×2 panoramic window by two-dimensionally repeating image sensing of a total of four images in the vertical and horizontal directions, and FIG. 12B shows an image sensing window for the second image.

Referring to FIGS. 12A and 12B, a through image from the electronic viewfinder is displayed on, e.g., an upper right region to sense the first one of panoramic images.

Upon completion of image sensing of the first image, the playback image of the sensed image is displayed on, e.g., the upper right region, and a through image from the electronic viewfinder is displayed on, e.g., the lower right region to sense the second image.

The image sensing region of the electronic viewfinder is switched in turn to the next region after each image sensing. However, image sensing may be started from an arbitrary region, or may be redone by returning to the already sensed region. For this purpose, the image sensing region can be desirably shifted using the selection/change switch 66 (e.g., [+] switch).

The image sensing region to be re-sensed is determined and image sensing is executed by pressing the shutter button in a display window state that selects a desired region.

Note that the user can end image sensing in the 2×2 panoramic mode by pressing the determination/execution switch 68 (e.g., [SET] key).

The system control circuit 50 initializes flags and variables set in its internal memory or the memory 52. For example, the system control circuit 50 resets a panoramic image sensing start flag (step S131), sets variables m and n, and initializes them to m=1 and n 1, respectively (steps S133 and S132).

Note that the panoramic image sensing start flag is reset to indicate that no panoramic image sensing processes have been done.

Also, the variable n indicates the position of the current image sensing region in image sensing of each panoramic mode.

The variable m is used for returning the image sensing region of interest to the immediately preceding region or canceling such return, upon executing image sensing again in the horizontal and vertical panoramic modes.

An example of the method of using these flag and variables will be explained later.

If the mode dial 60 is set at any of mode positions other than the panoramic mode (step S134), the system control circuit 50 ends image sensing in the panoramic mode, and the flow returns to step S102. In this manner, the user of the image processing apparatus 400 can end the panoramic mode anytime he or she wants, and can select another mode.

If end of the panoramic mode is selected by pressing the determination/execution switch 68 (e.g., [SET] key) (step S135) while the mode dial 60 is kept set at the panoramic mode position (step S134), i.e., the display window of the image display unit 28 keeps displaying the corresponding panoramic image sensing window, a panoramic mode end confirmation message is displayed. Furthermore, if confirmation of end is selected (step S136), the flow returns to step S111 of displaying the panoramic mode selection window.

If the user has pressed the zoom switch WIDE 74 or zoom switch TELE 76 (step S161), the system control circuit 50 checks the status of the panoramic image sensing start flag (step S162).

If the panoramic image sensing start flag is reset, i.e., if the first image is not sensed yet in a series of panoramic image sensing processes (step S162), the system control circuit 50 executes predetermined zoom operation for zooming the photographing lens 310 via the interface 420, connector 422, connector 322, interface 320, lens system control circuit 350, and zoom control means 344 in accordance with an instruction input by the zoom switch WIDE 74 or zoom switch TELE 76 (step S163). The flow then advances to step S137.

If the panoramic image sensing start flag is set, i.e., if the first image has already been sensed in a series of panoramic image sensing processes (step S162), the system control circuit 50 makes a predetermined alert display by means of an image or voice using the indication unit 54 and/or the image display unit 28 (step S164). The flow advances to step S137 without executing any zoom operation.

With this control, an image which is unsuitable for panoramic synthesis can be prevented from being sensed by zoom operation of the photographing lens 310 during a series of panoramic image sensing processes.

If the selection/change switch 66 (e.g., [+] key) has been pressed while the image display unit 28 displays one of the above-mentioned panoramic image sensing windows (step S137), the system control circuit 50 executes a predetermined process in correspondence with the setups of the panoramic mode (step S138).

If the selection/change switch 66 (e.g., [+] key) is not pressed (step S137), the flow advances to step S146.

If the 2×2 panoramic mode is selected (step S138), the system control circuit 50 sets the variable n to be n=n+1 to select the next image sensing region (step S139). If n=5 (step S140), the first image sensing region is selected by setting n=n−4 (step S141). After that, the flow advances to step S146.

More specifically, every time the selection/change switch 66 (e.g., [+] key) is pressed, the image sensing region of interest shifts to one of the four image sensing regions in the 2×2 panoramic mode. For example, the image sensing region of interest shifts in the order of the upper right region, lower right region, lower left region, upper left region, upper right region, lower right region, . . . .

On the other hand, if the horizontal or vertical panoramic mode is selected (step S138), and if the panoramic image sensing start flag is reset, i.e., if the first image is not sensed yet in a series of panoramic image sensing processes (step S142), the system control circuit 50 reverses the image sensing direction of the selected panoramic mode (step S143). After that, the flow advances to step S146.

Note that the image sensing direction can be repetitively reversed before the first image is sensed.

FIGS. 10A and 10B that have already been described show examples of an image sensing direction reverse window in the horizontal panoramic mode.

FIG. 10A shows a window upon repeating image sensing to the right, and FIG. 10B shows a window upon repeating image sensing to the left.

FIGS. 11A and 11B that have already been described show examples of an image sensing direction reverse window in the vertical panoramic mode.

FIG. 11A shows a window upon repeating image sensing upward, and FIG. 11B shows a window upon repeating image sensing downward.

On the other hand, if the horizontal or vertical panoramic mode is selected (step S138) and if the panoramic image sensing start flag is set, i.e., if the first image has already been sensed in a series of panoramic image sensing processes (step S142), the system control circuit 50 computes m=m×(−1), the sign of which changes like −1, +1, −1, +1, . . . in every computation (step S144), and also computes n=n+m for the variable n, which changes like n=n−1, n=n+1, n=n−1, n=n+1, . . . in every computation (step S145). After that, the flow advances to step S146.

With this control, movement to the already sensed region (which is limited to the one sensed last) or cancel that movement can be repetitively selected to sense an image again.

After panoramic image sensing of the n-th image region, the user presses the selection/change switch 66 (e.g., [+] key) to confirm if quick review images of the (n−1)-th and n-th image regions smoothly join at their boundary regions.

Then, the user temporarily releases the selection/change switch 66 (e.g., [+] key) to display a through image on the n-th image region, and presses the selection/change switch 66 (e.g., [+] key) once again to display the original quick review image on the n-th image region and a through image on the (n+1)-th image region, thus executing the next panoramic image sensing.

After panoramic image sensing of the n-th image region, upon pressing the selection/change switch 66 (e.g., [+] key) to confirm if quick review images of the (n−1)-th and n-th image regions smoothly join at their boundary regions, if the user determines that image sensing must be redone, he or she temporarily releases the selection/change switch 66 (e.g., [+] key) to display a through image on the n-th image region, and presses the shutter switch SW2 in that window state to replace the image with the newly sensed image. Then, the user can execute the next panoramic image sensing.

The system control circuit 50 selects the n-th image region (step S146). If the window layout must be changed in correspondence with the selected image region (step S147), the system control circuit 50 switches and displays a new window layout (step S148), and the flow then advances to step S171.

In this fashion, a window corresponding to the reversed image sensing direction, as described above, a window corresponding to the changed image sensing region, a window that has updated characters and images for comments, or the like can be displayed as needed.

Upon sensing the second and subsequent images, the image sensing regions that display already sensed images are set in a quick review display state, and the image sensing region selected for the next image sensing is set in a through display state, thus displaying a playback image of the already sensed image and the next image to be sensed to partially overlap each other. In this manner, the user of the image processing apparatus 400 can easily determine the next image sensing angle.

The system control circuit 50 sets a through display state in which sensed image data is displayed as it is sensed (step S171), and the flow advances to step S172.

In through display, data, which have been written in the image display memory 24 via the image sensing element 14, A/D converter 16, image processing circuit 20, and memory control circuit 22, are displayed on the aforementioned image sensing region of the image display unit 28 via the memory control circuit 22 and D/A converter 26, thereby implementing an electronic viewfinder function.

If the shutter switch SW1 is not pressed (step S172), the flow returns to step S134.

If the shutter switch SW1 has been pressed (step S172), the system control circuit 50 sets the display state of the image display unit 28 in a freeze display state (step S173), and the flow advances to step S174.

In freeze display, image data on the image display memory 24 is inhibited from being rewritten via the image sensing element 14, A/D converter 16, image processing circuit 20, and memory control circuit 22, and the latest written image data is displayed on the above-mentioned image display region of the image display unit 28 via the memory control circuit 22 and D/A converter 26, thus displaying a frozen image on the electronic viewfinder.

The system control circuit 50 executes distance measurement to adjust the focus of the photographing lens 310 on the object, and executes photometry to determine the aperture value and shutter speed (step S174). In photometry, the electronic flash is set if necessary.

The details of the flow of this distance measurement/ photometry process step S174 are the same as those in FIG. 5 that has already been described in the first embodiment, but will be explained again later using FIG. 5.

Upon completion of the distance measurement/photometry process step S174, the system control circuit 50 sets the display state of the image display unit 28 in a through display state (step S175), and the flow advances to step S176. Note that the through display state in step S175 is the same as that in step S171.

If the shutter switch SW2 is not pressed (step S176) and the shutter switch SW1 is canceled (step S177), the flow returns to step S134.

If the shutter switch SW2 has been pressed (step S176), the system control circuit 50 sets the display state of the image display unit 28 in a fixed-color display state (step S178), and the flow advances to step S179.

In fixed-color display, in place of sensed image data, which has been written in the image display memory 24 via the image sensing element 14, A/D converter 16, image processing circuit 20, and memory control circuit 22, substitute fixed-color image data is displayed on the image display unit 28 via the memory control circuit 22 and D/A converter 26, thus displaying a fixed-color image on the electronic viewfinder.

The system control circuit 50 executes an image sensing process including an exposure process for writing sensed image data in the memory 30 via the image sensing element 14, A/D converter 16, image processing circuit 20, and memory control circuit 22 or directly from the A/D converter 16 via the memory control circuit 22, and a development process for executing various processes by reading out image data written in the memory 30 using the memory control circuit 22 and image processing circuit 20 if required (step S179).

The details of the flow of this image sensing process step S179 are the same as those in FIG. 6 that has already been described in the first embodiment, but will be explained again later using FIG. 6.

The system control circuit 50 executes a display image process for reading out image data written in the memory 30 by the image sensing process in step S179, and transferring the readout data to the image display memory 24 via the memory control circuit 22 (step S180).

The details of the flow of this display image process step S180 are the same as those in FIG. 7 that has already been described in the first embodiment, but will be explained again later using FIG. 7.

The system control circuit 50 sets the display state of the image display unit 28 in a quick review display state (step S181), and the flow advances to step S182.

In quick review display, image data transferred to the image display memory 24 by the display image process in step S180 is displayed on the aforementioned image sensing region of the image display unit 28 via the memory control circuit 22 and D/A converter 26, thus implementing an electronic viewfinder function that automatically plays back a sensed image.

The system control circuit 50 executes a compression process in which various image processes are done using the memory control circuit 22 and image processing circuit 20 if required by reading out sensed image data written in the memory 30, or an image is compressed in correspondence with the selected mode using the compression/expansion circuit 32 (step S182). After that, the system control circuit 50 executes a recording process for writing image data in the recording medium 500 or 510 such as a memory card, compact flash card, or the like via the interface 90 or 94, and the connector 92 or 96 (step S183).

The details of the flow of this compression process step S182 are the same as those in FIG. 8 that has already been described in the first embodiment, but will be explained again later using FIG. 8.

When the image display unit 28 is ON, a message such as "BUSY" or the like that indicates that a write is in progress is displayed on the image display unit 28 during a write of image data on the recording medium 500 or 510.

Furthermore, the indication unit 54 makes a recording medium write access indication by flickering an LED or the like in combination with the above message.

The system control circuit 50 continues quick review display on the image display unit 28 until the shutter switch SW2 is released (step S184). With this display, the user can carefully check the sensed image while pressing the shutter switch SW2.

If the shutter switch SW2 is released (step S184), the system control circuit 50 sets the panoramic image sensing start flag (step S185) to indicate that the first image has already been sensed in a series of panoramic image sensing processes. In this manner, as has been described in step S142, the image sensing direction can be inhibited from being reversed after the first image is sensed in the horizontal or vertical panoramic mode.

The system control circuit 50 sets the variable n to be n=n+1 to select the next image sensing region (step S186), and resets the variable m to m=1 (step S187). Then, the flow returns to step S134 to repeat a series of panoramic image sensing processes.

In this manner, after the control returns to step S134 upon releasing the shutter switch SW2, the next image sensing region is selected in step S146, the image sensing regions which include the previous image sensing region and display sensed images are set in the quick review display state, and the next image sensing region is set in the through display state, so as to display the sensed images and the next image to be sensed to overlap each other in step S148, thus allowing the user to easily sense panoramic images.

FIGS. 14A and 14B that have already been described in the first embodiment show examples of the image sensing window before and after completion of sensing of the n-th image in the horizontal panoramic mode.

FIG. 14A shows the image sensing window before sensing the first image, and FIG. 14B shows the image sensing window upon releasing the shutter switch SW2 after the first image is sensed. Although no dedicated explanatory view is available, before the shutter switch SW2 is released after the first image sensing, the first image sensing region in FIG. 14A on the image sensing window is set in a quick review display state.

FIGS. 15A and 15B that have already been described in the first embodiment show examples of the image sensing window before and after completion of sensing of the n-th image in the vertical panoramic mole.

FIG. 15A shows the image sensing window before sensing the first image, and FIG. 15B shows the image sensing window upon releasing the shutter switch SW2 after the first image is sensed. Although no dedicated explanatory view is available, before the shutter switch SW2 is released after the first image sensing, the first image sensing region in FIG. 15A on the image sensing window is set in a quick review display state.

Furthermore, FIGS. 12A to 13B that have already been described in the first embodiment show examples of the image sensing window before and after completion of sensing of the n-th image in the 2×2 panoramic mode.

FIG. 12A shows the image sensing window before the first image is sensed. FIG. 12B shows the image sensing window upon releasing the shutter switch SW2 after the first image is sensed, i.e., before the second image is sensed.

FIG. 13A shows the image sensing window upon releasing the shutter switch SW2 after the second image is sensed, i.e., before the third image is sensed, and FIG. 13B shows the image sensing window upon canceling the shutter switch SW2 after the third image is sensed, i.e., before the fourth image is sensed.

Although no dedicated explanatory view is available, before the shutter switch SW2 is released after the n-th image sensing, the n-th image sensing region in FIGS. 12A to 13B on the image sensing window is set in a quick review display state. When the shutter switch SW2 is released, a through display of the (n+1)-th image sensing region as the next region is added.

As mentioned above, according to the second embodiment, after a series of panoramic image sensing processes have started, zoom operation is inhibited, and a predetermined alert is generated, thus preventing an image unsuitable for panoramic synthesis from being sensed by zoom operation of the photographing lens 310 during a series of panoramic image sensing processes.

Figure 21:
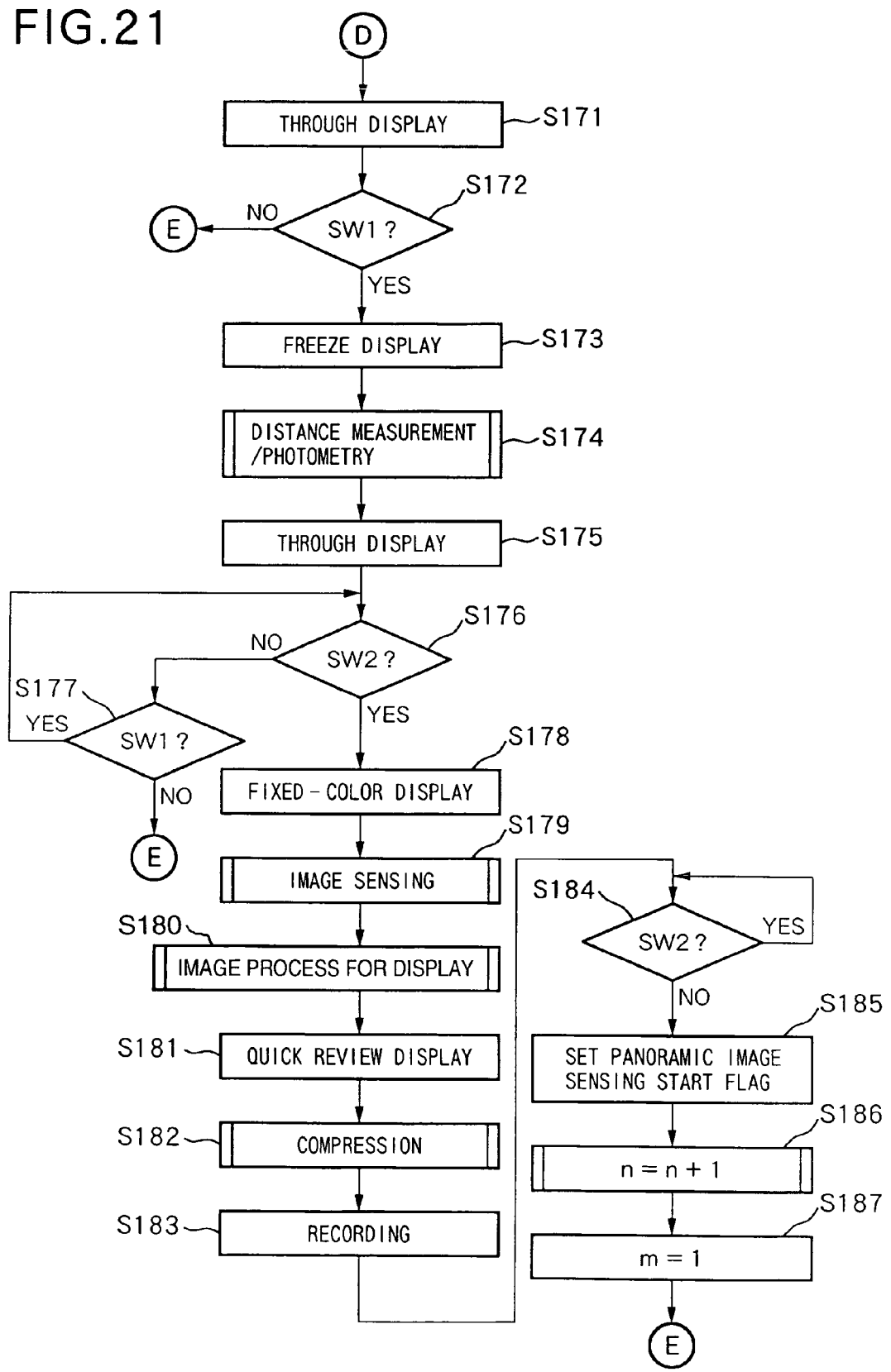
FIG. 21 is a flow chart of the main routine showing the operation of the image processing apparatus according to the second embodiment.
Figure 22:
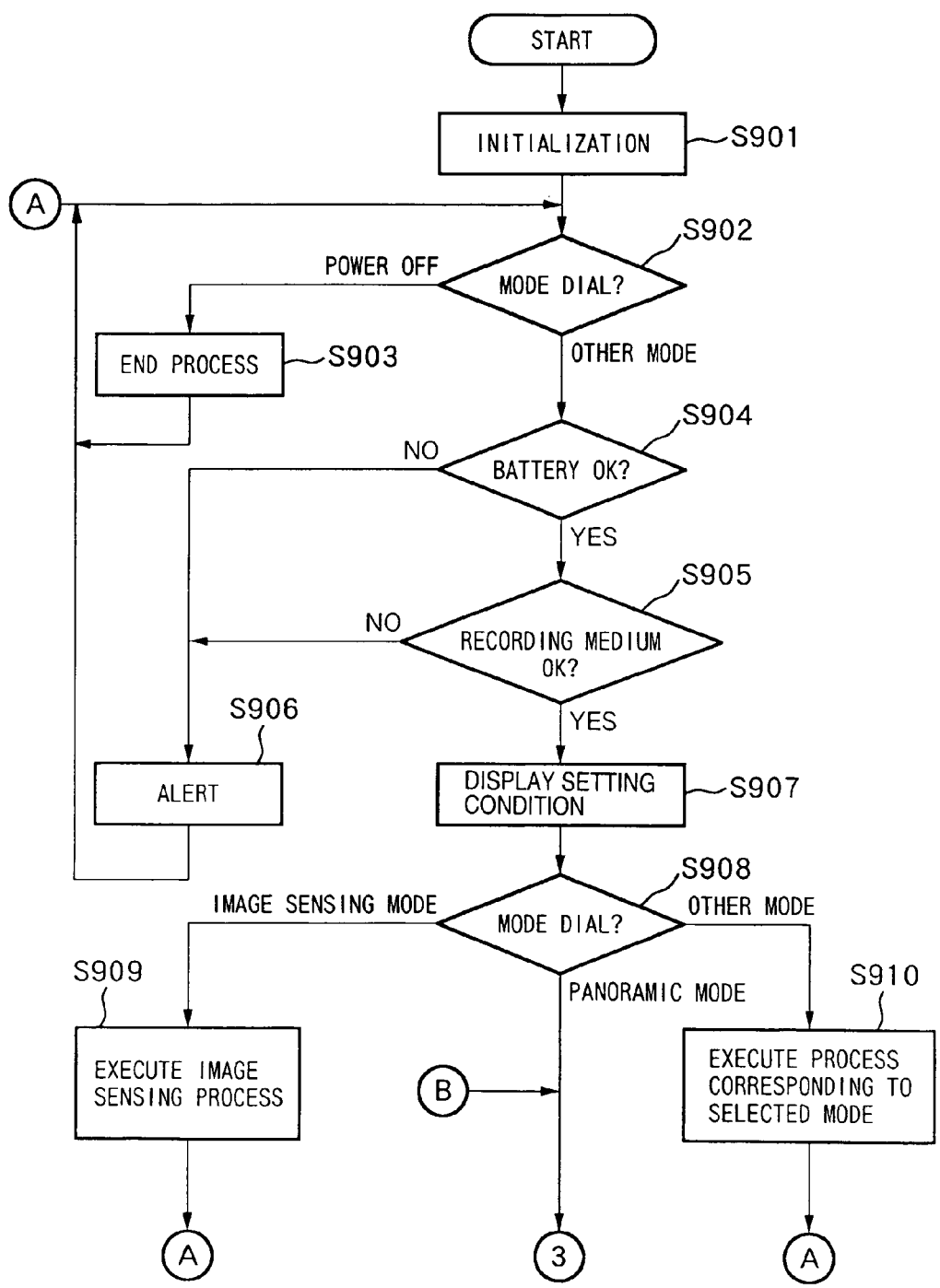
FIG. 22 is a flow chart of a main routine according to the third embodiment of the present invention.
Figure 23:
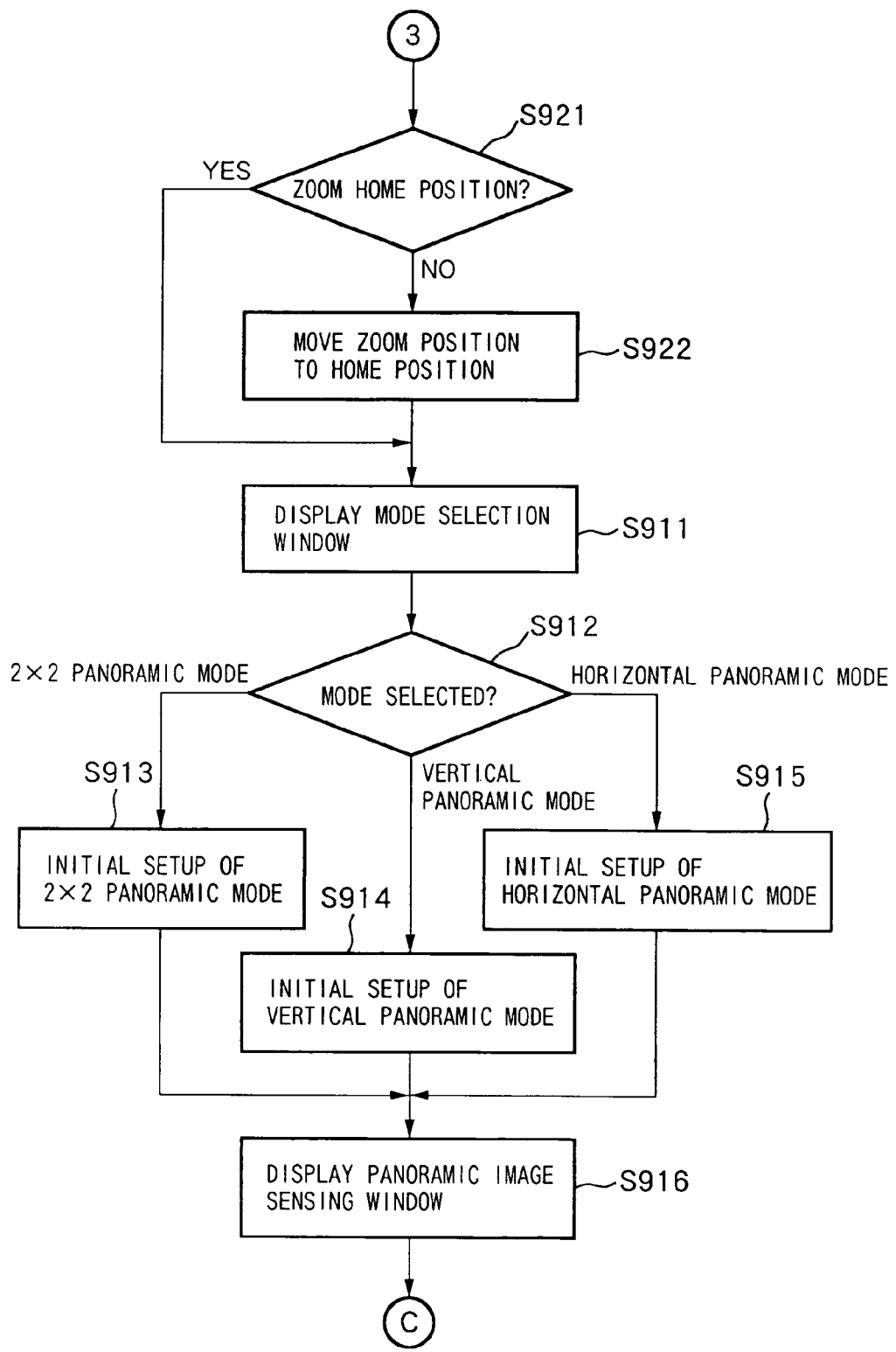
FIG. 23 is a flow chart of the main routine according to the third embodiment of the present invention.
Figure 24:
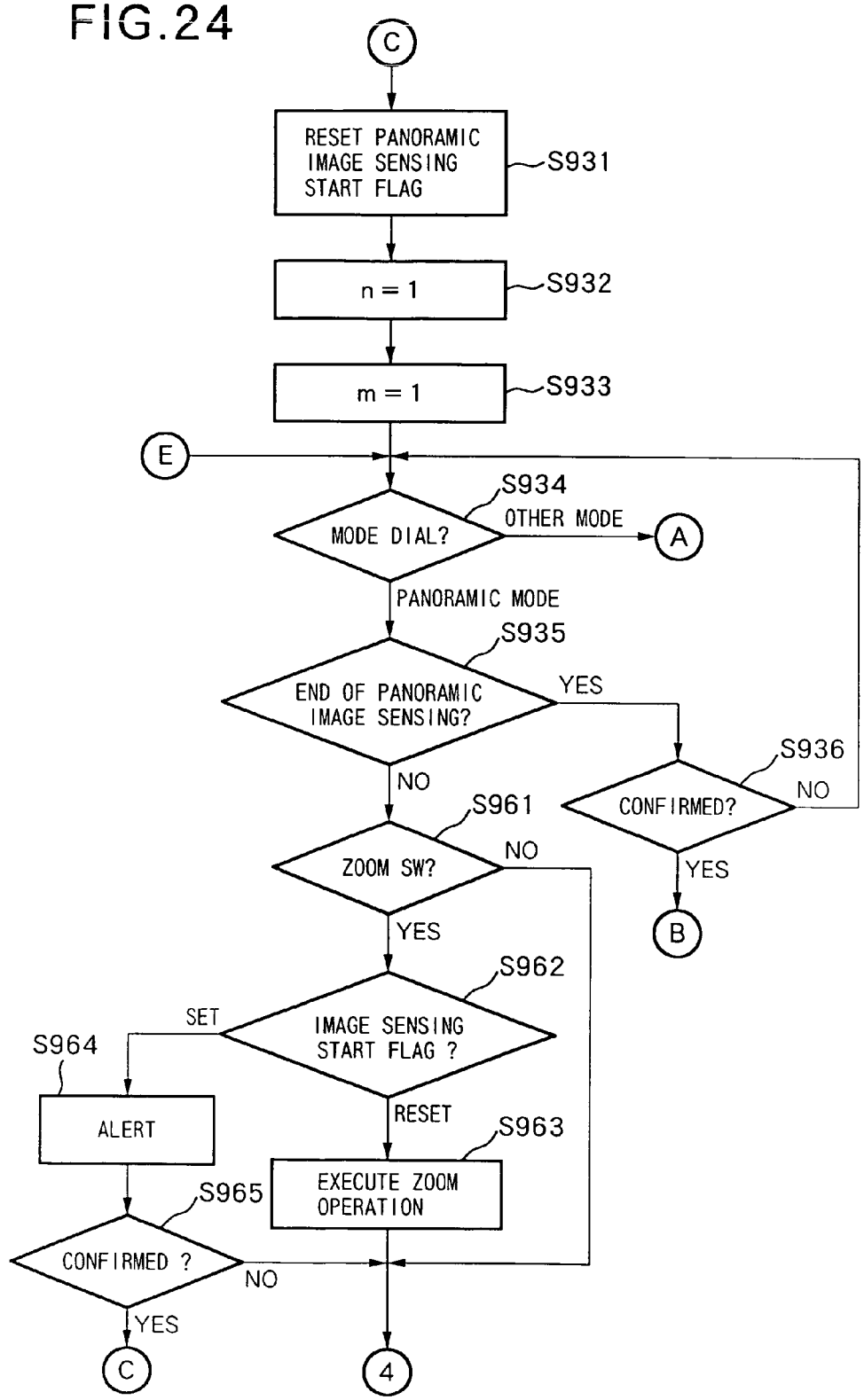
FIG. 24 is a flow chart of the main routine according to the third embodiment of the present invention.
Figure 25:
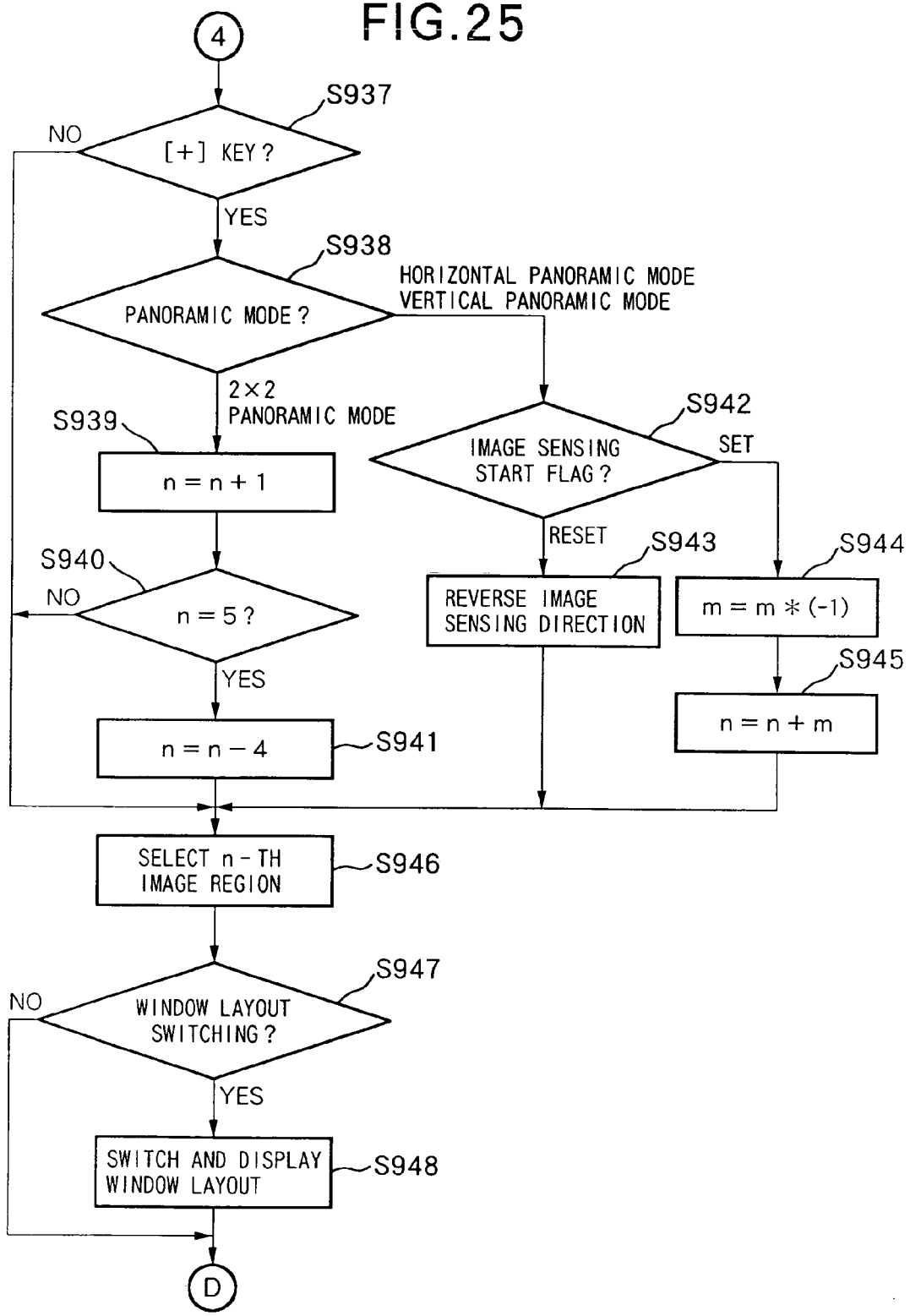
FIG. 25 is a flow chart of the main routine according to the third embodiment of the present invention.
Figure 26:
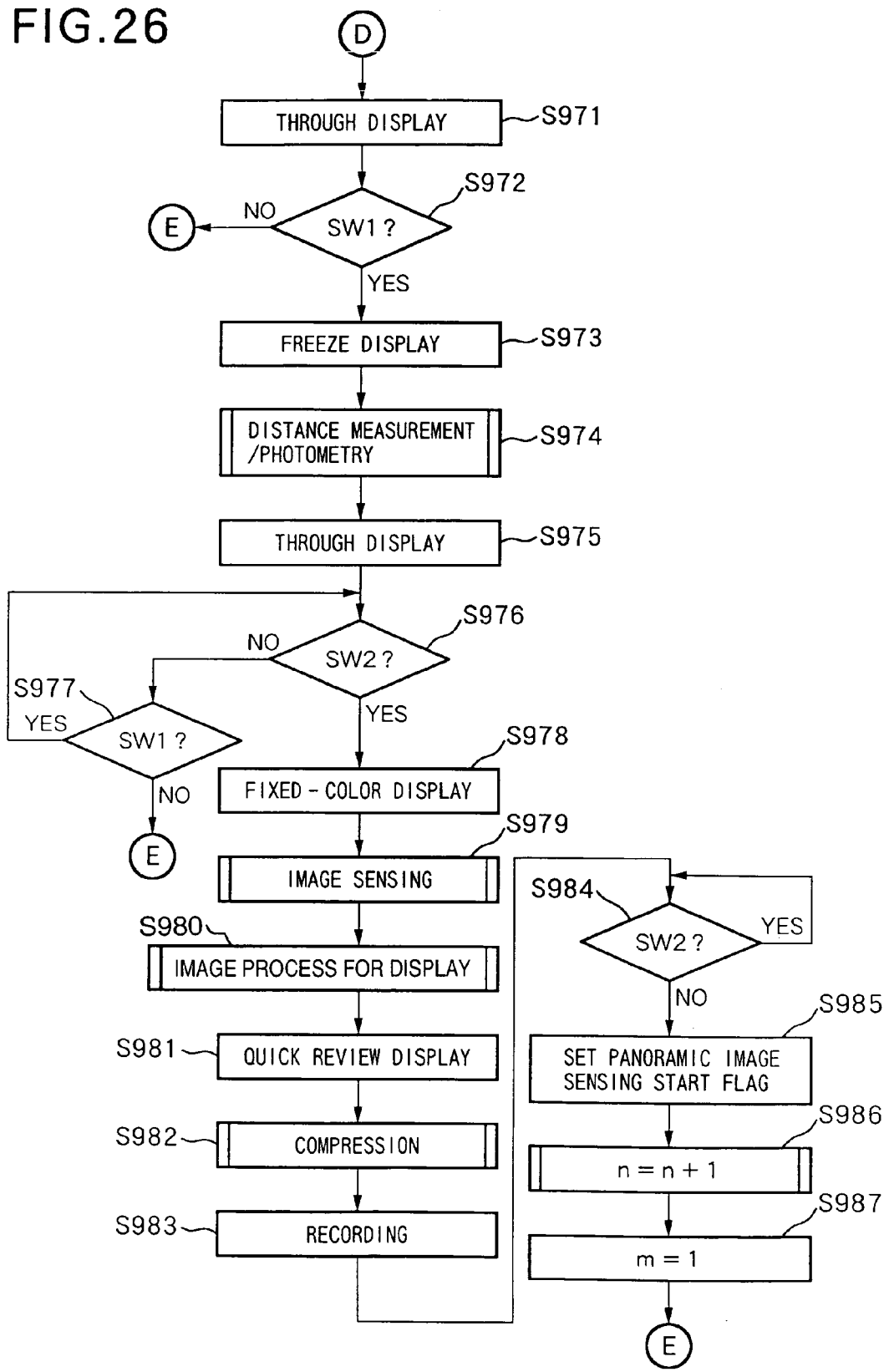
FIG. 26 is a flow chart of the main routine according to the third embodiment of the present invention.
Figure 27:
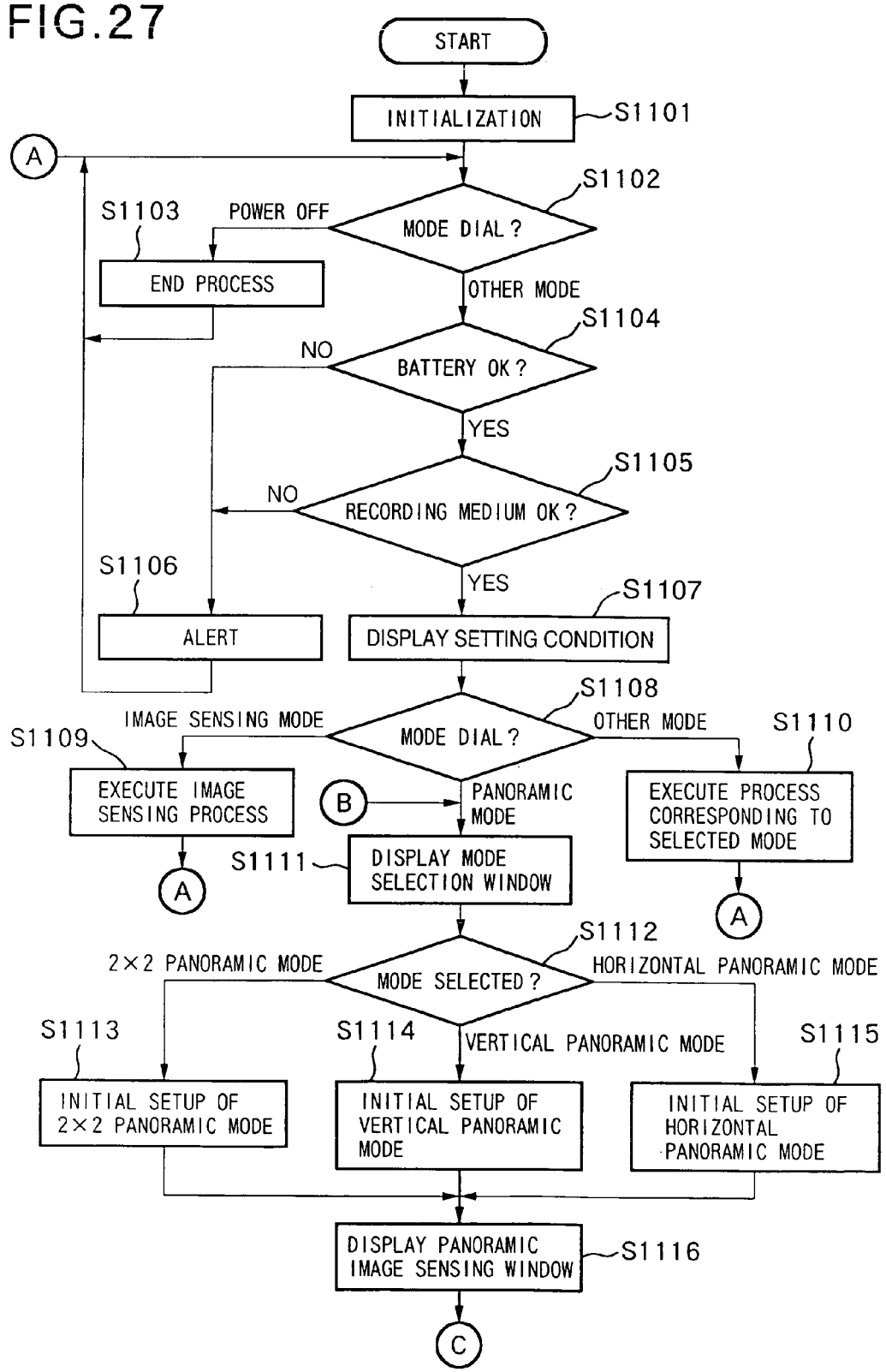
FIG. 27 is a flow chart of a main routine showing the operation of an image processing apparatus according to the fourth embodiment of the present invention.
Figure 28:
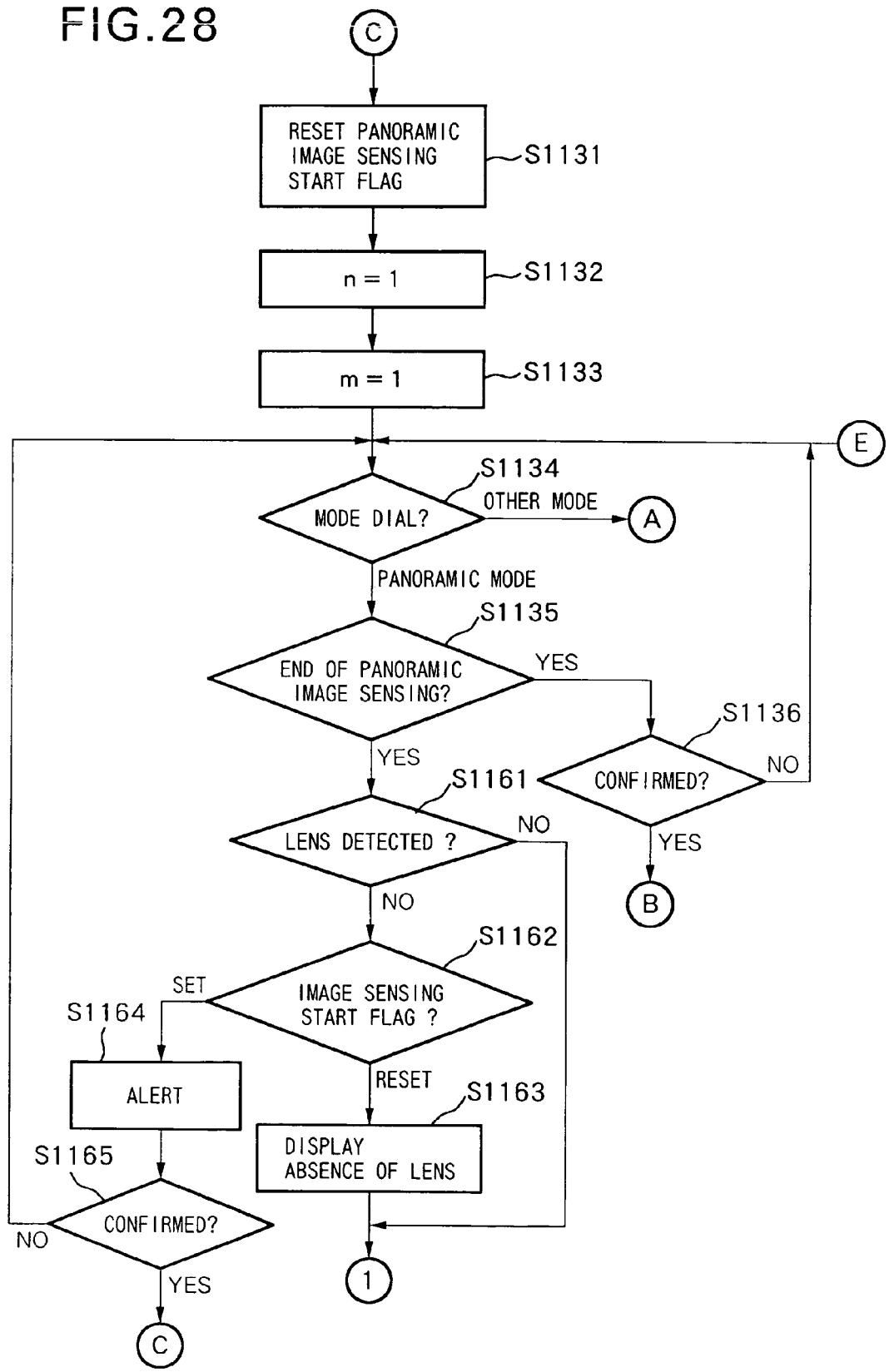
FIG. 28 is a flow chart of the main routine showing the operation of an image processing apparatus according to the fourth embodiment of the present invention.
Figure 29:
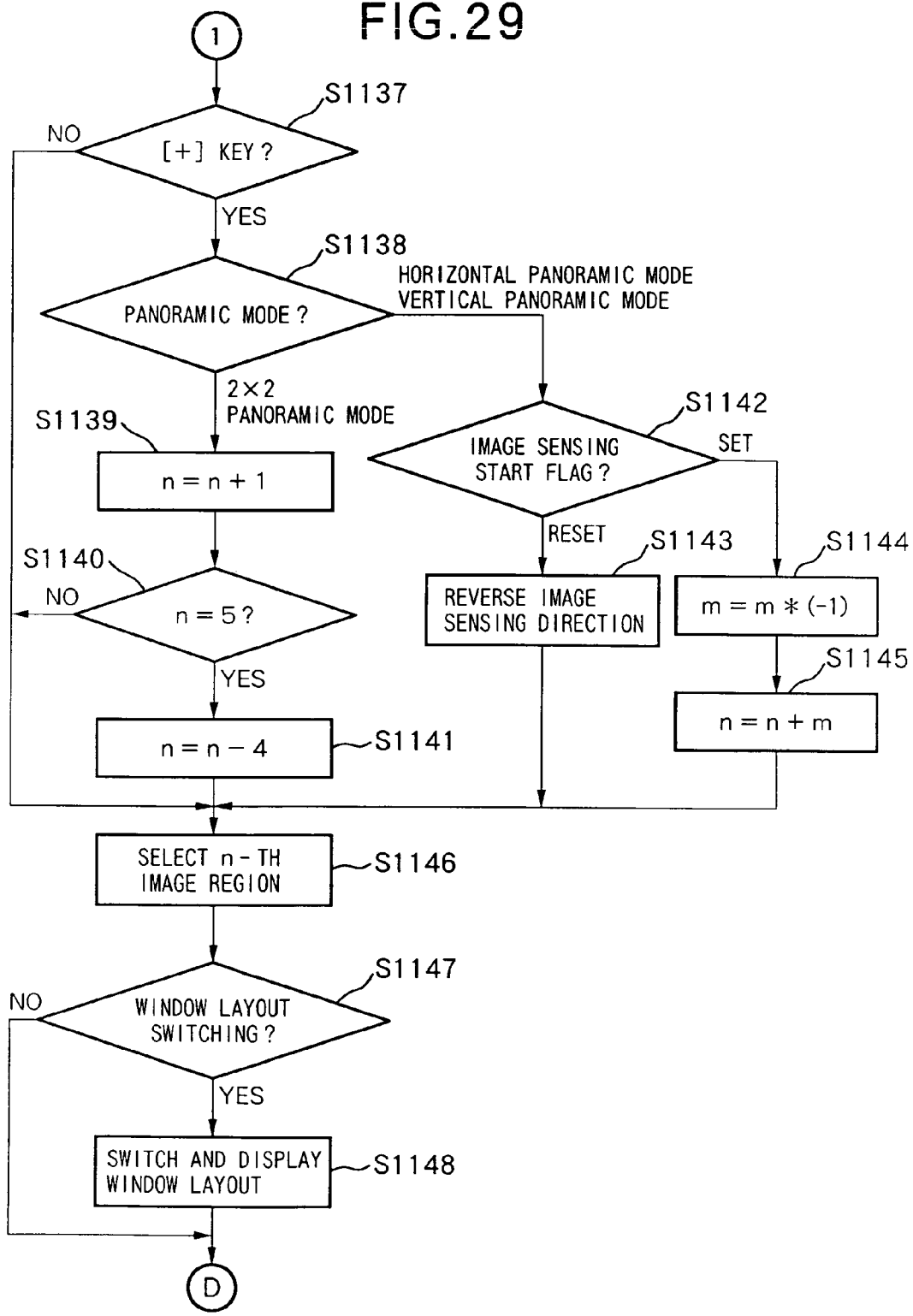
FIG. 29 is a flow chart of the main routine showing the operation of an image processing apparatus according to the fourth embodiment of the present invention.
Figure 30:
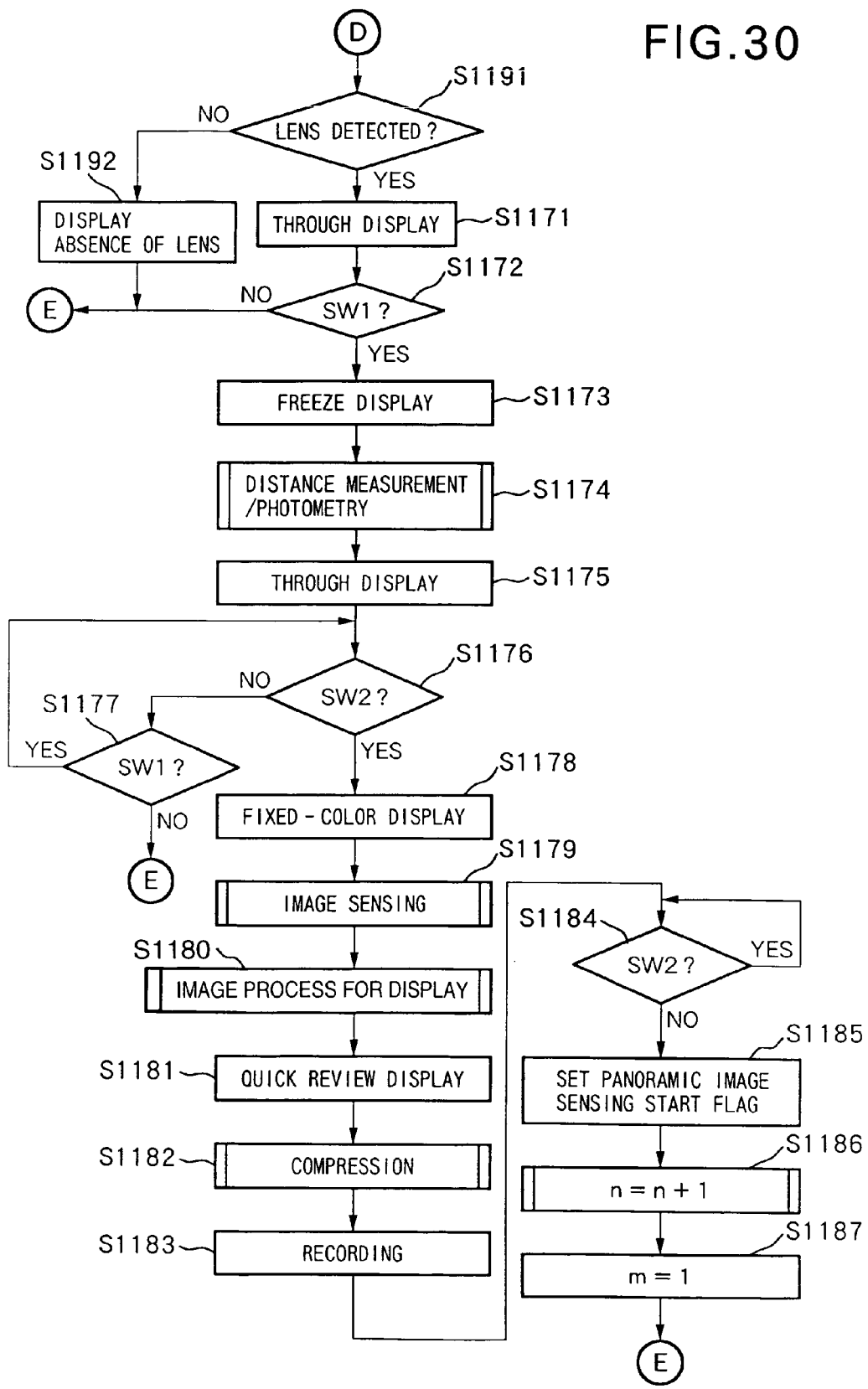
FIG. 30 is a flow chart of the main routine showing the operation of an image processing apparatus according to the fourth embodiment of the present invention.

FIG. 5 is a flow chart showing the flow of the operation of the distance measurement/photometry process in step S174 shown in FIG. 21 in detail.

The system control circuit 50 reads out a charge signal from the image sensing element 14, and the image processing circuit 20 sequentially reads sensed image data via the A/D converter 16 (step S501). Using the read image data, the image processing circuit 20 makes predetermined computations used in the TTL (Through The Lens) AE (auto exposure) process, EF (flash pre-emission) process, and AF (auto focus) process.

Note that the respective processes extract specific portions at required positions from all pixels, and use them in computations. In this manner, in the TTL AE, EF, AWB, and AF processes, optimal computations can be made in units of different modes, i.e., a center-weighted mode, average mode, evaluation mode, and the like.

The system control circuit 50 makes the exposure control means 340 execute AE control using the computation results of the image processing circuit 20 (step S503) until it is determined that the exposure value (AE) is appropriate (step S502).

The system control circuit 50 checks using measurement data obtained by the AE control if flash emission is required (step S504). If flash emission is required, the system control circuit 50 sets a flash flag to charge the electronic flash 48 (step S505).

If it is determined that the exposure value (AE) is appropriate (step S502), the system control circuit 50 stores the measurement data and/or setting parameters in its internal memory or the memory 52.

The system control circuit 50 makes the image processing circuit 20 execute AWB control by adjusting the color processing parameters (step S507) using the computation results of the image processing circuit 20 and measurement data obtained by the AE control, until it is determined that the white balance (AWB) is appropriate (step S506).

If it is determined that the white balance (AWB) is appropriate (step S506), the system control circuit 50 stores the measurement data and/or setting parameters in its internal memory or the memory 52.

The system control circuit 50 makes the distance measurement control means 342 execute AF control using measurement data obtained by the AE control and AWB control (step S509), until it is determined that the distance measurement (AF) result indicates in-focus (step S508).

If it is determined that the distance measurement (AF) result indicates in-focus (step S508), the system control circuit 50 stores the measurement data and/or setting parameters in its internal memory or the memory 52, thus ending the distance measurement/photometry process routine step S174.

FIG. 6 is a flow chart showing the image sensing process in step S179 in FIG. 21 in detail.

The system control circuit 50 opens the shutter 312 having a stop function using the exposure control means 340 in accordance with photometry data stored in its internal memory or the memory 52 to expose the image sensing element 14 (steps S601 and S602).

The system control circuit 50 checks based on the flash flag if the electronic flash 48 is required (step S603). If the electronic flash 48 is required, the system control circuit 50 controls the electronic flash to emit light (step S604).

The system control circuit 50 waits for completion of exposure of the image sensing element 14 in accordance with the photometry data (step S605), closes the shutter 312 (step S606), and reads a charge signal from the image sensing element 14 and writes sensed image data in the memory 30 via the A/D converter 16, image processing circuit 20, and memory control circuit 22 or directly from the A/D converter 16 via the memory control circuit 22 (step S607).

Upon completion of a series of processes, the image sensing process routine step S179 ends.

FIG. 7 is a flow chart showing the display image process in step S180 in FIG. 21 in detail.

If a frame process is required in correspondence with the selected image sensing mode (step S701), the system control circuit 50 reads out image data written in the memory 30, executes a vertical addition process (step S702) and color process (step S703) in turn using the memory control circuit 22 and image processing apparatus 20 if required, and writes the processed image data in the memory 30.

The system control circuit 50 reads out image data from the memory 30, and transfers display image data to the image display memory 24 via the memory control circuit 22 (step S704).

Upon completion of a series of processes, the display image process routine step S180 ends.

FIG. 8 is a flow chart showing the compression process in step S182 in FIG. 21 in detail.

The system control circuit 50 executes a pixel squaring process for reading out sensed image data written in the memory 30, and converting the vertical-to-horizontal pixel ratio of the image sensing element to 1:1 by interpolation using the memory control circuit 22 and image processing circuit 20 if required (step S801). The system control circuit 50 then writes the processed image data in the memory 30.

The system control circuit 50 reads out image data written in the memory 30, and executes image compression corresponding to the selected mode using the compression/expansion circuit 32 (step S802).

Upon completion of image compression, the compression process routine step S182 ends.

Third Embodiment

The operation of the third embodiment will be described below with reference to FIGS. 22, 23, 24, 25, 26, 5, 6, 7, and 8. The arrangement of the third embodiment has the same appearance as that of the second embodiment, except for its operation. Also, the processes shown in FIGS. 5, 6, 7, and 8 are the same as those in the second embodiment, and a detailed description thereof will be omitted.

The operation of the third embodiment will be explained below using FIGS. 22, 23, 24, 25, and 26.

Upon power ON after battery exchange or the like, the system control circuit 50 initializes flags, control variables, and the like, and initializes the respective units of the image processing apparatus 400 (step S901).

The system control circuit 50 checks the setting position of the mode dial 60. If the mode dial 60 is set at a power OFF position (step S902), the system control circuit 50 executes a predetermined end process (step S903). More specifically, the system control circuit 50 changes the indications of the respective indication units to an end state, protects an image sensing unit by closing a barrier if the lens unit 300 comprises the barrier or the like serving as a protection means, records required parameters and setting values including flags, control variables, and the like, and the setting mode in the nonvolatile memory 56, cuts off unnecessary power supply to the respective units of the image processing apparatus 400 including the image display unit 28 by the power supply control means 80, and so forth. After that, the flow returns to step S902.

If the mode dial 60 is set at any of other mode positions (step S902), the system control circuit 50 checks using the power supply control means 80 if the remaining capacity and operation state of the power supply means 86 comprising batteries and the like pose any problem in the operation of the image processing apparatus 400 (step S904). If any problem is found, a predetermined alert indication is made by means of an image or voice using the indication unit 54 (step S906), and the flow then returns to step S902.

When the image display of the image display unit 28 is ON, a predetermined alert display is made by means of an image or voice also using the image display unit 28.

If no problem is found in the power supply means 86 (step S904), the system control circuit 50 checks if the operation state of the recording medium 500 or 510 poses any problem in the operation of the image processing apparatus 400, in particular, recording/playback of image data to/from the recording medium (step S905). If any problem is found, a predetermined alert indication is made by means of an image or voice using the indication unit 54 (step S906), and the flow then returns to step S902.

When the image display of the image display unit 28 is ON, a predetermined alert display is made by means of an image or voice also using the image display unit 28.

If no problem is found in the operation state of the recording medium 500 or 510 (step S905), various setting states of the image display apparatus 400 are indicated by means of an image or voice using the indication unit 54 (step S907). When the image display of the image display unit 28 is ON, various setting states of the image display apparatus 400 are indicated by means of an image or voice also using the image display unit 28.

On the other hand, if the mode dial 60 is set at an image sensing mode position (step S908), a predetermined image sensing process is executed (step S909). Upon completion of the process, the flow returns to step S902.

If the mode dial 60 is set at any of other mode positions (step S908), the system control circuit 50 executes a process corresponding to the selected mode (step S910). Upon completion of the process, the flow returns to step S902.

If the mode dial 60 is set at a panoramic mode position (step S908), the system control circuit 50 checks if the zoom position of the photographing lens 310 is a predetermined home position (step S921). If the photographing lens is not located at the home position, the system control circuit 50 moves the zoom position to the home position (step S922).

Also, when the photographing lens 310 uses a selectable lens that can select one of a plurality of different focal lengths, the system control circuit 50 checks if that selectable lens of the photographing lens 310 is located on the predetermined home position side (step S921). If the selectable lens is not located on the home position side, the system control circuit 50 moves the selectable lens to the home position side (step S922).

As an example of the home position, in case of a zoom lens, the WIDE end as a focal length position on the wide-angle side suitable for panoramic image sensing can be used.

In case of a focal length selectable lens, a lens with a focal length on the WIDE side as that on the wide-angle end suitable for panoramic image sensing may be selected.

The present invention is not limited to such specific example, and any focal length may be set at a home position as long as it is suitable for panoramic image sensing.

The system control circuit 50 displays a panoramic mode selection window on the image display unit (step S911).

The user of the image processing apparatus 400 can select an arbitrary one of a plurality of panoramic image sensing modes by observing the panoramic mode selection window displayed on the image display unit 28.

The panoramic image sensing modes include a 2×2 panoramic mode, horizontal panoramic mode, vertical panoramic mode, and the like. In these modes, by combining a plurality of sensed images, a panoramic image, which is extended two-dimensionally, horizontally, or vertically, can be obtained.

A series of sensed images are appended with information indicating their positional relationship, and can be combined to generate a signal panoramic image by the image processing apparatus 400 itself or after they are transferred to, e.g., a computer or the like.

Note that an example of the panoramic mode selection window is the same as that shown in FIG. 9 that has already been explained.

Referring to FIG. 9, the left icon is used for selecting the 2×2 panoramic mode for sensing a two-dimensional panoramic image, the central icon is used for selecting the horizontal panoramic mode for sensing a horizontal panoramic image, and the right icon is used for selecting a vertical panoramic mode for sensing a vertical panoramic image.

The user of the image processing apparatus 400 can select a desired panoramic mode by the selection/change switch 66 (e.g., [+] key), and can determine that panoramic mode by the determination/execution switch 68 (e.g., [SET] key).

When the panoramic mode is selected using the selection/change switch 66 and determination/execution switch 68, the system control circuit 50 sets initial values and memory areas of flags, parameters, and variables, reads out a display window serving as a user interface, and so forth in a 2×2 panoramic mode initial setup process (step S913), a vertical panoramic mode initial setup process (step S914), or a horizontal panoramic mode initial setup process (step S915)

in correspondence with the selected panoramic mode (step S912), and displays a panoramic image sensing window corresponding to the selected mode on the image display unit 28 (step S916). The flow then advances to step S931.

Note that FIGS. 10A and 10B that have already been explained show examples of the horizontal panoramic mode image sensing window, FIGS. 11A and 11B show examples of the vertical panoramic mode image sensing window, and FIGS. 12A and 12B that have already been explained show examples of the 2×2 panoramic mode image sensing window.

FIG. 10A shows an image sensing window that creates a panoramic window by continuously repeating image sensing to the right, and FIG. 10B shows an image sensing window that creates a panoramic window by continuously repeating image sensing to the left.

Referring to FIGS. 10A and 10B, a through image from the electronic viewfinder is displayed on region "1" to sense the first image of a series of panoramic images. Before completion of image sensing of the first image, rightward image sensing (FIG. 10A) or leftward image sensing (FIG. 10B) can be desirably selected using the selection/change switch 66 (e.g., [+] key).

The image sensing direction is determined by sensing the first image by pressing the shutter button in desired one of the display window states shown in FIGS. 10A and 10B.

Note that the user can end image sensing in the horizontal panoramic mode by pressing the determination/execution switch 68 (e.g., [SET] key).

FIG. 11A shows an image sensing window that creates a panoramic window by continuously repeating image sensing upward, and FIG. 11B shows an image sensing window that creates a panoramic window by continuously repeating image sensing downward.

Referring to FIGS. 11A and 11B, a through image from the electronic viewfinder is displayed on region "1" to sense the first image of a series of panoramic images. Before completion of image sensing of the first image, upward image sensing (FIG. 11A) or downward image sensing (FIG. 11B) can be desirably selected using the selection/change switch 66 (e.g., [+] key).

The image sensing direction is determined by sensing the first image by pressing the shutter button in desired one of the display window states shown in FIGS. 11A and 11B.

Note that the user can end image sensing in the vertical panoramic mode by pressing the determination/execution switch 68 (e.g., [SET] key).

FIG. 12A shows an image sensing window for the first image upon creating a 2×2 panoramic window by two-dimensionally repeating image sensing of a total of four images in the vertical and horizontal directions, and FIG. 12B shows an image sensing window for the second image.

Referring to FIGS. 12A and 12B, a through image from the electronic viewfinder is displayed on, e.g., an upper right region to sense the first one of panoramic images.

Upon completion of image sensing of the first image, the playback image of the sensed image is displayed on, e.g., the upper right region, and a through image from the electronic viewfinder is displayed on, e.g., the lower right region to sense the second image.

The image sensing region of the electronic viewfinder is switched in turn to the next region after each image sensing. However, image sensing may be started from an arbitrary region, or may be redone by returning to the already sensed region. For this purpose, the image sensing region can be desirably shifted using the selection/change switch 66 (e.g., [+] switch).

The image sensing region to be re-sensed is determined and image sensing is executed by pressing the shutter button in a display window state that selects a desired region.

Note that the user can end image sensing in the 2×2 panoramic mode by pressing the determination/execution switch 68 (e.g., [SET] key).

The system control circuit 50 initializes flags and variables set in its internal memory or the memory 52. For example, the system control circuit 50 resets a panoramic image sensing start flag (step S931), sets variables m and n, and initializes them to m=1 and n=1, respectively (steps S933 and S932).

Note that the panoramic image sensing start flag is reset to indicate that no panoramic image sensing processes have been done.

Also, the variable n indicates the position of the current image sensing region in image sensing of each panoramic mode.

The variable m is used for returning the image sensing region of interest to the immediately preceding region or canceling such return, upon executing image sensing again in the horizontal and vertical panoramic modes.

An example of the method of using these flag and variables will be explained later.

If the mode dial 60 is set at any of mode positions other than the panoramic mode (step S934), the system control circuit 50 ends image sensing in the panoramic mode, and the flow returns to step S902. In this manner, the user of the image processing apparatus 400 can end the panoramic mode anytime he or she wants, and can select another mode.

If end of the panoramic mode is selected by pressing the determination/execution switch 68 (e.g., [SET] key) (step S935) while the mode dial 60 is kept set at the panoramic mode position (step S934), i.e., the display window of the image display unit 28 keeps displaying the corresponding panoramic image sensing window, a panoramic mode end confirmation message is displayed. Furthermore, if confirmation of end is selected (step S936), the flow returns to step S911 of displaying the panoramic mode selection window.

If the user has pressed the zoom switch WIDE 74 or zoom switch TELE 76 (step S961), the system control circuit 50 checks the status of the panoramic image sensing start flag (step S962).

If the panoramic image sensing start flag is reset, i.e., if the first image is not sensed yet in a series of panoramic image sensing processes (step S962), the system control circuit 50 executes predetermined zoom operation for zooming the photographing lens 310 via the interface 420, connector 422, connector 322, interface 320, lens system control circuit 350, and zoom control means 344 in accordance with an instruction input by the zoom switch WIDE 74 or zoom switch TELE 76 (step S963). The flow then advances to step S937.

If the panoramic image sensing start flag is set, i.e., if the first image has already been sensed in a series of panoramic image sensing processes (step S962), the system control circuit 50 makes a predetermined alert display by means of an image or voice using the indication unit 54 and/or the image display unit 28 (step S964). Furthermore, if confirmation of the end of a series of panoramic image sensing processes is selected (step S965), the system control circuit 50 temporarily ends the series of panoramic image sensing processes executed so far, and the flow returns to step S931 to start a new series of panoramic image sensing processes.

On the other hand, if cancel of the end of a series of panoramic image sensing processes is selected (step S965), the flow advances to step S937 without executing any zoom operation.

With this control, an image which is unsuitable for panoramic synthesis can be prevented from being sensed by zoom operation of the photographing lens 310 during a series of panoramic image sensing processes.

If the selection/change switch 66 (e.g., [+] key) has been pressed while the image display unit 28 displays one of the above-mentioned panoramic image sensing windows (step S937), the system control circuit 50 executes a predetermined process in correspondence with the setups of the panoramic mode (step S938).

If the selection/change switch 66 (e.g., [+] key) is not pressed (step S937), the flow advances to step S946.

If the 2×2 panoramic mode is selected (step S938), the system control circuit 50 sets the variable n to be n=n+1 to select the next image sensing region (step S939). If n=5 (step S940), the first image sensing region is selected by setting n=n−4 (step S941). After that, the flow advances to step S946.

More specifically, every time the selection/change switch 66 (e.g., [+] key) is pressed, the image sensing region of interest shifts to one of the four image sensing regions in the 2×2 panoramic mode. For example, the image sensing region of interest shifts in the order of the upper right region, lower right region, lower left region, upper left region, upper right region, lower right region, . . . .

On the other hand, if the horizontal or vertical panoramic mode is selected (step S938), and if the panoramic image sensing start flag is reset, i.e., if the first image is not sensed yet in a series of panoramic image sensing processes (step S942), the system control circuit 50 reverses the image sensing direction of the selected panoramic mode (step S943). After that, the flow advances to step S946.

Note that the image sensing direction can be repetitively reversed before the first image is sensed.

FIGS. 10A and 10B that have already been described show examples of an image sensing direction reverse window in the horizontal panoramic mode.

FIG. 10A shows a window upon repeating image sensing to the right, and FIG. 10B shows a window upon repeating image sensing to the left.

FIGS. 11A and 11B that have already been described show examples of an image sensing direction reverse window in the vertical panoramic mode.

FIG. 11A shows a window upon repeating image sensing upward, and FIG. 11B shows a window upon repeating image sensing downward.

On the other hand, if the horizontal or vertical panoramic mode is selected (step S938) and if the panoramic image sensing start flag is set, i.e., if the first image has already been sensed in a series of panoramic image sensing processes (step S942), the system control circuit 50 computes m=m×(−1), the sign of which changes like −1, +1, −1, +1, . . . . in every computation (step S944), and also computes n=n+m for the variable n, which changes like n=n−1, n=n+1, n=n−1, n=n+1, . . . . in every computation (step S945). After that, the flow advances to step S946.

With this control, movement to the already sensed region (which is limited to the one sensed last) or cancel that movement can be repetitively selected to sense an image again.

After panoramic image sensing of the n-th image region, the user presses the selection/change switch 66 (e.g., [+] key) to confirm if quick review images of the (n−1)-th and n-th image regions smoothly join at their boundary regions. Then, the user temporarily releases the selection/change switch 66 (e.g., [+] key) to display a through image on the n-th image region, and presses the selection/change switch 66 (e.g., [+] key) once again to display the original quick review image on the n-th image region and a through image on the (n+1)-th image region, thus executing the next panoramic image sensing.

After panoramic image sensing of the n-th image region, upon pressing the selection/change switch 66 (e.g., [+] key) to confirm if quick review images of the (n−1)-th and n-th image regions smoothly join at their boundary regions, if the user determines that image sensing must be redone, he or she temporarily releases the selection/change switch 66 (e.g., [+] key) to display a through image on the n-th image region, and presses the shutter switch SW2 in that window state to replace the image with the newly sensed image. Then, the user can execute the next panoramic image sensing.

The system control circuit 50 selects the n-th image region (step S946). If the window layout must be changed in correspondence with the selected image region (step S947), the system control circuit 50 switches and displays a new window layout (step S948) The flow then advances to step S971.

In this fashion, a window corresponding to the reversed image sensing direction, as described above, a window corresponding to the changed image sensing region, a window that has updated characters and images for comments, or the like can be displayed as needed.

Upon sensing the second and subsequent images, the image sensing regions that display already sensed images are set in a quick review display state, and the image sensing region selected for the next image sensing is set in a through display state, thus displaying a playback image of the already sensed image and the next image to be sensed to partially overlap each other. In this manner, the user of the image processing apparatus 400 can easily determine the next image sensing angle.

The system control circuit 50 sets a through display state in which sensed image data is displayed as it is sensed (step S971), and the flow advances to step S972.

In through display, data, which have been written in the image display memory 24 via the image sensing element 14, A/D converter 16, image processing circuit 20, and memory control circuit 22, are displayed on the aforementioned image sensing region of the image display unit 28 via the memory control circuit 22 and D/A converter 26, thereby implementing an electronic viewfinder function.

If the shutter switch SW1 is not pressed (step S972), the flow returns to step S934.

If the shutter switch SW1 has been pressed (step S972), the system control circuit 50 sets the display state of the image display unit 28 in a freeze display state (step S973), and the flow advances to step S974.

In freeze display, image data on the image display memory 24 is inhibited from being rewritten via the image sensing element 14, A/D converter 16, image processing circuit 20, and memory control circuit 22, and the latest written image data is displayed on the above-mentioned image display region of the image display unit 28 via the memory control circuit 22 and D/A converter 26, thus displaying a frozen image on the electronic viewfinder.

The system control circuit 50 executes distance measurement to adjust the focus of the photographing lens 310 on the object, and executes photometry to determine the aperture value and shutter speed (step S974). In photometry, the electronic flash is set if necessary.

The details of the flow of this distance measurement/ photometry process step S974 are the same as those in the second embodiment that has already been described using FIG. 5.

Upon completion of the distance measurement/photometry process step S974, the system control circuit 50 sets the display state of the image display unit 28 in a through display state (step S975), and the flow advances to step S976. Note that the through display state in step S975 is the same as that in step S971.

If the shutter switch SW2 is not pressed (step S976) and the shutter switch SW1 is canceled (step S977), the flow returns to step S934.

If the shutter switch SW2 has been pressed (step S976), the system control circuit 50 sets the display state of the image display unit 28 in a fixed-color display state (step S978), and the flow advances to step S979.

In fixed-color display, in place of sensed image data, which has been written in the image display memory 24 via the image sensing element 14, A/D converter 16, image processing circuit 20, and memory control circuit 22, substitute fixed-color image data is displayed on the image display unit 28 via the memory control circuit 22 and D/A converter 26, thus displaying a fixed-color image on the electronic viewfinder.

The system control circuit 50 executes an image sensing process including an exposure process for writing sensed image data in the memory 30 via the image sensing element 14, A/D converter 16, image processing circuit 20, and memory control circuit 22 or directly from the A/D converter 16 via the memory control circuit 22, and a development process for executing various processes by reading out image data written in the memory 30 using the memory control circuit 22 and image processing circuit 20 if required (step S979).

The details of the flow of this image sensing process step S979 are the same as those in the second embodiment that has already been described using FIG. 6.

The system control circuit 50 executes a display image process for reading out image data written in the memory 30 by the image sensing process in step S979, and transferring the readout data to the image display memory 24 via the memory control circuit 22 (step S980).

The details of the flow of this display image process step S980 are the same as those in the second embodiment that has already been described using FIG. 7.

The system control circuit 50 sets the display state of the image display unit 28 in a quick review display state (step S981), and the flow advances to step S982.

In quick review display, image data transferred to the image display memory 24 by the display image process in step S980 is displayed on the aforementioned image sensing region of the image display unit 28 via the memory control circuit 22 and D/A converter 26, thus implementing an electronic viewfinder function that automatically plays back a sensed image.

The system control circuit 50 executes a compression process in which various image processes are done using the memory control circuit 22 and image processing circuit 20 if required by reading out sensed image data written in the memory 30, or an image is compressed in correspondence with the selected mode using the compression/expansion circuit 32 (step S982). After that, the system control circuit 50 executes a recording process for writing image data in the recording medium 500 or 510 such as a memory card, compact flash card, or the like via the interface 90 or 94, and the connector 92 or 96 (step S983).

The details of the flow of this compression process step S982 are the same as those in the second embodiment that has already been described using FIG. 8.

When the image display unit 28 is ON, a message such as "BUSY" or the like that indicates that a write is in progress is displayed on the image display unit 28 during a write of image data on the recording medium 500 or 510.

Furthermore, the indication unit 54 makes a recording medium write access indication by flickering an LED or the like in combination with the above message.

The system control circuit 50 continues quick review display on the image display unit 28 until the shutter switch SW2 is released (step S984). With this display, the user can carefully check the sensed image while pressing the shutter switch SW2.

If the shutter switch SW2 is released (step S984), the system control circuit 50 sets the panoramic image sensing start flag (step S985) to indicate that the first image has already been sensed in a series of panoramic image sensing processes. In this manner, as has been described in step S942, the image sensing direction can be inhibited from being reversed after the first image is sensed in the horizontal or vertical panoramic mode.

The system control circuit 50 sets the variable n to be n=n+1 to select the next image sensing region (step S986), and resets the variable m to m=1 (step S987). Then, the flow returns to step S934 to repeat a series of panoramic image sensing processes.

In this manner, after the control returns to step S934 upon releasing the shutter switch SW2, the next image sensing region is selected in step S946, the image sensing regions which include the previous image sensing region and display sensed images are set in the quick review display state, and the next image sensing region is set in the through display state, so as to display the sensed images and the next image to be sensed to overlap each other in step S948, thus allowing the user to easily sense panoramic images.

FIGS. 14A and 14B that have already been described show examples of the image sensing window before and after completion of sensing of the n-th image in the horizontal panoramic mode.

FIG. 14A shows the image sensing window before sensing the first image, and FIG. 14B shows the image sensing window upon releasing the shutter switch SW2 after the first image is sensed. Although no dedicated explanatory view is available, before the shutter switch SW2 is released after the first image sensing, the first image sensing region in FIG. 14A on the image sensing window is set in a quick review display state.

FIGS. 15A and 15B that have already been described show examples of the image sensing window before and after completion of sensing of the n-th image in the vertical panoramic mode.

FIG. 15A shows the image sensing window before sensing the first image, and FIG. 15B shows the image sensing window upon releasing the shutter switch SW2 after the first image is sensed. Although no dedicated explanatory view is available, before the shutter switch SW2 is released after the first image sensing, the first image sensing region in FIG. 15A on the image sensing window is set in a quick review display state.

Furthermore, FIGS. 12A to 13B that have already been described show examples of the image sensing window before and after completion of sensing of the n-th image in the 2×2 panoramic mode.

FIG. 12A shows the image sensing window before the first image is sensed. FIG. 12B shows the image sensing window upon releasing the shutter switch SW2 after the first image is sensed, i.e., before the second image is sensed.

FIG. 13A shows the image sensing window upon releasing the shutter switch SW2 after the second image is sensed, i.e., before the third image is sensed, and FIG. 13B shows the image sensing window upon canceling the shutter switch SW2 after the third image is sensed, i.e., before the fourth image is sensed.

Although no dedicated explanatory view is available, before the shutter switch SW2 is released after the n-th image sensing, the n-th image sensing region in FIGS. 12A to 13B on the image sensing window is set in a quick review display state. When the shutter switch SW2 is released, a through display of the (n+1)-th image sensing region as the next region is added.

As mentioned above, according to the third embodiment, when zoom operation is done after the start of a series of panoramic image sensing processes, a predetermined alert is generated to ask the user of the image processing apparatus 400 if he or she actually wants to zoom. After that, a series of panoramic image sensing processes are temporarily interrupted. Thus, an image which is unsuitable for panoramic synthesis can be prevented from being sensed by zoom operation of the photographing lens 310 during a series of panoramic image sensing processes.

The second and third embodiments have been explained using FIG. 16.

In the description of the second and third embodiments, the photographing lens 310 uses a zoom lens, but may use a selectable lens that can select one of a wide-angle lens and telephoto lens. In this case, as in the description of the embodiments, execution of lens selection is inhibited in correspondence with the state of the panoramic image sensing start flag, and a predetermined alert is generated. Or after a predetermined alert is generated to ask the user if he or she actually wants such lens selection, a series of panoramic image sensing processes can be ended, and a new series of panoramic image sensing processes can be started.

In the description of the third embodiment, if the end of a series of panoramic image sensing processes is confirmed in step S965, the flow returns to step S931 to start a new series of panoramic image sensing processes. Alternatively, the flow may return to step S921 to restart setups from the panoramic mode selection window, and then a new series of panoramic image sensing processes may be started.

Note that the number of types of selectable panoramic modes on the panoramic mode selection window is 3, i.e., the 2×2 panoramic mode, horizontal panoramic mode, and vertical panoramic mode. However, the present invention is not limited to these specific modes, and one or a plurality of types of an arbitrary number of different panoramic modes may be selectable.

Also, display of the panoramic mode selection window shown in FIG. 9 is not limited to this example. Alternatively, display with an arbitrary layout or scheme using an image or voice may be made.

On the 2×2 panoramic mode image sensing window, a total of four images are two-dimensionally laid out in a 2×2 matrix. However, the present invention is not limited to such matrix. For example, an arbitrary number of images such as a total of nine images, a total of 16 images, and the like may be laid out in a two-dimensional or three-dimensional matrix.

On the horizontal and vertical panoramic mode image sensing windows, two images are continuously displayed. However, the present invention is not limited to such specific display, and an arbitrary number of images (e.g., three images, four images, and the like) may be one-dimensionally displayed.

The displays of the panoramic mode image sensing windows shown in FIGS. 10A to 15B are not limited to these examples, and displays with arbitrary layouts and schemes using images, voices, characters, symbols, and the like may be made.

In the horizontal and vertical panoramic modes, the image sensing direction is inhibited from being reversed after the first image is sensed. However, the present invention is not limited to this, and the image sensing direction may be reversed as needed. Also, the image sensing direction may be changed in one of arbitrary directions including the right and left directions, up and down directions, or oblique directions. In the present invention, when a large number of image display regions can be simultaneously displayed by increasing the display area of the image display unit 28, the image sensing direction can be changed in one of arbitrary directions including the right and left directions, up and down directions, or oblique directions.

Image sensing can be redone for only the immediately preceding sensed image in the horizontal and vertical panoramic modes. However, the present invention is not limited to this. For example, image sensing may be redone for an image sensed an arbitrary number of images before.

The next image display region for displaying an image to be sensed is set in the through display state, and that for displaying the already sensed image is set in the quick review display state, to display a playback image of the already sensed image and the next image to be sensed so that their boundary regions partially overlap each other. However, the present invention is not limited to such specific scheme. For example, the images may be displayed without making their boundary regions overlap each other.

In the explanatory views of the panoramic modes in FIGS. 10A to 15B, for example, comment words "LIVE" and "FREEZE" are added within the image display regions. However, the actual image display unit 28 may or may not display these comment words.

In the above description, the lens unit 300 is independent from the image processing apparatus 400 and is arbitrarily connectable. However, the lens unit 300 may be integrated with the image processing apparatus 400.

Furthermore, a plurality of lens units 300 may be detachably attached to the image processing apparatus 400.

The recording media 500 and 510 are not limited to memory cards such as PCMCIA cards, compact flash cards, or the like, hard disks, and the like, but may use micro DATs (digital audio tapes), magnetooptical disks, optical disks such as CD-Rs, CD-WRs, or the like, phase change optical disks such as DVDs, and the like.

Also, the recording media 500 and 510 may use hybrid media that integrate memory cards, hard disks, and the like. Furthermore, such hybrid media may include detachable media.

In the description of the second and third embodiments, the recording media 500 and 510 are independent from the image processing apparatus 400 and are arbitrarily connectable. One or both the recording media 500 and 510 may be permanently connected to the image processing apparatus 400. When all the recording media are permanently connected to the image processing apparatus 400, no alert display is made in correspondence with the presence/absence of recording media. However, when all the recording media are incapable of recording due to failures, a recording inhibition setup state, no free recording area, and the like, the same effect as in the above embodiments can be obtained.

An arbitrary number (one or a plurality) of image recording media 500 or 510 may be connectable to the image processing apparatus 400.

In the above description, the recording media 500 and 510 are attached to the image processing apparatus. However, one or a combination of a plurality of recording media may be used.

In the description of the second and third embodiments, the focal length is changed as a changeable condition of the optical system of the photographing lens. However, the present invention is not limited to such specific condition. For example, the changeable condition of the optical system includes exchange of lenses, stop, focus position, shutter speed, and the like, and the present invention can be applied to such changes in condition of the optical system.

Synthesis of a panoramic image has been described as an example in which a plurality of images are associated. Also, the present invention can be applied to a case wherein a plurality of images are sensed while shifting pixels, and a high-resolution image is obtained by synthesizing these images.

To restate, the second and third embodiments can solve the conventional problem that the image quality deteriorates considerably due to extra correction computations required to correct different focal lengths upon generating a panoramic image by combining a plurality of sensed images when the user of the image processing apparatus such as an electronic camera or the like switches the focal length of the photographing lens or performs zooming.

Also, the second and third embodiments can solve the conventional problems that the outer shape of a synthesized panoramic image varies in units of sensed image and has steps when the individual sensed images have considerably different angles due to switching of the focal length of the photographing lens or zooming.

Furthermore, the second and third embodiments can remedy a situation in the conventional art where the aforementioned problems readily occur when the user switches the focal length of the photographing lens or zooms even during sensing of a plurality of images for obtaining a panoramic image if he or she notices during panoramic image sensing that the focal length of the photographing lens is switched to a side unsuitable for panoramic image sensing or that the zoom position of the zoom lens is unsuitable for panoramic image sensing.

Fourth Embodiment

The operation of the fourth embodiment will be described below with reference to FIGS. 27, 28, 29, 30, 5, 6, 7, and 8. The arrangement of the fourth embodiment has the same appearance as that of the second embodiment, except for its operation. Also, the processes shown in FIGS. 5, 6, 7, and 8 are the same as those in the second embodiment, and a detailed description thereof will be omitted.

FIGS. 27, 28, 29, and 30 are flow charts showing the main routine of the image processing apparatus 400 of this embodiment.

The operation of the third embodiment will be explained below using FIGS. 27, 28, 29, and 30.

Upon power ON after battery exchange or the like, the system control circuit 50 initializes flags, control variables, and the like, and initializes the respective units of the image processing apparatus 400 (step S1101).

The system control circuit 50 checks the setting position of the mode dial 60. If the mode dial 60 is set at a power OFF position (step S1102), the system control circuit 50 executes a predetermined end process (step S1103). More specifically, the system control circuit 50 changes the indications of the respective indication units to an end state, protects an image sensing unit by closing a barrier if the lens unit 300 comprises the barrier or the like serving as a protection means, records required parameters and setting values including flags, control variables, and the like, and the setting mode in the nonvolatile memory 56, cuts off unnecessary power supply to the respective units of the image processing apparatus 400 including the image display unit 28 by the power supply control means 80, and so forth. After that, the flow returns to step S1102.

If the mode dial 60 is set at any of other mode positions (step S1102), the system control circuit 50 checks using the power supply control means 80 if the remaining capacity and operation state of the power supply means 86 comprising batteries and the like pose any problem in the operation of the image processing apparatus 400 (step S1104). If any problem is found, a predetermined alert indication is made by means of an image or voice using the indication unit 54 (step S1106), and the flow then returns to step S1102.

When the image display of the image display unit 28 is ON, a predetermined alert display is made by means of an image or voice also using the image display unit 28.

If no problem is found in the power supply means 86 (step S1104), the system control circuit 50 checks if the operation state of the recording medium 500 or 510 poses any problem in the operation of the image processing apparatus 400, in particular, recording/playback of image data to/from the recording medium (step S1105). If any problem is found, a predetermined alert indication is made by means of an image or voice using the indication unit 54 (step S1106), and the flow then returns to step S1102.

When the image display of the image display unit 28 is ON, a predetermined alert display is made by means of an image or voice also using the image display unit 28.

If no problem is found in the operation state of the recording medium 500 or 510 (step S1105), various setting states of the image display apparatus 400 are indicated by means of an image or voice using the indication unit 54 (step S1107). When the image display of the image display unit 28 is ON, various setting states of the image display apparatus 400 are indicated by means of an image or voice also using the image display unit 28.

On the other hand, if the mode dial 60 is set at an image sensing mode position (step S1108), a predetermined image sensing process is executed (step S1109). Upon completion of the process, the flow returns to step S1102.

If the mode dial 60 is set at any of other mode positions (step S1108), the system control circuit 50 executes a process corresponding to the selected mode (step S1110). Upon completion of the process, the flow returns to step S1102.

If the mode dial 60 is set at a panoramic mode position (step S1108), the system control circuit 50 displays a panoramic mode selection window on the image display unit (step S1111).

The user of the image processing apparatus 400 can select an arbitrary one of a plurality of panoramic image sensing modes by observing the panoramic mode selection window displayed on the image display unit 28.

The panoramic image sensing modes include a 2×2 panoramic mode, horizontal panoramic mode, vertical panoramic mode, and the like. In these modes, by combining a plurality of sensed images, a panoramic image, which is extended two-dimensionally, horizontally, or vertically, can be obtained.

A series of sensed images are appended with information indicating their positional relationship, and can be combined to generate a signal panoramic image by the image processing apparatus 400 itself or after they are transferred to, e.g., a computer or the like.

Note that an example of the panoramic mode selection window is the same as that shown in FIG. 9 that has already been described.

Referring to FIG. 9, the left icon is used for selecting the 2×2 panoramic mode for sensing a two-dimensional panoramic image, the central icon is used for selecting the horizontal panoramic mode for sensing a horizontal panoramic image, and the right icon is used for selecting a vertical panoramic mode for sensing a vertical panoramic image.

The user of the image processing apparatus 400 can select a desired panoramic mode by the selection/change switch 66 (e.g., [+] key), and can determine that panoramic mode by the determination/execution switch 68 (e.g., [SET] key).

When the panoramic mode is selected using the selection/change switch 66 and determination/execution switch 68, the system control circuit 50 sets initial values and memory areas of flags, parameters, and variables, reads out a display window serving as a user interface, and so forth in a 2×2 panoramic mode initial setup process (step S1113), a vertical panoramic mode initial setup process (step S1114), or a horizontal panoramic mode initial setup process (step S1115) in correspondence with the selected panoramic mode (step S1112), and displays a panoramic image sensing window corresponding to the selected mode on the image display unit 28 (step S1116). The flow then advances to step S1131.

Note that FIGS. 10A and 10B that have already been described show examples of the horizontal panoramic mode image sensing window, FIGS. 11A and 11B that have already been described show examples of the vertical panoramic mode image sensing window, and FIGS. 12A and 12B that have already been described show examples of the 2×2 panoramic mode image sensing window.

FIG. 10A shows an image sensing window that creates a panoramic window by continuously repeating image sensing to the right, and FIG. 10B shows an image sensing window that creates a panoramic window by continuously repeating image sensing to the left.

Referring to FIGS. 10A and 10B, a through image from the electronic viewfinder is displayed on region "1" to sense the first image of a series of panoramic images. Before completion of image sensing of the first image, rightward image sensing (FIG. 10A) or leftward image sensing (FIG. 10B) can be desirably selected using the selection/change switch 66 (e.g., [+] key).

The image sensing direction is determined by sensing the first image by pressing the shutter button in desired one of the display window states shown in FIGS. 10A and 10B.

Note that the user can end image sensing in the horizontal panoramic mode by pressing the determination/execution switch 68 (e.g., [SET] key).

FIG. 11A shows an image sensing window that creates a panoramic window by continuously repeating image sensing upward, and FIG. 11B shows an image sensing window that creates a panoramic window by continuously repeating image sensing downward.

Referring to FIGS. 11A and 11B, a through image from the electronic viewfinder is displayed on region "1" to sense the first image of a series of panoramic images. Before completion of image sensing of the first image, upward image sensing (FIG. 11A) or downward image sensing (FIG. 11B) can be desirably selected using the selection/change switch 66 (e.g., [+] key).

The image sensing direction is determined by sensing the first image by pressing the shutter button in desired one of the display window states shown in FIGS. 11A and 11B.

Note that the user can end image sensing in the vertical panoramic mode by pressing the determination/execution switch 68 (e.g., [SET] key).

FIG. 12A shows an image sensing window for the first image upon creating a 2×2 panoramic window by two-dimensionally repeating image sensing of a total of four images in the vertical and horizontal directions, and FIG. 12B shows an image sensing window for the second image.

Referring to FIGS. 12A and 12B, a through image from the electronic viewfinder is displayed on, e.g., an upper right region to sense the first one of panoramic images.

Upon completion of image sensing of the first image, a playback image of the sensed image is displayed on, e.g., the upper right region, and a through image from the electronic viewfinder is displayed on, e.g., the lower right region to sense the second image.

The image sensing region of the electronic viewfinder is switched in turn to the next region after each image sensing. However, image sensing may be started from an arbitrary region, or may be redone by returning to the already sensed region. For this purpose, the image sensing region can be desirably shifted using the selection/change switch 66 (e.g., [+] switch).

The image sensing region to be re-sensed is determined and image sensing is executed by pressing the shutter button in a display window state that selects a desired region.

Note that the user can end image sensing in the 2×2 panoramic mode by pressing the determination/execution switch 68 (e.g., [SET] key).

The system control circuit 50 initializes flags and variables set in its internal memory or the memory 52. For example, the system control circuit 50 resets a panoramic image sensing start flag (step S1131), sets variables m and n, and initializes them to m=1 and n 1, respectively (steps S1133 and S1132).

Note that the panoramic image sensing start flag is reset to indicate that no panoramic image sensing processes have been done.

Also, the variable n indicates the position of the current image sensing region in image sensing of each panoramic mode.

The variable m is used for returning the image sensing region of interest to the immediately preceding region or canceling such return, upon executing image sensing again in the horizontal and vertical panoramic modes.

An example of the method of using these flag and variables will be explained later.

If the mode dial 60 is set at any of mode positions other than the panoramic mode (step S1134), the system control circuit 50 ends image sensing in the panoramic mode, and the flow returns to step S1102. In this manner, the user of the image processing apparatus 400 can end the panoramic mode anytime he or she wants, and can select another mode.

If end of the panoramic mode is selected by pressing the determination/execution switch 68 (e.g., [SET] key) (step S1135) while the mode dial 60 is kept set at the panoramic mode position (step S1134), i.e., the display window of the image display unit 28 keeps displaying the corresponding panoramic image sensing window, a panoramic mode end confirmation message is displayed. Furthermore, if confirmation of end is selected (step S1136), the flow returns to step S1111 of displaying the panoramic mode selection window.

The system control circuit 50 checks if the lens unit 300 is attached to the image processing apparatus 400 (step S1161). If the lens unit 300 is attached, the flow advances to step S1137.

If the lens unit 300 is not attached to the image processing apparatus 400 (step S1161), the system control circuit 50 checks the status of the panoramic image sensing start flag (step S1162).

If the panoramic image sensing start flag is reset, i.e., if the first image is not sensed yet in a series of panoramic image sensing processes (step S1162), the system control circuit 50 displays that no lens is attached using the indication unit 54 and/or image display unit 28 to call user's attention (step S1163). The flow then advances to step S1137.

If the panoramic image sensing start flag is set, i.e., if the first image has already been sensed in a series of panoramic image sensing processes (step S1162), the system control circuit 50 makes a predetermined alert display by means of an image or voice using the indication unit 54 and/or the image display unit 28 (step S1164). Furthermore, if confirmation of the end of a series of panoramic image sensing processes is selected (step S1165), the series of panoramic image sensing processes executed so far end, and the flow returns to step S1131 to start a new series of panoramic image sensing processes.

If cancel of the end of a series of panoramic image sensing processes is selected (step S1165), the flow returns to step S1134.

With this process, an image, which is unsuitable for panoramic synthesis, can be prevented from being sensed when the lens unit 300 is exchanged by another lens unit with a different focal length during a series of panoramic image sensing processes.

If the selection/change switch 66 (e.g., [+] key) has been pressed while the image display unit 28 displays one of the above-mentioned panoramic image sensing windows (step S1137), the system control circuit 50 executes a predetermined process in correspondence with the setups of the panoramic mode (step S1138).

If the selection/change switch 66 (e.g., [+] key) is not pressed (step S1137), the flow advances to step S1146.

If the 2×2 panoramic mode is selected (step S1138), the system control circuit 50 sets the variable n to be n=n+1 to select the next image sensing region (step S1139). If n=5 (step S1140), the first image sensing region is selected by setting n=n−4 (step S1141). After that, the flow advances to step S1146.

More specifically, every time the selection/change switch 66 (e.g., [+] key) is pressed, the image sensing region of interest shifts to one of the four image sensing regions in the 2×2 panoramic mode. For example, the image sensing region of interest shifts in the order of the upper right region, lower right region, lower left region, upper left region, upper right region, lower right region, . . . .

On the other hand, if the horizontal or vertical panoramic mode is selected (step S1138), and if the panoramic image sensing start flag is reset, i.e., if the first image is not sensed yet in a series of panoramic image sensing processes (step S1142), the system control circuit 50 reverses the image sensing direction of the selected panoramic mode (step S1143). After that, the flow advances to step S1146.

Note that the image sensing direction can be repetitively reversed before the first image is sensed.

FIGS. 10A and 10B that have already been described show examples of an image sensing direction reverse window in the horizontal panoramic mode.

FIG. 10A shows a window upon repeating image sensing to the right, and FIG. 10B shows a window upon repeating image sensing to the left.

FIGS. 11A and 11B that have already been described show examples of an image sensing direction reverse window in the vertical panoramic mode.

FIG. 11A shows a window upon repeating image sensing upward, and FIG. 11B shows a window upon repeating image sensing downward.

On the other hand, if the horizontal or vertical panoramic mode is selected (step S1138) and if the panoramic image sensing start flag is set, i.e., if the first image has already been sensed in a series of panoramic image sensing processes (step S1142), the system control circuit 50 computes m=m×(−1), the sign of which changes like −1, +1, −1, +1, . . . . in every computation (step S1144), and also computes n=n+m for the variable n, which changes like n=n−1, n=n+1, n=n−1, n=n+1, . . . in every computation (step S1145). After that, the flow advances to step S1146.

With this control, movement to the already sensed region (which is limited to the one sensed last) or cancel that movement can be repetitively selected to sense an image again.

After panoramic image sensing of the n-th image region, the user presses the selection/change switch 66 (e.g., [+] key) to confirm if quick review images of the (n−1)-th and n-th image regions smoothly join at their boundary regions. Then, the user temporarily releases the selection/change switch 66 (e.g., [+] key) to display a through image on the n-th image region, and presses the selection/change switch 66 (e.g., [+] key) once again to display the original quick review image on the n-th image region and a through image on the (n+1)-th image region, thus executing the next panoramic image sensing.

After panoramic image sensing of the n-th image region, upon pressing the selection/change switch 66 (e.g., [+] key) to confirm if quick review images of the (n−1)-th and n-th image regions smoothly join at their boundary regions, if the user determines that image sensing must be redone, he or she temporarily releases the selection/change switch 66 (e.g., [+] key) to display a through image on the n-th image region, and presses the shutter switch SW2 in that window state to replace the image with the newly sensed image. Then, the user can execute the next panoramic image sensing.

The system control circuit 50 selects the n-th image region (step S1146). If the window layout must be changed in correspondence with the selected image region (step S1147), the system control circuit 50 switches and displays a new window layout (step S1148), and the flow then advances to step S1191.

In this fashion, a window corresponding to the reversed image sensing direction, as described above, a window corresponding to the changed image sensing region, a window that has updated characters and images for comments, or the like can be displayed as needed.

Upon sensing the second and subsequent images, the image sensing regions that display already sensed images are set in a quick review display state, and the image sensing region selected for the next image sensing is set in a through display state, thus displaying a playback image of the already sensed image and the next image to be sensed to partially overlap each other. In this manner, the user of the image processing apparatus 400 can easily determine the next image sensing angle.

The system control circuit 50 checks if the lens unit 300 is attached to the image processing apparatus 400 (step S1191). If the lens unit 300 is attached, the flow advances to step S1171.

If the lens unit 300 is not attached to the image processing apparatus 400 (step S1191), the system control circuit 50 displays that no lens is attached using the indication unit 54 and/or image display unit 28 to call user's attention (step S1192). The flow then returns to step S1134.

With this process, an image, which is unsuitable for panoramic synthesis, can be prevented from being sensed when the lens unit 300 is exchanged by another lens unit with a different focal length during a series of panoramic image sensing processes.

The system control circuit 50 sets a through display state in which sensed image data is displayed as it is sensed (step S1171), and the flow advances to step S1172.

In through display, data, which have been written in the image display memory 24 via the image sensing element 14, A/D converter 16, image processing circuit 20, and memory control circuit 22, are displayed on the aforementioned image sensing region of the image display unit 28 via the memory control circuit 22 and D/A converter 26, thereby implementing an electronic viewfinder function.

If the shutter switch SW1 is not pressed (step S1172), the flow returns to step S1134.

If the shutter switch SW1 has been pressed (step S1172), the system control circuit 50 sets the display state of the image display unit 28 in a freeze display state (step S1173), and the flow advances to step S1174.

In freeze display, image data on the image display memory 24 is inhibited from being rewritten via the image sensing element 14, A/D converter 16, image processing circuit 20, and memory control circuit 22, and the latest written image data is displayed on the above-mentioned image display region of the image display unit 28 via the memory control circuit 22 and D/A converter 26, thus displaying a frozen image on the electronic viewfinder.

The system control circuit 50 executes distance measurement to adjust the focus of the photographing lens 310 on the object, and executes photometry to determine the aperture value and shutter speed (step S1174). In photometry, the electronic flash is set if necessary.

The details of the flow of this distance measurement/photometry process step S1174 are the same as those of the second embodiment that has been described using FIG. 5.

Upon completion of the distance measurement/photometry process step S1174, the system control circuit 50 sets the display state of the image display unit 28 in a through display state (step S1175), and the flow advances to step S1176. Note that the through display state in step S1175 is the same as that in step S1171.

If the shutter switch SW2 is not pressed (step S1176) and the shutter switch SW1 is canceled (step S1177), the flow returns to step S1134.

If the shutter switch SW2 has been pressed (step S1176), the system control circuit 50 sets the display state of the image display unit 28 in a fixed-color display state (step S1178), and the flow advances to step S1179.

In fixed-color display, in place of sensed image data, which has been written in the image display memory 24 via the image sensing element 14, A/D converter 16, image processing circuit 20, and memory control circuit 22, substitute fixed-color image data is displayed on the image display unit 28 via the memory control circuit 22 and D/A converter 26, thus displaying a fixed-color image on the electronic viewfinder.

The system control circuit 50 executes an image sensing process including an exposure process for writing sensed image data in the memory 30 via the image sensing element 14, A/D converter 16, image processing circuit 20, and memory control circuit 22 or directly from the A/D converter 16 via the memory control circuit 22, and a development process for executing various processes by reading out image data written in the memory 30 using the memory control circuit 22 and image processing circuit 20 if required (step S1179).

The details of the flow of this image sensing process step S1179 are the same as those of the second embodiment that has been described using FIG. 6.

The system control circuit 50 executes a display image process for reading out image data written in the memory 30 by the image sensing process in step S1179, and transferring the readout data to the image display memory 24 via the memory control circuit 22 (step S1180).

The details of the flow of this display image process step S1180 are the same as those of the second embodiment that has been described using FIG. 7.

The system control circuit 50 sets the display state of the image display unit 28 in a quick review display state (step S1181), and the flow advances to step S1182.

In quick review display, image data transferred to the image display memory 24 by the display image process in step S1180 is displayed on the aforementioned image sensing region of the image display unit 28 via the memory control circuit 22 and D/A converter 26, thus implementing an electronic viewfinder function that automatically plays back a sensed image.

The system control circuit 50 executes a compression process in which various image processes are done using the memory control circuit 22 and image processing circuit 20 if required by reading out sensed image data written in the memory 30, or an image is compressed in correspondence with the selected mode using the compression/expansion circuit 32 (step S1182). After that, the system control circuit 50 executes a recording process for writing image data in the recording medium 500 or 510 such as a memory card, compact flash card, or the like via the interface 90 or 94, and the connector 92 or 96 (step S1183).

The details of the flow of this compression process step S1182 are the same as those in the second embodiment that has already been described using FIG. 8.

When the image display unit 28 is ON, a message such as "BUSY" or the like that indicates that a write is in progress is displayed on the image display unit 28 during a write of image data on the recording medium 500 or 510.

Furthermore, the indication unit 54 makes a recording medium write access indication by flickering an LED or the like in combination with the above message.

The system control circuit 50 continues quick review display on the image display unit 28 until the shutter switch SW2 is released (step S1184). With this display, the user can carefully check the sensed image while pressing the shutter switch SW2.

If the shutter switch SW2 is released (step S1184), the system control circuit 50 sets the panoramic image sensing start flag (step S1185) to indicate that the first image has already been sensed in a series of panoramic image sensing processes. In this manner, as has been described in step S1142, the image sensing direction can be inhibited from being reversed after the first image is sensed in the horizontal or vertical panoramic mode.

The system control circuit 50 sets the variable n to be n=n+1 to select the next image sensing region (step S1186), and resets the variable m to m=1 (step S1187). Then, the flow returns to step S1134 to repeat a series of panoramic image sensing processes.

In this manner, after the control returns to step S1134 upon releasing the shutter switch SW2, the next image sensing region is selected in step S1146, the image sensing regions which include the previous image sensing region and display sensed images are set in the quick review state, and the next image sensing region is set in the through display state, so as to display the sensed images and the next image to be sensed to overlap each other in step S1148, thus allowing the user to easily sense panoramic images.

FIGS. 14A and 14B that have already been described show examples of the image sensing window before and after completion of sensing of the n-th image in the horizontal panoramic mode.

FIG. 14A shows the image sensing window before sensing the first image, and FIG. 14B shows the image sensing window upon releasing the shutter switch SW2 after the first image is sensed. Although no dedicated explanatory view is available, before the shutter switch SW2 is released after the first image sensing, the first image sensing region in FIG. 14A on the image sensing window is set in a quick review display state.

FIGS. 15A and 15B that have already been described show examples of the image sensing window before and after completion of sensing of the n-th image in the vertical panoramic mode.

FIG. 15A shows the image sensing window before sensing the first image, and FIG. 15B shows the image sensing window upon releasing the shutter switch SW2 after the first image is sensed. Although no dedicated explanatory view is available, before the shutter switch SW2 is released after the first image sensing, the first image sensing region in FIG. 15A on the image sensing window is set in a quick review display state.

Furthermore, FIGS. 12A to 13B that have already been described show examples of the image sensing window before and after completion of sensing of the n-th image in the 2×2 panoramic mode.

FIG. 12A shows the image sensing window before the first image is sensed. FIG. 12B shows the image sensing window upon releasing the shutter switch SW2 after the first image is sensed, i.e., before the second image is sensed.

FIG. 13A shows the image sensing window upon releasing the shutter switch SW2 after the second image is sensed, i.e., before the third image is sensed, and FIG. 13B shows the image sensing window upon canceling the shutter switch SW2 after the third image is sensed, i.e., before the fourth image is sensed.

Although no dedicated explanatory view is available, before the shutter switch SW2 is released after the n-th image sensing, the n-th image sensing region in FIGS. 12A to 13B on the image sensing window is set in a quick review display state. When the shutter switch SW2 is released, a through display of the (n+1)-th image sensing region as the next region is added.

As described above, according to the fourth embodiment, after a series of panoramic image sensing processes have started, a predetermined alert is generated upon detection of the absence of the lens unit 300, and the panoramic image sensing processes are temporarily interrupted to start a new series of panoramic image sensing processes. In this way, an image, which is unsuitable for panoramic synthesis, can be prevented from being sensed when the lens unit 300 is exchanged by another lens unit with a different focal length during a series of panoramic image sensing processes.

Fifth Embodiment

Figure 31:
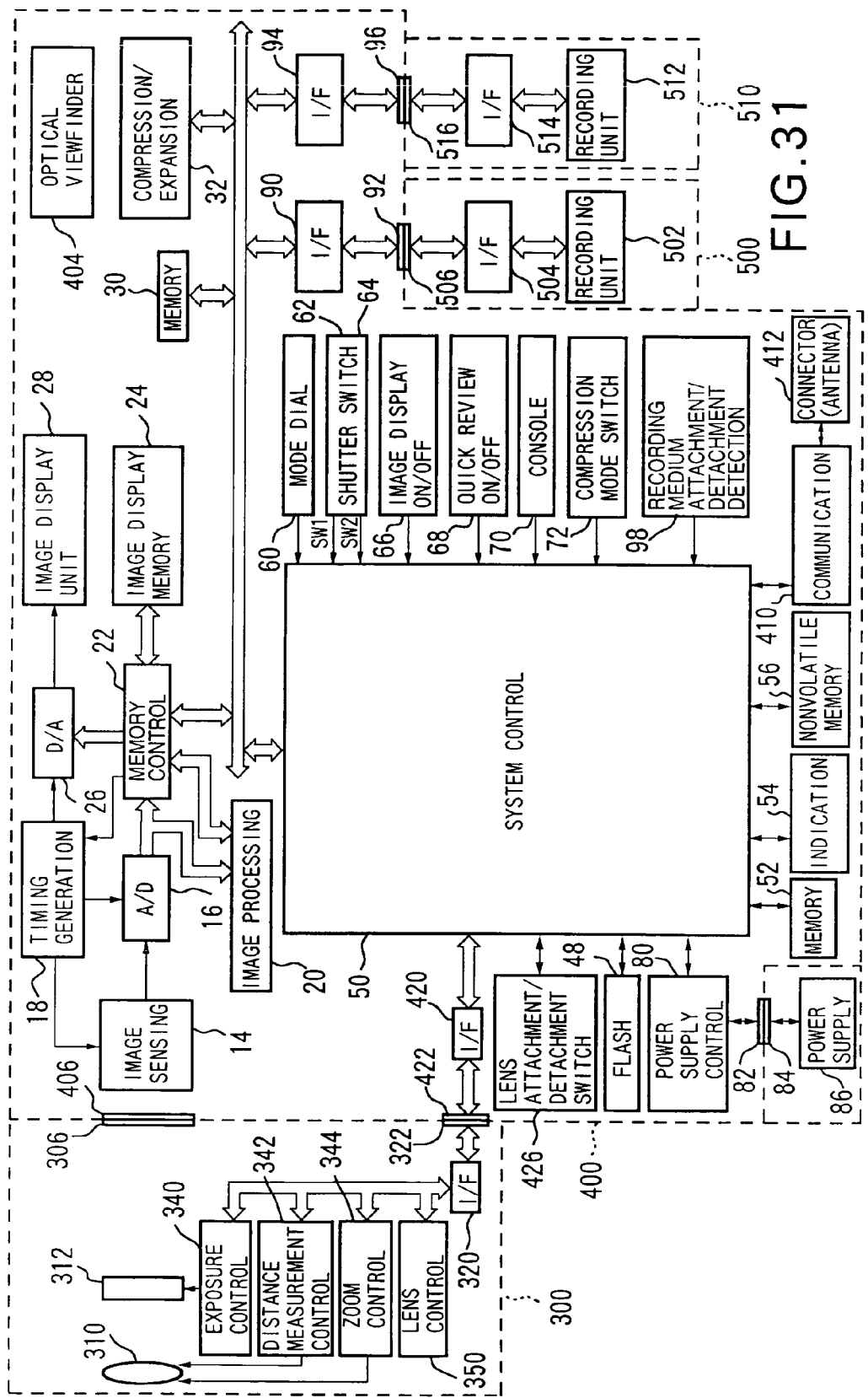
FIG. 31 is a block diagram showing the arrangement of an image processing apparatus according to the fifth embodiment of the present invention.
Figure 32:
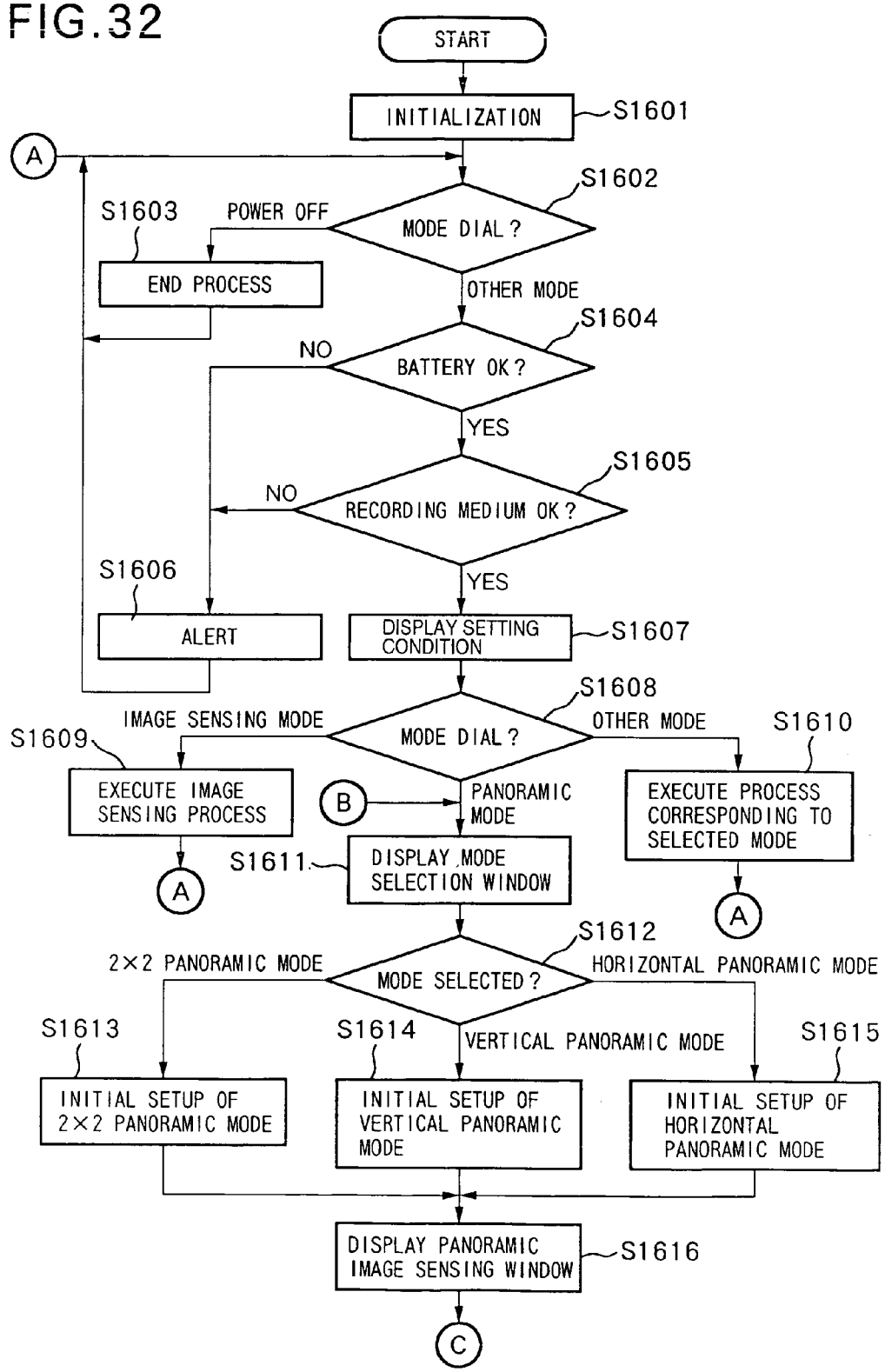
FIG. 32 is a flow chart of a main routine of the fifth embodiment.
Figure 33:
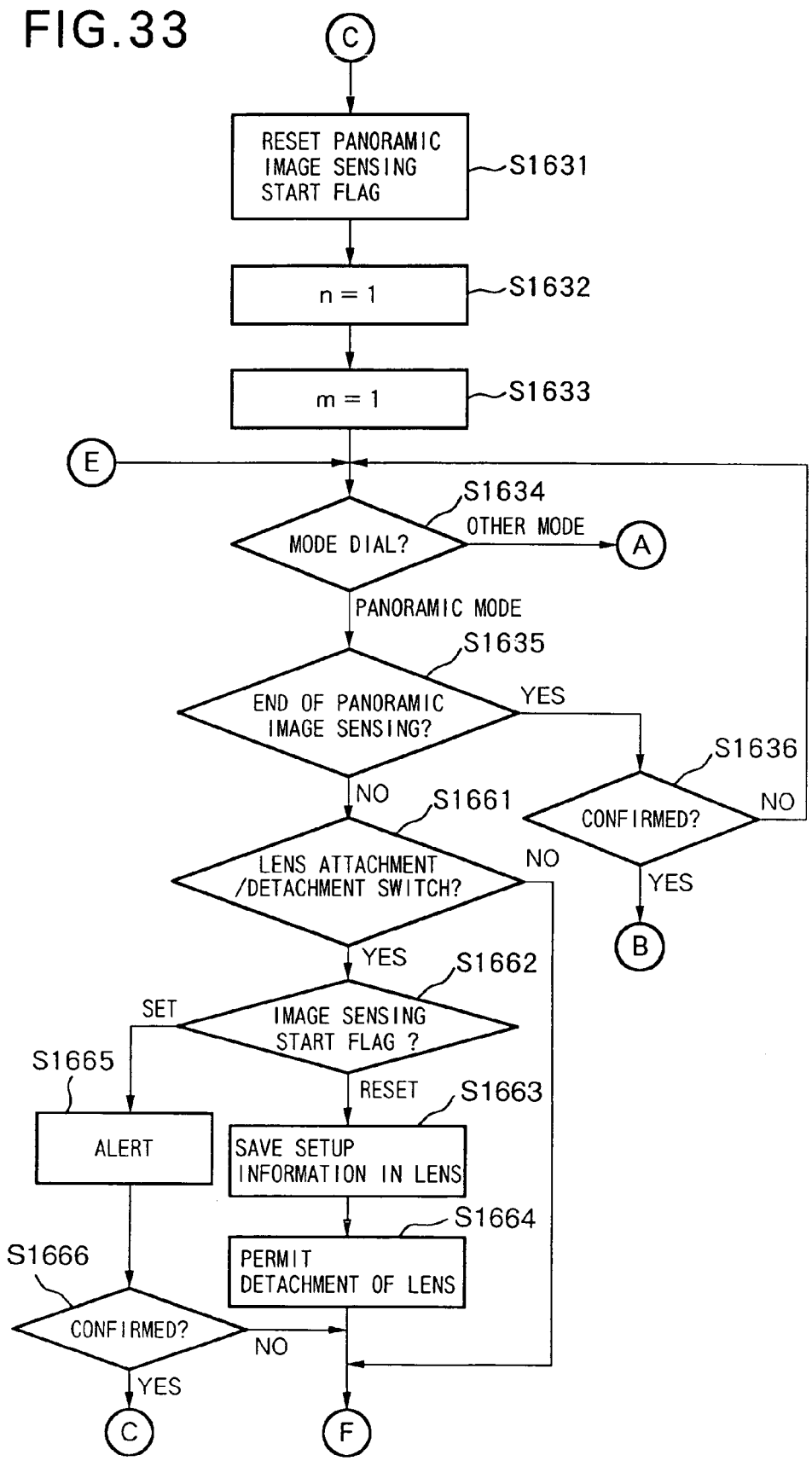
FIG. 33 is a flow chart of the main routine of the fifth embodiment.
Figure 34:
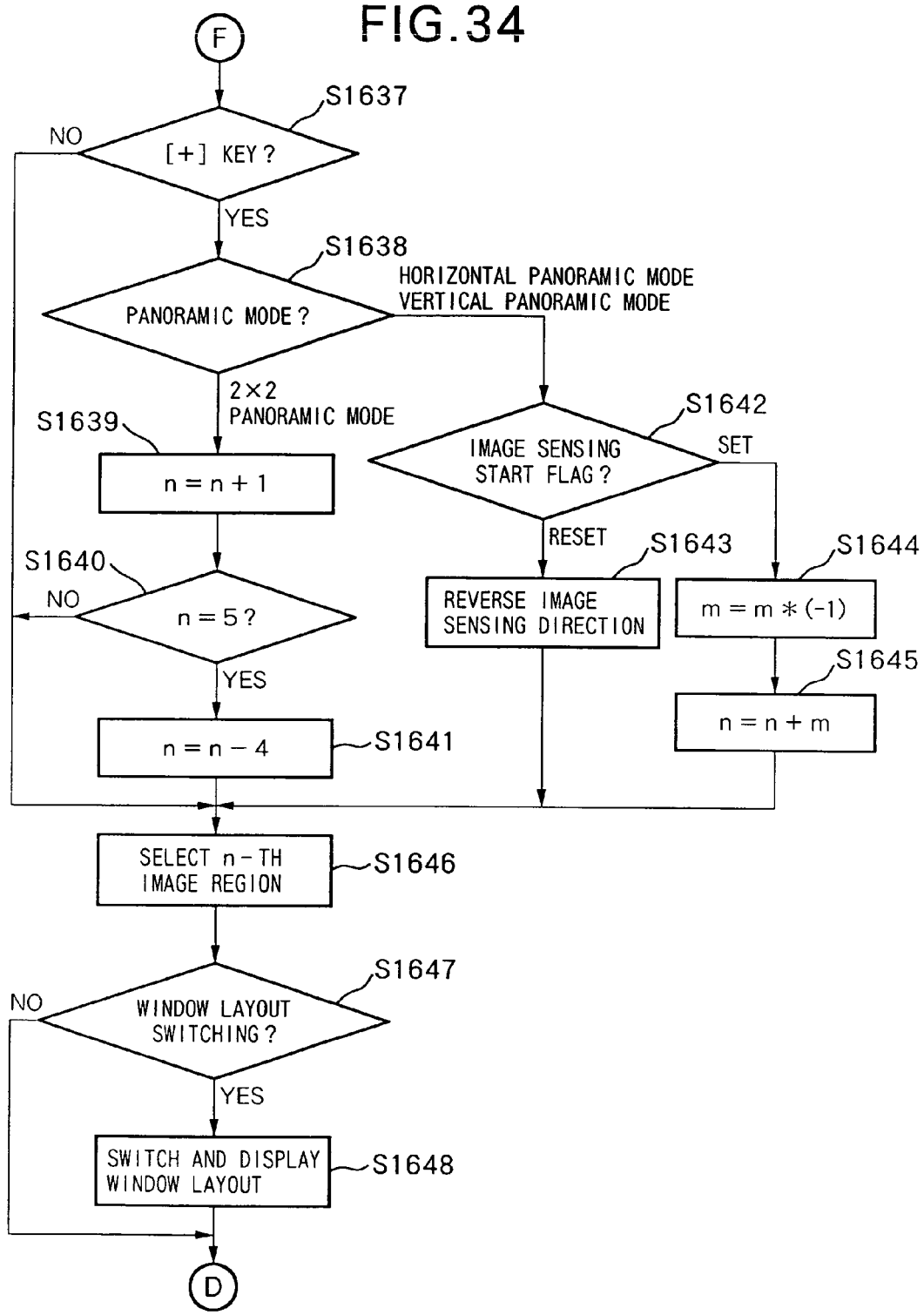
FIG. 34 is a flow chart of the main routine of the fifth embodiment.
Figure 35:
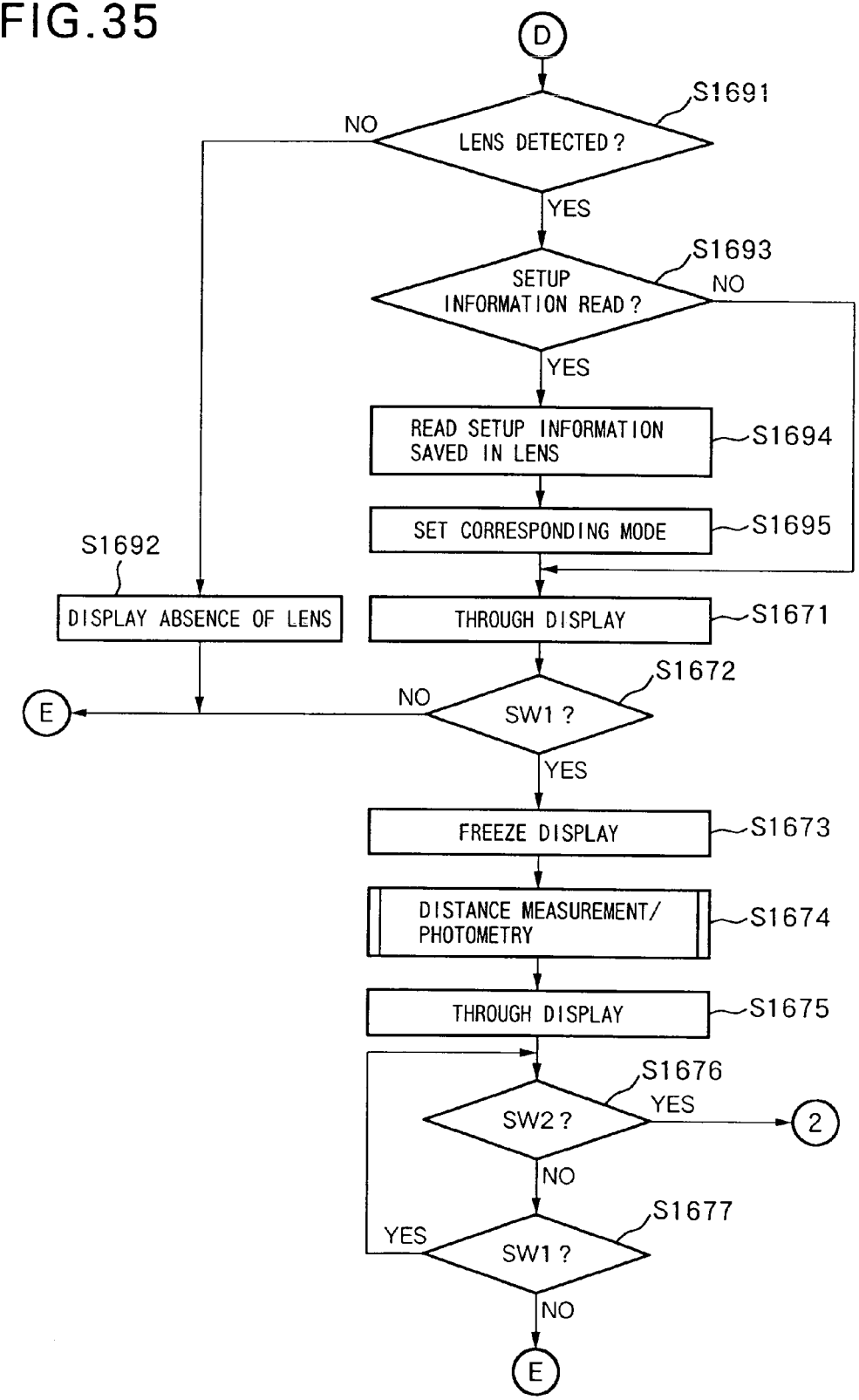
FIG. 35 is a flow chart of the main routine of the fifth embodiment.
Figure 36:
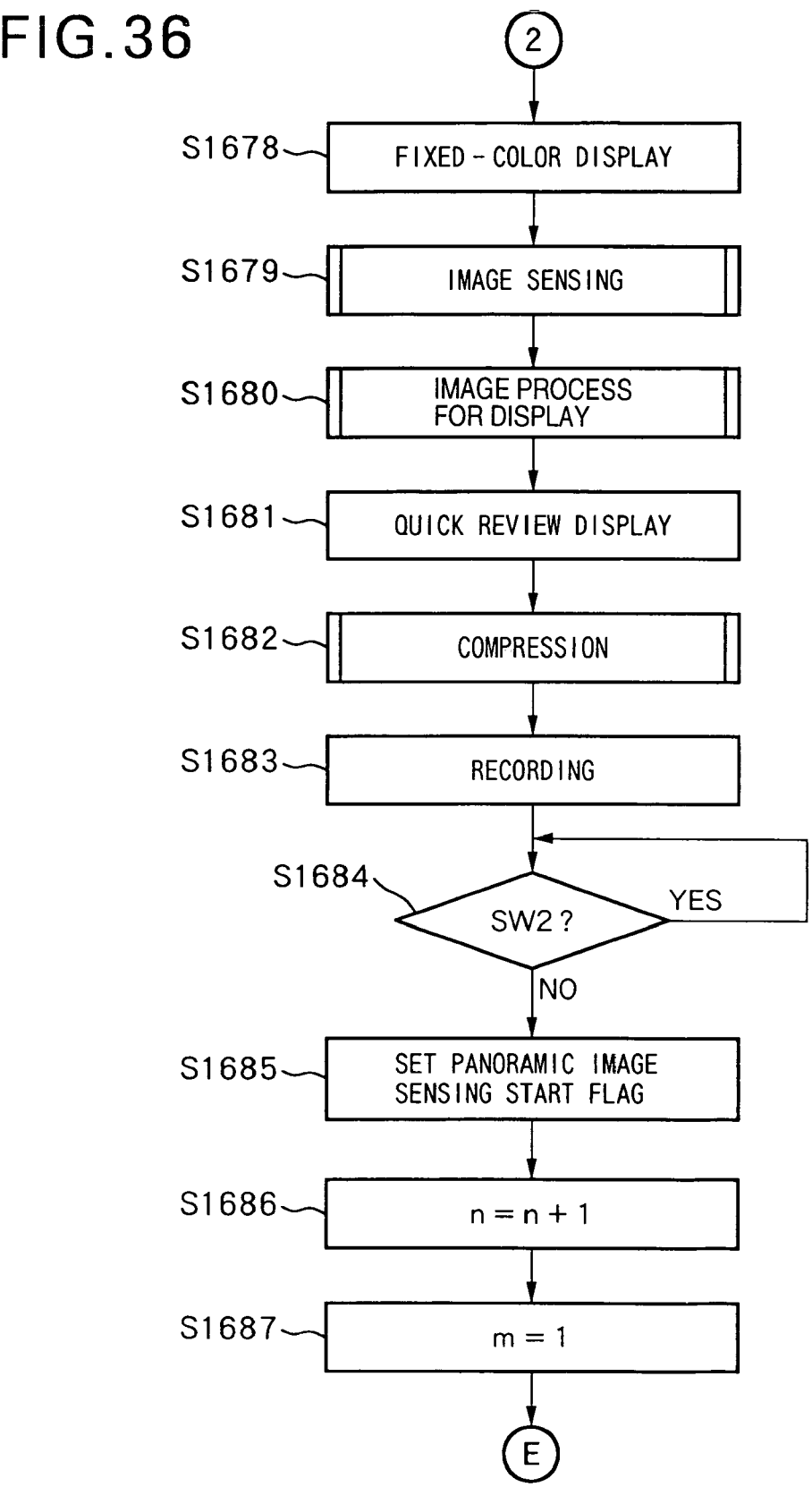
FIG. 36 is a flow chart of the main routine of the fifth embodiment.

FIG. 31 is a block diagram showing the arrangement of an image processing apparatus according to the fifth embodiment of the present invention.

In FIG. 31, only a difference from FIG. 16 will be explained.

Reference numeral 426 denotes a lens attachment/detachment switch used upon attaching/detaching the lens unit 300 to/from the image processing apparatus 400.

The operation of the fifth embodiment will be explained below with reference to FIGS. 32, 33, 34, 45, 36, 5, 6, 7, and 8. Note that the processes shown in FIGS. 5, 6, 7, and 8 are the same as those in the second embodiment, and a detailed description thereof will be omitted.

The operation of the image processing apparatus 400 will be described with the aid of FIGS. 32, 33, 34, 35, and 36.

Upon power ON after battery exchange or the like, the system control circuit 50 initializes flags, control variables, and the like, and initializes the respective units of the image processing apparatus 400 (step S1601).

The system control circuit 50 checks the setting position of the mode dial 60. If the mode dial 60 is set at a power OFF position (step S1602), the system control circuit 50 executes a predetermined end process (step S1603). More specifically, the system control circuit 50 changes the indications of the respective indication units to an end state, protects an image sensing unit by closing a barrier if the lens unit 300 comprises the barrier or the like serving as a protection means, records required parameters and setting values including flags, control variables, and the like, and the setting mode in the nonvolatile memory 56, cuts off unnecessary power supply to the respective units of the image processing apparatus 400 including the image display unit 28 by the power supply control means 80, and so forth. After that, the flow returns to step S1602.

If the mode dial 60 is set at any of other mode positions (step S1602), the system control circuit 50 checks using the power supply control means 80 if the remaining capacity and operation state of the power supply means 86 comprising batteries and the like pose any problem in the operation of the image processing apparatus 400 (step S1604). If any problem is found, a predetermined alert indication is made by means of an image or voice using the indication unit 54 (step S1606), and the flow then returns to step S1602.

When the image display of the image display unit 28 is ON, a predetermined alert display is made by means of an image or voice also using the image display unit 28.

If no problem is found in the power supply means 86 (step S1604), the system control circuit 50 checks if the operation state of the recording medium 500 or 510 poses any problem in the operation of the image processing apparatus 400, in particular, recording/playback of image data to/from the recording medium (step S1605). If any problem is found, a predetermined alert indication is made by means of an image or voice using the indication unit 54 (step S1606), and the flow then returns to step S1602.

When the image display of the image display unit 28 is ON, a predetermined alert display is made by means of an image or voice also using the image display unit 28.

If no problem is found in the operation state of the recording medium 500 or 510 (step S1605), various setting states of the image display apparatus 400 are indicated by means of an image or voice using the indication unit 54 (step S1607). When the image display of the image display unit 28 is ON, various setting states of the image display apparatus 400 are indicated by means of an image or voice also using the image display unit 28.

On the other hand, if the mode dial 60 is set at an image sensing mode position (step S1608), a predetermined image sensing process is executed (step S1609). Upon completion of the process, the flow returns to step S1602.

If the mode dial 60 is set at any of other mode positions (step S1608), the system control circuit 50 executes a process corresponding to the selected mode (step S1610). Upon completion of the process, the flow returns to step S1602.

If the mode dial 60 is set at a panoramic mode position (step S1608), the system control circuit 50 displays a panoramic mode selection window on the image display unit (step S1611).

The user of the image processing apparatus 400 can select an arbitrary one of a plurality of panoramic image sensing modes by observing the panoramic mode selection window displayed on the image display unit 28.

The panoramic image sensing modes include a 2×2 panoramic mode, horizontal panoramic mode, vertical panoramic mode, and the like. In these modes, by combining a plurality of sensed images, a panoramic image, which is extended two-dimensionally, horizontally, or vertically, can be obtained.

A series of sensed images are appended with information indicating their positional relationship, and can be combined to generate a signal panoramic image by the image processing apparatus 400 itself or after they are transferred to, e.g., a computer or the like.

Note that an example of the panoramic mode selection window is the same as that shown in FIG. 9 that has already been explained.

Referring to FIG. 9, the left icon is used for selecting the 2×2 panoramic mode for sensing a two-dimensional panoramic image, the central icon is used for selecting the horizontal panoramic mode for sensing a horizontal panoramic image, and the right icon is used for selecting a vertical panoramic mode for sensing a vertical panoramic image.

The user of the image processing apparatus 400 can select a desired panoramic mode by the selection/change switch 66 (e.g., [+] key), and can determine that panoramic mode by the determination/execution switch 68 (e.g., [SET] key).

When the panoramic mode is selected using the selection/change switch 66 and determination/execution switch 68, the system control circuit 50 sets initial values and memory areas of flags, parameters, and variables, reads out a display window serving as a user interface, and so forth in a 2×2 panoramic mode initial setup process (step S1613), a vertical panoramic mode initial setup process (step S1614), or a horizontal panoramic mode initial setup process (step S1615) in correspondence with the selected panoramic mode (step S1612), and displays a panoramic image sensing window corresponding to the selected mode on the image display unit 28 (step S1616). The flow then advances to step S1631.

Note that FIGS. 10A and 10B that have already been explained show examples of the horizontal panoramic mode image sensing window, FIGS. 11A and 11B show examples of the vertical panoramic mode image sensing window, and FIGS. 12A and 12B that have already been explained show examples of the 2×2 panoramic mode image sensing window.

FIG. 10A shows an image sensing window that creates a panoramic window by continuously repeating image sensing to the right, and FIG. 10B shows an image sensing window that creates a panoramic window by continuously repeating image sensing to the left.

Referring to FIGS. 10A and 10B, a through image from the electronic viewfinder is displayed on region "1" to sense the first image of a series of panoramic images. Before completion of image sensing of the first image, rightward image sensing (FIG. 10A) or leftward image sensing (FIG. 10B) can be desirably selected using the selection/change switch 66 (e.g., [+] key).

The image sensing direction is determined by sensing the first image by pressing the shutter button in desired one of the display window states shown in FIGS. 10A and 10B.

Note that the user can end image sensing in the horizontal panoramic mode by pressing the determination/execution switch 68 (e.g., [SET] key).

FIG. 11A shows an image sensing window that creates a panoramic window by continuously repeating image sensing upward, and FIG. 11B shows an image sensing window that creates a panoramic window by continuously repeating image sensing downward.

Referring to FIGS. 11A and 11B, a through image from the electronic viewfinder is displayed on region "1" to sense the first image of a series of panoramic images. Before completion of image sensing of the first image, upward image sensing (FIG. 11A) or downward image sensing (FIG. 11B) can be desirably selected using the selection/change switch 66 (e.g., [+] key).

The image sensing direction is determined by sensing the first image by pressing the shutter button in desired one of the display window states shown in FIGS. 11A and 11B.

Note that the user can end image sensing in the vertical panoramic mode by pressing the determination/execution switch 68 (e.g., [SET] key).

FIG. 12A shows an image sensing window for the first image upon creating a 2×2 panoramic window by two-dimensionally repeating image sensing of a total of four images in the vertical and horizontal directions, and FIG. 12B shows an image sensing window for the second image.

Referring to FIGS. 12A and 12B, a through image from the electronic viewfinder is displayed on, e.g., an upper right region to sense the first one of panoramic images.

Upon completion of image sensing of the first image, a playback image of the sensed image is displayed on, e.g., the upper right region, and a through image from the electronic viewfinder is displayed on, e.g., the lower right region to sense the second image.

The image sensing region of the electronic viewfinder is switched in turn to the next region after each image sensing. However, image sensing may be started from an arbitrary region, or may be redone by returning to the already sensed region. For this purpose, the image sensing region can be desirably shifted using the selection/change switch 66 (e.g., [+] switch).

The image sensing region to be re-sensed is determined and image sensing is executed by pressing the shutter button in a display window state that selects a desired region.

Note that the user can end image sensing in the 2×2 panoramic mode by pressing the determination/execution switch 68 (e.g., [SET] key).

The system control circuit 50 initializes flags and variables set in its internal memory or the memory 52. For example, the system control circuit 50 resets a panoramic image sensing start flag (step S1631), sets variables m and n, and initializes them to m=1 and n=1, respectively (steps S1633 and S1632).

Note that the panoramic image sensing start flag is reset to indicate that no panoramic image sensing processes have been done.

Also, the variable n indicates the position of the current image sensing region in image sensing of each panoramic mode.

The variable m is used for returning the image sensing region of interest to the immediately preceding region or canceling such return, upon executing image sensing again in the horizontal and vertical panoramic modes.

An example of the method of using these flag and variables will be explained later.

If the mode dial 60 is set at any of mode positions other than the panoramic mode (step S1634), the system control circuit 50 ends image sensing in the panoramic mode, and the flow returns to step S1602. In this manner, the user of the image processing apparatus 400 can end the panoramic mode anytime he or she wants, and can select another mode.

If end of the panoramic mode is selected by pressing the determination/execution switch 68 (e.g., [SET] key) (step S1635) while the mode dial 60 is kept set at the panoramic mode position (step S1634), i.e., the display window of the image display unit 28 keeps displaying the corresponding panoramic image sensing window, a panoramic mode end confirmation message is displayed. Furthermore, if confirmation of end is selected (step S1636), the flow returns to step S1611 of displaying the panoramic mode selection window.

The system control circuit 50 detects if operation for detaching the lens unit 300 using the lens attachment/detachment switch 426 is about to start (step S1661). If operation for detaching the lens unit 300 is not about to start, the flow advances to step S1637.

If operation for detaching the lens unit 300 is about to start (step S1661), the system control circuit 50 checks the status of the panoramic image sensing start flag (step S1662).

If the panoramic image sensing start flag is reset, i.e., if the first image is not sensed yet in a series of panoramic image sensing processes (step S1662), the system control circuit 50 saves various kinds of information such as the setting mode, setting values, and the like, which were used in the respective units of the image processing apparatus 400 while the lens unit 300 is attached to the apparatus 400, in a nonvolatile memory in the lens system control circuit 350 via the interface 420, connector 422, connector 322, and interface 320 (step S1663), and permits detachment of the lens unit 300 (step S1664). After that, the flow advances to step S1637.

Note that a method of permitting detachment of the lens unit 300 may use any of a method of unlocking a mechanism such as an electromagnetic lock that inhibits the lens unit from being detached, a method of removing a cover of a detachment button of the lens unit 300, and the like.

Various kinds of information saved in the nonvolatile memory in the lens system control circuit 350 can be read and used again when the detached lens unit 300 is attached to the image processing apparatus 400 again. With this control, the user need not repeat various setups in correspondence with the lens unit 300 used every time he or she exchanges the lens unit 300, resulting in convenience.

If the panoramic image sensing start flag is set, i.e., if the first image has already been sensed in a series of panoramic image sensing processes (step S1662), the system control circuit 50 makes a predetermined alert display by means of an image or voice using the indication unit 54 and/or the image display unit 28 (step S1665). Furthermore, if confirmation of the end of a series of panoramic image sensing processes is selected (step S1666), the system control circuit 50 temporarily ends the series of panoramic image sensing processes executed so far, and the flow returns to step S1631 to start a new series of panoramic image sensing processes.

On the other hand, if cancel of the end of a series of panoramic image sensing processes is selected (step S1666), the flow advances to step S1637.

In this way, since the lens unit 300 is inhibited from being exchanged by another lens unit with a different focal length during a series of panoramic image sensing processes, an image, which is unsuitable for panoramic synthesis, can be prevented from being sensed.

If the selection/change switch 66 (e.g., [+] key) has been pressed while the image display unit 28 displays one of the above-mentioned panoramic image sensing windows (step S1637), the system control circuit 50 executes a predetermined process in correspondence with the setups of the panoramic mode (step S1638).

If the selection/change switch 66 (e.g., [+] key) is not pressed (step S1637), the flow advances to step S1646.

If the 2×2 panoramic mode is selected (step S1638), the system control circuit 50 sets the variable n to be n=n+1 to select the next image sensing region (step S1639). If n=5 (step S1640), the first image sensing region is selected by setting n=n−4 (step S1641). After that, the flow advances to step S1646.

More specifically, every time the selection/change switch 66 (e.g., [+] key) is pressed, the image sensing region of interest shifts to one of the four image sensing regions in the 2×2 panoramic mode. For example, the image sensing region of interest shifts in the order of the upper right region, lower right region, lower left region, upper left region, upper right region, lower right region, . . . .

On the other hand, if the horizontal or vertical panoramic mode is selected (step S1638), and if the panoramic image sensing start flag is reset, i.e., if the first image is not sensed yet in a series of panoramic image sensing processes (step S1642), the system control circuit 50 reverses the image sensing direction of the selected panoramic mode (step S1643). After that, the flow advances to step S1646.

Note that the image sensing direction can be repetitively reversed before the first image is sensed.

FIGS. 10A and 10B that have already been described show examples of an image sensing direction reverse window in the horizontal panoramic mode.

FIG. 10A shows a window upon repeating image sensing to the right, and FIG. 10B shows a window upon repeating image sensing to the left.

FIGS. 11A and 11B that have already been described show examples of an image sensing direction reverse window in the vertical panoramic mode.

FIG. 11A shows a window upon repeating image sensing upward, and FIG. 11B shows a window upon repeating image sensing downward.

On the other hand, if the horizontal or vertical panoramic mode is selected (step S1638) and if the panoramic image sensing start flag is set, i.e., if the first image has already been sensed in a series of panoramic image sensing processes (step S1642), the system control circuit 50 computes m=m×(−1), the sign of which changes like −1, +1, −1, +1, . . . in every computation (step S1644), and also computes n=n+m for the variable n, which changes like n=n−1, n=n+1, n=n−1, n=n+1, . . . in every computation (step S1645). After that, the flow advances to step S1646.

With this control, movement to the already sensed region (which is limited to the lastly sensed one) or cancel that movement can be repetitively selected to sense an image again.

After panoramic image sensing of the n-th image region, the user presses the selection/change switch 66 (e.g., [+] key) to confirm if quick review images of the (n−1)-th and n-th image regions smoothly join at their boundary regions. Then, the user temporarily releases the selection/change switch 66 (e.g., [+] key) to display a through image on the n-th image region, and presses the selection/change switch 66 (e.g., [+] key) once again to display the original quick review image on the n-th image region and a through image on the (n+1)-th image region, thus executing the next panoramic image sensing.

After panoramic image sensing of the n-th image region, upon pressing the selection/change switch 66 (e.g., [+] key) to confirm if quick review images of the (n−1)-th and n-th image regions smoothly join at their boundary regions, if the user determines that image sensing must be redone, he or she temporarily releases the selection/change switch 66 (e.g., [+] key) to display a through image on the n-th image region, and presses the shutter switch SW2 in that window state to replace the image with the newly sensed image. Then, the user can execute the next panoramic image sensing.

The system control circuit 50 selects the n-th image region (step S1646). If the window layout must be changed in correspondence with the selected image region (step S1647), the system control circuit 50 switches and displays a new window layout (step S1648) The flow then advances to step S1691.

In this fashion, a window corresponding to the reversed image sensing direction, as described above, a window corresponding to the changed image sensing region, a window that has updated characters and images for comments, or the like can be displayed as needed.

Upon sensing the second and subsequent images, the image sensing regions that display the already sensed images are set in a quick review display state, and the image sensing region selected for the next image sensing is set in a through display state, thus displaying a playback image of the already sensed image and the next image to be sensed to partially overlap each other. In this manner, the user of the image processing apparatus 400 can easily determine the next image sensing angle.

The system control circuit 50 checks if the lens unit 300 is attached to the image processing apparatus 400 (step S1691). If the lens unit 300 is attached, the flow advances to step S1693.

On the other hand, if the lens unit 300 is not attached to the image processing apparatus 400 (step S1691), display indicating that no lens is attached is made using the indication unit 54 and/or the image display unit 28 to call user's attention (step S1692). The flow then returns to step S1634.

In this manner, since image sensing without the lens unit 300 is inhibited during a series of panoramic image sensing processes, an image, which is unsuitable for panoramic synthesis, can be prevented from being sensed.

If the system control circuit 50 determines that a new lens unit 300 is attached and various kinds of setting information saved in the lens unit 300 must be read (step S1693), it reads identification information such as a number unique to the lens unit 300 or the like, management information, function information such as a full-open aperture value and minimum aperture value, focal length, and the like, and the current and previous setting values, which are saved in the nonvolatile memory in the lens system control circuit 350, and/or various kinds of information such as the setting mode, setting values, and the like, which were used in the respective units of the image processing apparatus while the lens unit 300 was attached to the image processing apparatus 400 previously, onto its internal registers and/or the memory 52 via the interface 320, connector 322, connector 422, and interface 420 (step S1694).

Note that the saved various setting values include, for example, the zoom focal length, the operation mode used such as a shutter speed priority AE mode or aperture priority AE mode, sports image sensing mode, landscape image sensing mode, panoramic image sensing mode, and the like, the ON/OFF state of a camera shake prevention function, and the like.

The system control circuit 50 sets various corresponding modes suitable for image sensing using the attached lens unit 300 on the basis of various kinds of read setting information (step S1695), and the flow then advances to step S1671.

Note that various corresponding modes are set as follows. For example, when the lens unit 300 is a telephoto lens or telephoto zoom lens, the contents of the operation mode display list of the image processing apparatus 400 are limited to only the shutter speed priority AE mode, sports image sensing mode, and the like; the shutter speed priority AE mode, sports image sensing mode, and the like are displayed at easy-to-select positions; one of the shutter speed priority AE mode, sports image sensing mode, and the like is set as a default mode; and so forth.

On the other hand, when the lens unit 300 is a wide-angle lens or wide-angle zoom lens, the contents of the operation mode display list of the image processing apparatus 400 are limited to only the aperture priority AE mode, landscape image sensing mode, panoramic image sensing mode, and the like; the aperture priority AE mode, landscape image sensing mode, panoramic image sensing mode, and the like are displayed at easy-to-select positions; one of the aperture priority AE mode, landscape image sensing mode, panoramic image sensing mode, and the like is set as a default mode; and so forth.

Furthermore, since various kinds of information saved in the nonvolatile memory in the lens system control circuit 350 upon detachment of the lens unit 300 can be read and used when the detached lens unit 300 is attached to the image processing apparatus 400 again, the user need not repeat various setups in correspondence with the lens unit 300 used every time he or she exchanges the lens unit 300, resulting in convenience.

On the other hand, some or all of various kinds of information saved in the nonvolatile memory in the lens system control circuit 350 upon detachment of the lens unit 300 may not be used in correspondence with the date, day of the week, elapsed time, user information, and the like upon attachment of the detached lens unit 300 to the image processing apparatus 400 again. With this control, when the lens unit is exchanged frequently, the need for repeating various setups can be obviated. Also, when previous setups have no significance upon exchanging the lens unit after several days, default values may be set.

Moreover, when user information saved in the nonvolatile memory in the lens system control circuit 350 is used, the need for repeating various setups corresponding to the lens unit 300 in units of users of the image processing apparatus 400 can be obviated.

If the system control circuit 50 determines that lens unit 300 remains attached and various setups saved in the lens unit 300 need not be read (step S1693), the flow advances to step S1671.

The system control circuit 50 sets a through display state in which sensed image data is displayed as it is sensed (step S1671), and the flow advances to step S1672.

In through display, data, which have been written in the image display memory 24 via the image sensing element 14, A/D converter 16, image processing circuit 20, and memory control circuit 22, are displayed on the aforementioned image sensing region of the image display unit 28 via the memory control circuit 22 and D/A converter 26, thereby implementing an electronic viewfinder function.

If the shutter SW1 is not pressed (step S1672), the flow returns to step S1634.

If the shutter switch SW1 has been pressed (step S1672), the system control circuit 50 sets the display state of the image display unit 28 in a freeze display state (step S1673), and the flow advances to step S1674.

In freeze display, image data on the image display memory 24 is inhibited from being rewritten via the image sensing element 14, A/D converter 16, image processing circuit 20, and memory control circuit 22, and the latest written image data is displayed on the above-mentioned image display region of the image display unit 28 via the memory control circuit 22 and D/A converter 26, thus displaying a frozen image on the electronic viewfinder.

The system control circuit 50 executes distance measurement to adjust the focus of the photographing lens 310 on the object, and executes photometry to determine the aperture value and shutter speed (step S1674). In photometry, the electronic flash is set if necessary.

The details of the flow of this distance measurement/photometry process step S1674 are the same as those in the second embodiment that has already been described using FIG. 5.

Upon completion of the distance measurement/photometry process step S1674, the system control circuit 50 sets the display state of the image display unit 28 in a through display state (step S1675), and the flow advances to step S1676. Note that the through display state in step S1675 is the same as that in step S1671.

If the shutter switch SW2 is not pressed (step S1676) and the shutter switch SW1 is canceled (step S1677), the flow returns to step S1634.

If the shutter switch SW2 has been pressed (step S1676), the system control circuit 50 sets the display state of the image display unit 28 in a fixed-color display state (step S1678), and the flow advances to step S1679.

In fixed-color display, in place of sensed image data, which has been written in the image display memory 24 via the image sensing element 14, A/D converter 16, image processing circuit 20, and memory control circuit 22, substitute fixed-color image data is displayed on the image display unit 28 via the memory control circuit 22 and D/A converter 26, thus displaying a fixed-color image on the electronic viewfinder.

The system control circuit 50 executes an image sensing process including an exposure process for writing sensed image data in the memory 30 via the image sensing element 14, A/D converter 16, image processing circuit 20, and memory control circuit 22 or directly from the A/D converter 16 via the memory control circuit 22, and a development process for executing various processes by reading out image data written in the memory 30 using the memory control circuit 22 and image processing circuit 20 if required (step S1679).

The details of the flow of this image sensing process step S1679 are the same as those in the second embodiment that has already been described using FIG. 6.

The system control circuit 50 executes a display image process for reading out image data written in the memory 30 by the image sensing process in step S1679, and transferring the readout data to the image display memory 24 via the memory control circuit 22 (step S1680).

The details of the flow of this display image process step S1680 are the same as those in the second embodiment that has already been described using FIG. 7.

The system control circuit 50 sets the display state of the image display unit 28 in a quick review display state (step S1681), and the flow advances to step S1682.

In quick review display, image data transferred to the image display memory 24 by the display image process in step S1680 is displayed on the aforementioned image sensing region of the image display unit 28 via the memory control circuit 22 and D/A converter 26, thus implementing an electronic viewfinder function that automatically plays back a sensed image.

The system control circuit 50 executes a compression process in which various image processes are done using the memory control circuit 22 and image processing circuit 20 if required by reading out sensed image data written in the memory 30, or an image is compressed in correspondence with the selected mode using the compression/expansion circuit 32 (step S1682). After that, the system control circuit 50 executes a recording process for writing image data in the recording medium 500 or 510 such as a memory card, compact flash card, or the like via the interface 90 or 94, and the connector 92 or 96 (step S1683).

The details of the flow of this compression process step S1682 are the same as those in the second embodiment that has already been described using FIG. 8.

When the image display unit 28 is ON, a message such as "BUSY" or the like that indicates that a write is in progress is displayed on the image display unit 28 during a write of image data on the recording medium 500 or 510.

Furthermore, the indication unit 54 makes a recording medium write access indication by flickering an LED or the like in combination with the above message.

The system control circuit 50 continues quick review display on the image display unit 28 until the shutter switch SW2 is released (step S1684). With this display, the user can carefully check the sensed image while pressing the shutter switch SW2.

If the shutter switch SW2 is released (step S1684), the system control circuit 50 sets the panoramic image sensing start flag (step S1685) to indicate that the first image has already been sensed in a series of panoramic image sensing processes. In this manner, as has been described in step S1642, the image sensing direction can be inhibited from being reversed after the first image is sensed in the horizontal or vertical panoramic mode.

The system control circuit 50 sets the variable n to be n=n+1 to select the next image sensing region (step S1686), and resets the variable m to m=1 (step S1687). Then, the flow returns to step S1634 to repeat a series of panoramic image sensing processes.

In this manner, after the control returns to step S1634 upon releasing the shutter switch SW2, the next image sensing region is selected in step S1646, the image sensing regions which include the previous image sensing region and display sensed images are set in the quick review state, and the next image sensing region is set in the through display state, so as to display the sensed images and the next image to be sensed to overlap each other in step S1648, thus allowing the user to easily sense panoramic images.

FIGS. 14A and 14B that have already been described show examples of the image sensing window before and after completion of sensing of the n-th image in the horizontal panoramic mode.

FIG. 14A shows the image sensing window before sensing the first image, and FIG. 14B shows the image sensing window upon releasing the shutter switch SW2 after the first image is sensed. Although no dedicated explanatory view is available, before the shutter switch SW2 is released after the first image sensing, the first image sensing region in FIG. 14A on the image sensing window is set in a quick review display state.

FIGS. 15A and 15B that have already been described show examples of the image sensing window before and after completion of sensing of the n-th image in the vertical panoramic mode.

FIG. 15A shows the image sensing window before sensing the first image, and FIG. 15B shows the image sensing window upon releasing the shutter switch SW2 after the first image is sensed. Although no dedicated explanatory view is available, before the shutter switch SW2 is released after the first image sensing, the first image sensing region in FIG. 15A on the image sensing window is set in a quick review display state.

Furthermore, FIGS. 12A to 13B that have already been described show examples of the image sensing window before and after completion of sensing of the n-th image in the 2×2 panoramic mode.

FIG. 12A shows the image sensing window before the first image is sensed. FIG. 12B shows the image sensing window upon releasing the shutter switch SW2 after the first image is sensed, i.e., before the second image is sensed.

FIG. 13A shows the image sensing window upon releasing the shutter switch SW2 after the second image is sensed, i.e., before the third image is sensed, and FIG. 13B shows the image sensing window upon canceling the shutter switch SW2 after the third image is sensed, i.e., before the fourth image is sensed.

Although no dedicated explanatory view is available, before the shutter switch SW2 is released after the n-th image sensing, the n-th image sensing region in FIGS. 12A to 13B on the image sensing window is set in a quick review display state. When the shutter switch SW2 is released, a through display of the (n+1)-th image sensing region as the next region is added.

As described above, according to the fifth embodiment, since the lens unit 300 is inhibited from being exchanged by another lens unit with a different focal length after the start of a series of panoramic image sensing processes, an image, which is unsuitable for panoramic synthesis, can be prevented from being sensed and paired with the previously sensed image.

Since the current series of panoramic image sensing processes are temporarily interrupted and a new series of panoramic image sensing processes are started, the lens unit 300 is inhibited from being exchanged by another lens unit with a different focal length, and an image, which is unsuitable for panoramic synthesis, can be prevented from being sensed and paired with the previously sensed image.

Furthermore, since various kinds of information saved in the nonvolatile memory in the lens system control circuit 350 upon detachment of the lens unit 300 can be read and used when the detached lens unit 300 is attached to the image processing apparatus 400 again, the user need not repeat various setups in correspondence with the lens unit 300 used every time he or she exchanges the lens unit 300.

The fourth and fifth embodiments of the present invention have been explained.

In the description of the embodiments, if confirmation of the end of a series of panoramic image sensing processes is selected in step S1665, the flow returns to step S1631 to start a new series of panoramic image sensing processes. Alternatively, the flow may return to step S1611 to restart setups from the panoramic mode selection window, and then a new series of panoramic image sensing processes may start.

Note that the number of types of selectable panoramic modes on the panoramic mode selection window is 3, i.e., the 2×2 panoramic mode, horizontal panoramic mode, and vertical panoramic mode. However, the present invention is not limited to these specific modes, and one or a plurality of types of an arbitrary number of different panoramic modes may be selectable.

Also, display of the panoramic mode selection window shown in FIG. 9 is not limited to this example. Alternatively, display with an arbitrary layout or scheme using an image or voice may be made.

On the 2×2 panoramic mode image sensing window, a total of four images are two-dimensionally laid out in a 2×2 matrix. However, the present invention is not limited to such matrix. For example, an arbitrary number of images such as a total of nine images, a total of 16 images, and the like may be laid out in a two-dimensional or three-dimensional matrix.

On the horizontal and vertical panoramic mode image sensing windows, two images are continuously displayed. However, the present invention is not limited to such specific display, an arbitrary number of images (e.g., three images, four images, and the like) may be one-dimensionally displayed.

The displays of the panoramic mode image sensing windows shown in FIGS. 10A to 15B are not limited to these examples, and displays with arbitrary layouts and schemes using images, voices, characters, symbols, and the like may be made.

In the horizontal and vertical panoramic modes, the image sensing direction is inhibited from being reversed after the first image is sensed. However, the present invention is not limited to this, and the image sensing direction may be reversed as needed. Also, the image sensing direction may be changed in one of arbitrary directions including the right and left directions, up and down directions, or oblique directions. In the present invention, when a large number of image display regions can be simultaneously displayed by increasing the display area of the image display unit 28, the image sensing direction can be changed in one of arbitrary directions including the right and left directions, up and down directions, or oblique directions.

Image sensing can be redone for only the immediately preceding sensed image in the horizontal and vertical panoramic modes. However, the present invention is not limited to this. For example, image sensing may be redone for a sensed image an arbitrary number of times before.

The next image display region for displaying an image to be sensed is set in the through display state, and that for displaying the already sensed image is set in the quick review display state, to display a playback image of the already sensed image and the next image to be sensed so that their boundary regions partially overlap each other. However, the present invention is not limited to such specific scheme. For example, the images may be displayed without making their boundary regions overlap each other.

In the explanatory views of the panoramic modes in FIGS. 10A to 15B, for example, comment words "LIVE" and "FREEZE" are added within the image display regions. However, the actual image display unit 28 may or may not display these comment words.

A plurality of lens units 300 may be detachably attached to the image processing apparatus 400.

The recording media 500 and 510 are not limited to memory cards such as PCMCIA cards, compact flash cards, or the like, hard disks, and the like, but may use micro DATs (digital audio tapes), magnetooptical disks, optical disks such as CD-Rs, CD-WRs, or the like, phase change optical disks such as DVDS, and the like.

Also, the recording media 500 and 510 may use hybrid media that integrate memory cards, hard disks, and the like. Furthermore, such hybrid media may include detachable media.

In the description of the fourh and fifth embodiments, the recording media 500 and 510 are independent from the image processing apparatus 400 and are arbitrarily connectable. One or both the recording media 500 and 510 may be permanently connected to the image processing apparatus 400.

An arbitrary number (one or a plurality) of image recording media 500 or 510 may be connectable to the image processing apparatus 400.

In the above description, the recording media 500 and 510 are attached to the image processing apparatus. However, one or a combination of a plurality of recording media may be used.

Synthesis of a panoramic image has been described as an example in which a plurality of images are associated. Also, the present invention can be applied to a case wherein a plurality of images are sensed while shifting pixels, and a high-resolution image is obtained by synthesizing these images.

To restate, the fourth and fifth embodiments can solve the conventional problem that image quality deteriorates considerably due to extra correction computations required to correct different focal lengths between the previous and current lenses exchanged upon generating a panoramic image by combining a plurality of sensed images.

Also, the fourth and fifth embodiments can solve the conventional problems that the outer shape of a synthesized panoramic image varies in units of sensed image and has steps when the individual sensed images have considerably different angles due to exchange of the photographing lens with another lens with a different focal length.

Furthermore, the fourth and fifth embodiments can solve the conventional problem that the user must repeat setups to obtain the previous setup state in correspondence with the photographing lens upon attachment of the detached photographing lens.

Another Embodiment

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications may can be made within the spirit and scope of the present invention. Therefore, to apprise the public of the scope of the present invention the following claims are made.

What is claimed is:

1. An image processing apparatus having a function of storing a plurality of sensed still images or moving images in storage means, comprising:

an image sensing unit having an image sensing lens which can change an optical system condition while a user takes a plurality of consecutive images using said image sensing unit;

a storage unit configured to store the plurality of consecutive images sensed by said image sensing unit by associating them with each other;

an optical system condition change instruction unit configured to output a signal for changing the optical system condition of said image sensing lens upon detecting an indication that said image sensing lens is operated by a user;

a selecting unit configured to make the user selects whether or not to continue an image sensing operation while the user takes the plurality of consecutive images when said optical system condition change instruction unit outputs the signal to change the optical system condition;

a determining unit configured to determine whether a first of the plurality of consecutive images is sensed; and a control unit configured to complete associating operation of the plurality of consecutive images which have been sensed before reception of the instruction for changing the optical system condition of said image sensing lens from said optical system condition change instruction unit when the user selects to finish the image sensing operation based on a result from said selecting unit, and configured to finish associating operation of images sensed after a first one of the plurality of consecutive images to be stored in said storage unit in association with each other is sensed and stored based on a result from said determining unit, and configured to stop changing of the optical system condition when the user selects to continue the image sensing operation based on the result from said selecting unit.

2. The apparatus according to claim 1, wherein the optical system condition is a focal length of said image sensing lens.

3. The apparatus according to claim 1, wherein associating the plurality of images is obtaining a panoramic image by synthesizing the plurality of images.

4. The apparatus according to claim 1, wherein the plurality of images are images sensed by performing pixel shift, and associating the plurality of images is obtaining a high-resolution image by synthesizing the plurality of images sensed by performing the pixel shift.

5. The apparatus according to claim 1, wherein said control means starts image sensing of a plurality of new images to be stored in association with each other after finishing of the associating operation of images.

6. The apparatus according to claim 1, further comprising initial value control means for controlling to set the optical system condition of said image sensing lens at an initial value before sensing of a first one of the plurality of images to be stored in said storage means in association with each other is started.

7. The apparatus according to claim 1, wherein the change in optical system condition includes free attachment/detachment of said lens unit.

8. The apparatus according to claim 1, further comprising alerting means for alerting upon reception of the instruction for changing the optical system condition of said image sensing lens from said optical system condition change instruction means.

9. A control method for an image processing apparatus which comprises an image sensing unit having an image sensing lens which can change an optical system condition while a user takes a plurality of consecutive images using said image sensing unit, a storage unit configured to store the plurality of consecutive images sensed by said image sensing unit by associating them with each other, an optical system condition change instruction unit configured to output an instruction for changing the optical system condition of said image sensing lens upon detecting an indication that the optical system is operated by a user, a selecting unit configured to make the user to select whether or not to continue an image sensing operation while the user takes the plurality of consecutive images when said optical system condition change instruction unit outputs the signal to change the optical system condition, and a determining unit configured to determine whether a first of the plurality of consecutive images is sensed, comprising the step of:

completing associating operation of the plurality of images which have been sensed before reception of the instruction for changing the optical system condition of said image sensing lens from said optical system condition change instruction unit when the user selects to finish the image sensing operation based on a result from said selecting unit, and finishing associating operation of images sensed after a first one of the plurality of images to be stored in said storage unit in association with each other is sensed and stored based on a result from said determining unit, and controlling to stop changing of the optical system condition when the user selects to continue the image sensing operation based on the result from said selecting unit.

10. The method according to claim 9, wherein the optical system condition is a focal length of said image sensing lens.

11. The method according to claim 9, wherein associating the plurality of images is obtaining a panoramic image by synthesizing the plurality of images.

12. The method according to claim 9, wherein the plurality of images are images sensed by performing pixel shift, and associating the plurality of images is obtaining a high-resolution image by synthesizing the plurality of images sensed by performing the pixel shift.

13. The method according to claim 9, further comprising the step of starting image sensing of a plurality of new images to be stored in association with each other after finishing of the associating operation of images.

14. The method according to claim 9, further comprising the step of setting the optical system condition of said image sensing lens at an initial value before sensing of a first one of the plurality of images to be stored in said storage means in association with each other is started.

15. The method according to claim 9, further comprising the step of generating an alert upon reception of the instruction for changing the optical system condition of said image sensing lens from said optical system condition change instruction means.

16. A computer-readable storage medium that stores a control program executable in a computer for controlling an image processing apparatus which comprises an image sensing unit having an image sensing lens which can change an optical system condition while a user takes a plurality of consecutive images using said image sensing unit, a storage unit configured to store the plurality of consecutive images sensed by said image sensing unit by associating them with each other, an optical system condition change instruction unit configured to output an instruction for changing the optical system condition of said image sensing lens upon detecting an indication that the optical system is operated by a user, a selecting unit configured to make the user to select whether or not to continue an image sensing operation while the user takes the plurality of consecutive images when said optical system condition change instruction unit outputs the signal to change the optical system condition, and a determining unit configured to determine whether a first of the plurality of consecutive images is sensed, said control program comprising a code of the step of:

completing associating operation of the plurality of images which have been sensed before reception of the instruction for changing the optical system condition of said image sensing lens from said optical system condition change instruction unit when the user selects to finish the image sensing operation based on a result from said selecting unit, and finishing associating operation of images sensed after a first one of the plurality of images to be stored in said storage unit in association with each other is sensed and stored based on a result from said determining unit, and controlling to stop changing of the optical system condition when the user selects to continue the image sensing operation based on the result from said selecting unit.

17. The medium according to claim 16, wherein the optical system condition is a focal length of said image sensing lens.

18. The medium according to claim 16, wherein associating the plurality of images is obtaining a panoramic image by synthesizing the plurality of images.

19. The medium according to claim 16, wherein the plurality of images are images sensed by performing pixel shift, and associating the plurality of images is obtaining a high-resolution image by synthesizing the plurality of images sensed by performing the pixel shift.

20. The storage medium according to claim 16, wherein said control program further comprising the step of starting image sensing of a plurality of new images to be stored in association with each other after finishing of the associating operation of images.

21. The storage medium according to claim 16, wherein said control program further comprising the step of setting the optical system condition of said image sensing lens at an initial value before sensing of a first one of the plurality of images to be stored in said storage means in association with each other is started.

22. The storage medium according to claim 16, wherein said control program further comprising the step of generating an alert upon reception of the instruction for changing the optical system condition of said image sensing lens from said optical system condition change instruction means.

* * * * *

UNITED STATES PATENT AND TRADEMARK OFFICE
CERTIFICATE OF CORRECTION

PATENT NO. : 7,136,096 B1 Page 1 of 1
APPLICATION NO. : 09/265070
DATED : November 14, 2006
INVENTOR(S) : Yamagishi et al.

It is certified that error appears in the above-identified patent and that said Letters Patent is hereby corrected as shown below:

On the Title page of the issued patent

In the References Cited (56), Please add the following references:

FOREIGN PATENT DOCUMENTS

--JP    A 9-322040    12/1997--

In the Specification:

In col. 36, line 49, please replace "self-tinier" to --self-timer--.

In col. 46, line 56, please replace "mole" to --mode--.

In col. 79, line 20, please replace "fourh" to --fourth--.

Signed and Sealed this

Sixth Day of February, 2007

JON W. DUDAS
*Director of the United States Patent and Trademark Office*